United States Patent [19]

Kagawa

[11] Patent Number: 5,654,082

[45] Date of Patent: Aug. 5, 1997

[54] EASILY TEARABLE LAMINATED FILM AND METHOD OF MANUFACTURING THE SAME

[76] Inventor: Seiji Kagawa, 77-1-1409, Sezaki-cho, Soka-shi, Saitama-ken, Japan

[21] Appl. No.: 408,821

[22] Filed: Mar. 23, 1995

[30] Foreign Application Priority Data

Mar. 25, 1994 [JP] Japan ................................ 6-077824

[51] Int. Cl.$^6$ ................................ B32B 7/02; B32B 5/24
[52] U.S. Cl. ................ 428/212; 428/311.11; 428/317.1; 428/318.4; 428/319.9
[58] Field of Search ................ 428/212, 311.1, 428/317.1, 318.4, 319.9

[56] References Cited

U.S. PATENT DOCUMENTS

| | | | |
|---|---|---|---|
| 3,559,800 | 2/1971 | Butler | 206/46 |
| 4,039,364 | 8/1977 | Rasmussen | 156/164 |
| 4,735,335 | 4/1988 | Torterotot | 220/270 |

*Primary Examiner*—Helen Lee
*Attorney, Agent, or Firm*—Kenyon & Kenyon

[57] ABSTRACT

Disclosed is an easily tearable laminated film suitable as a sealed pouch or a lid of a sealed container, which can be easily and reliably torn along a direction of any specific shape such as a linear shape, an annular shape, or a V shape in opening the pouch or the lid. This easily tearable laminated film includes a porous organic resin film, a heat-fusible resin film, and an adhesive layer interposed between these films. The porous organic resin film consists of a rigid organic resin film whose entire surface has a large number of fine through and/or non-through pores, and has a higher tearability than that of an organic resin film having no pores. The porous organic resin film and the heat-fusible resin film are bonded with a higher strength than the tear strength of the porous organic resin film in a tear region and with a strength not higher than the tear strength of the porous organic resin film in an adjoining region adjacent to the tear region.

24 Claims, 21 Drawing Sheets

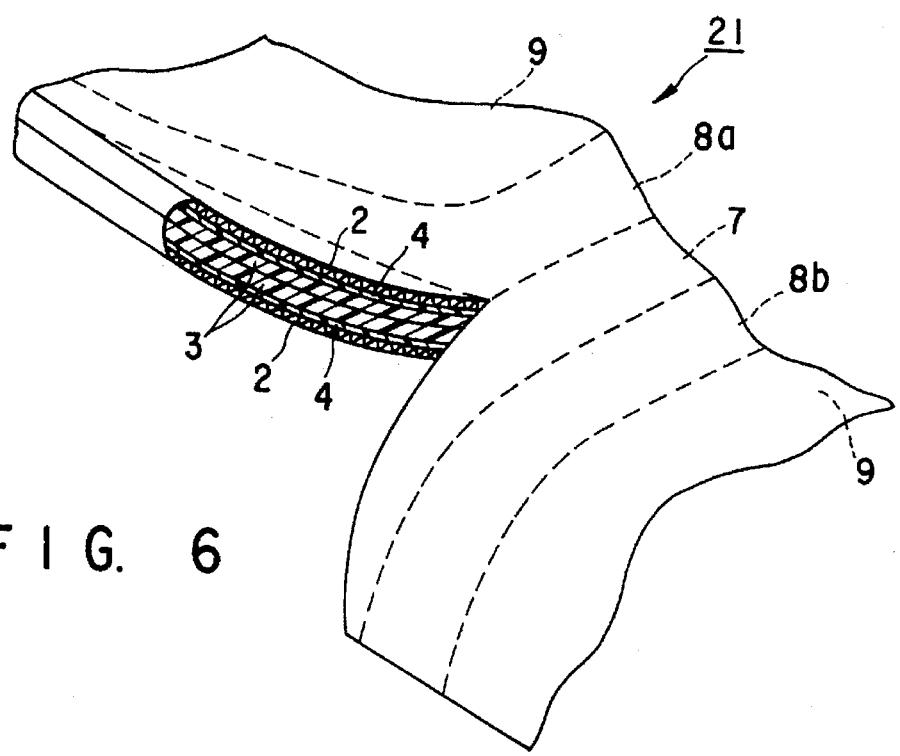
FIG. 6
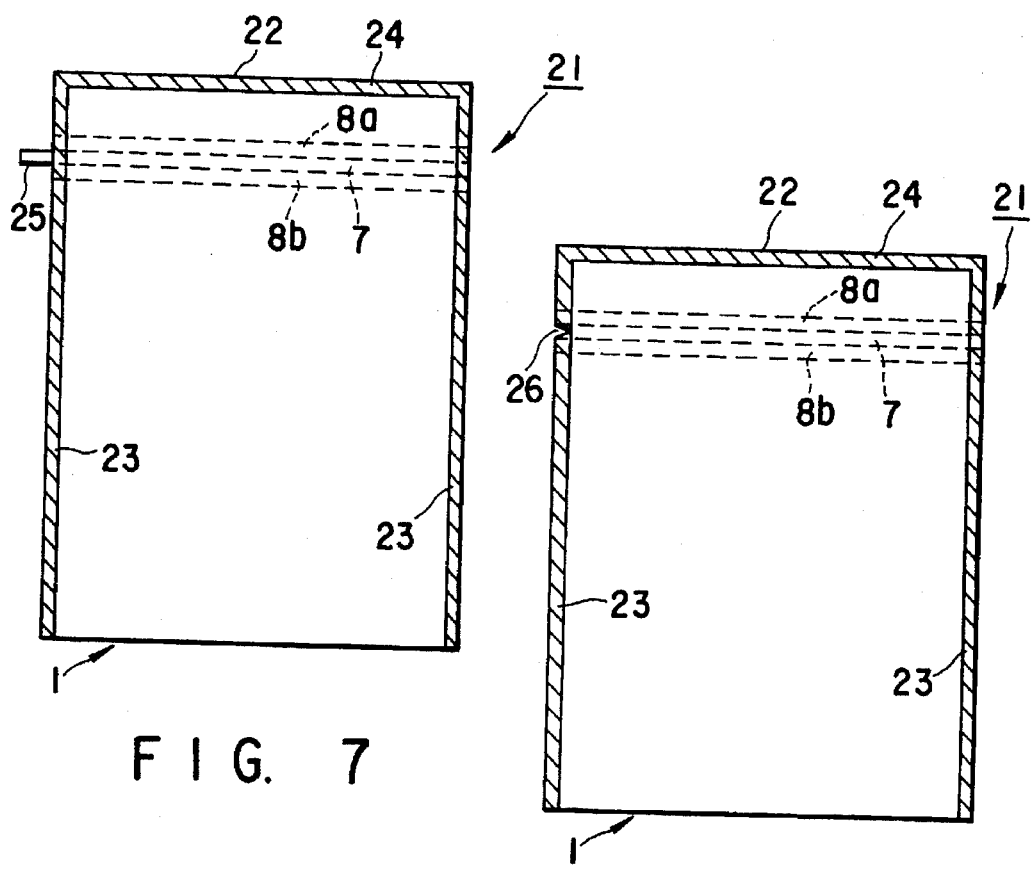
FIG. 7
FIG. 8

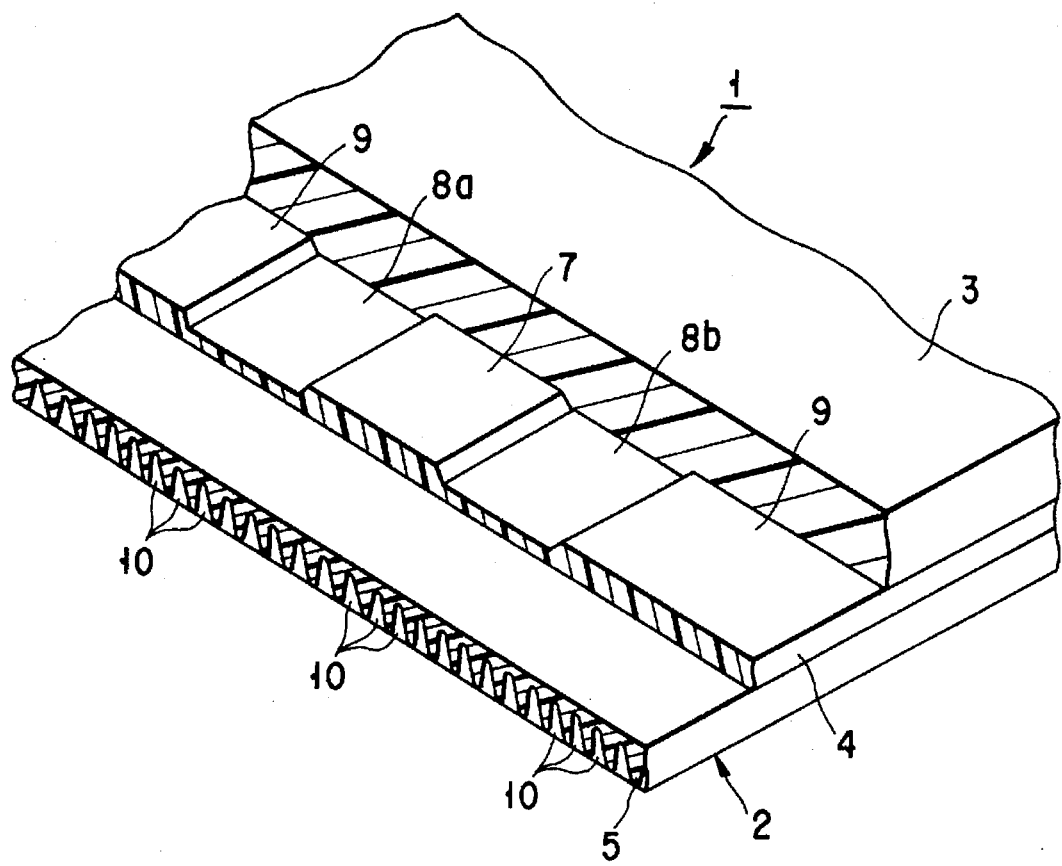
F I G. 9

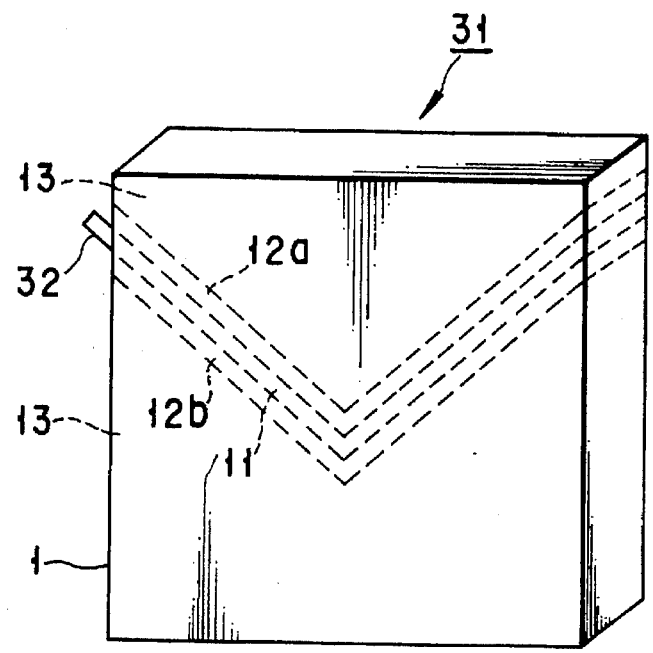
F I G. 11
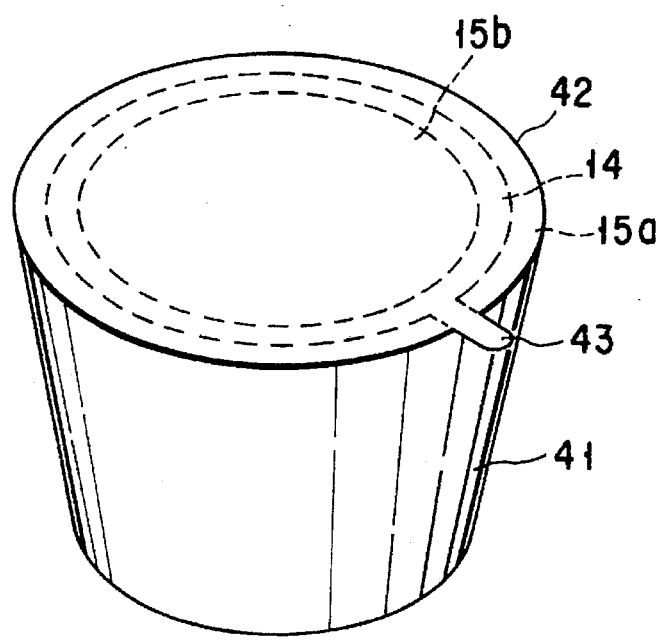
F I G. 13

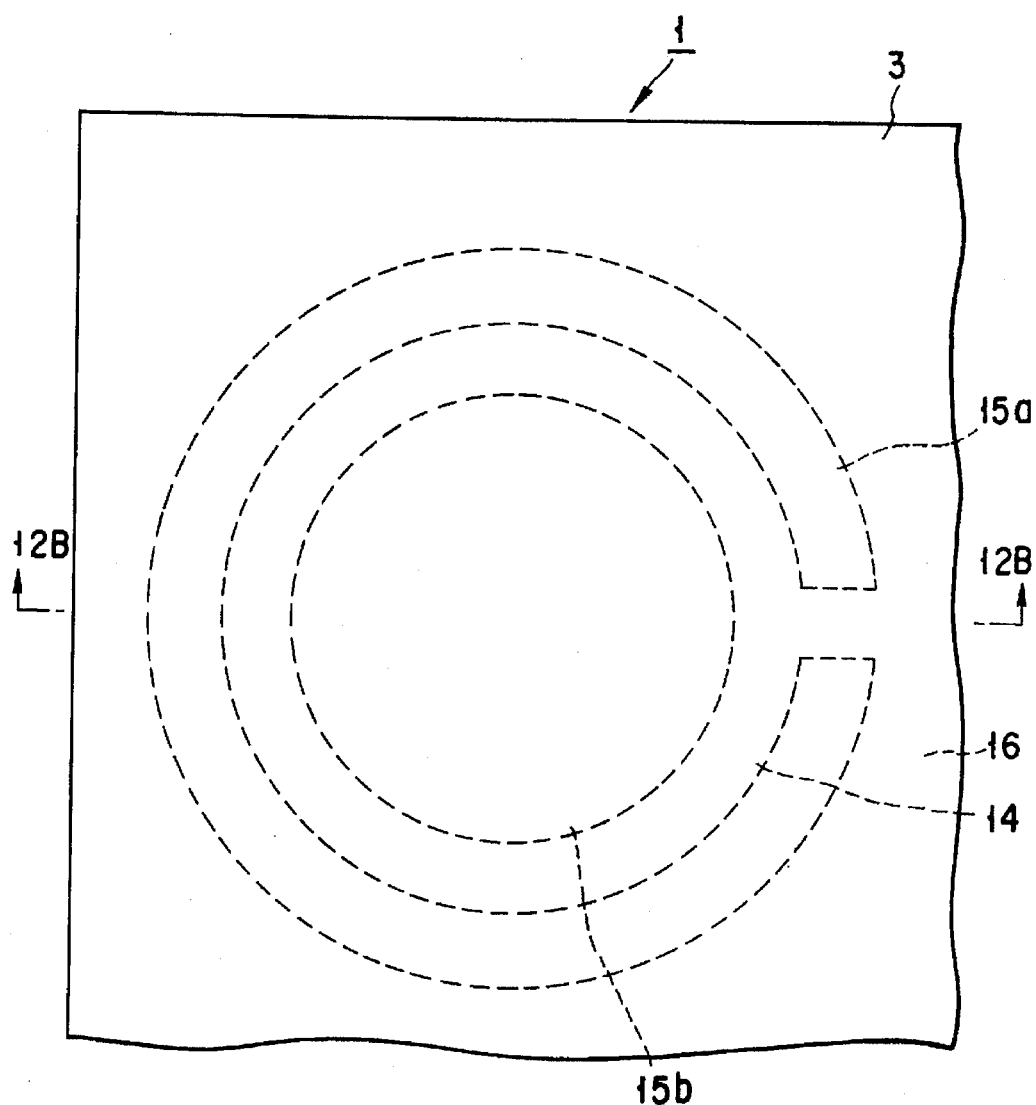
F I G. 12A
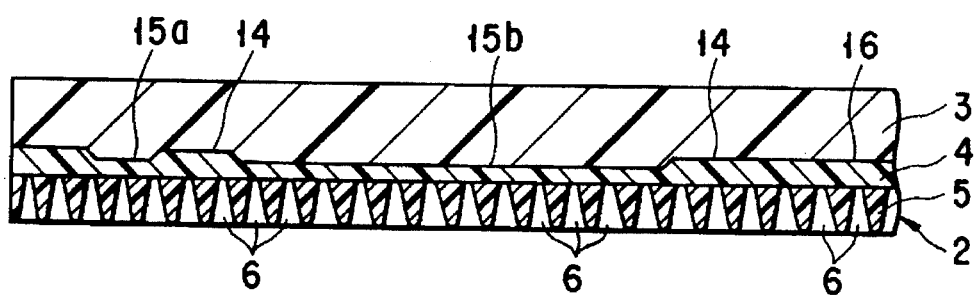
F I G. 12B

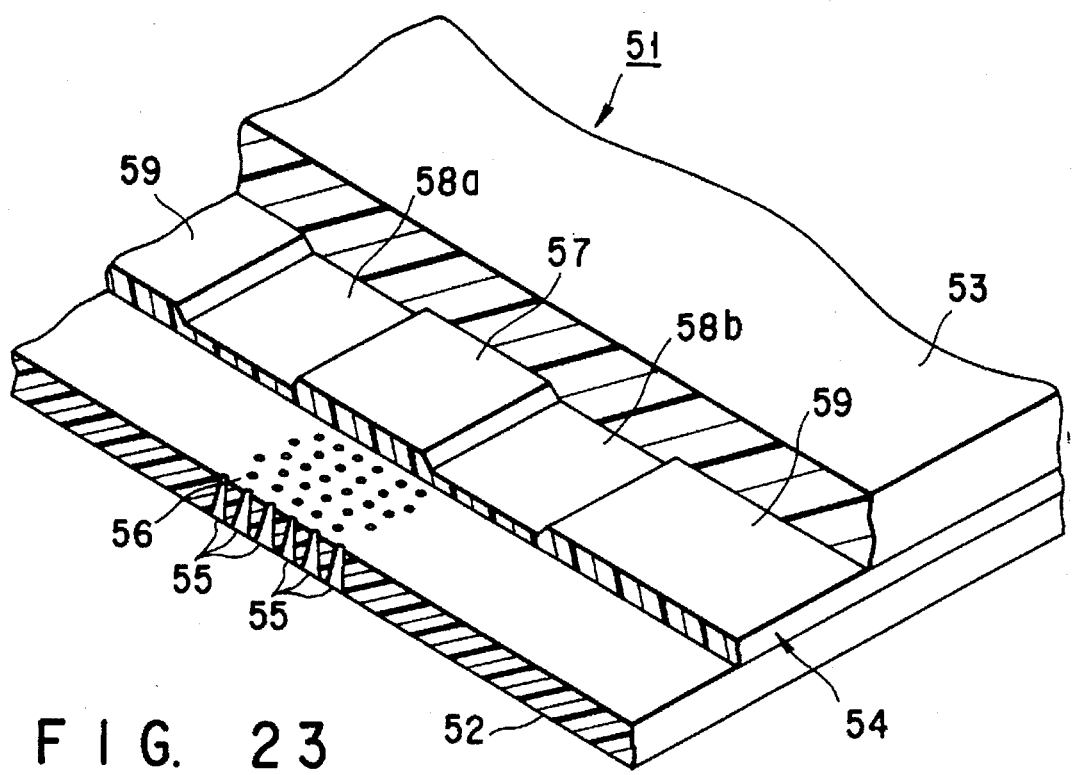
F I G. 23
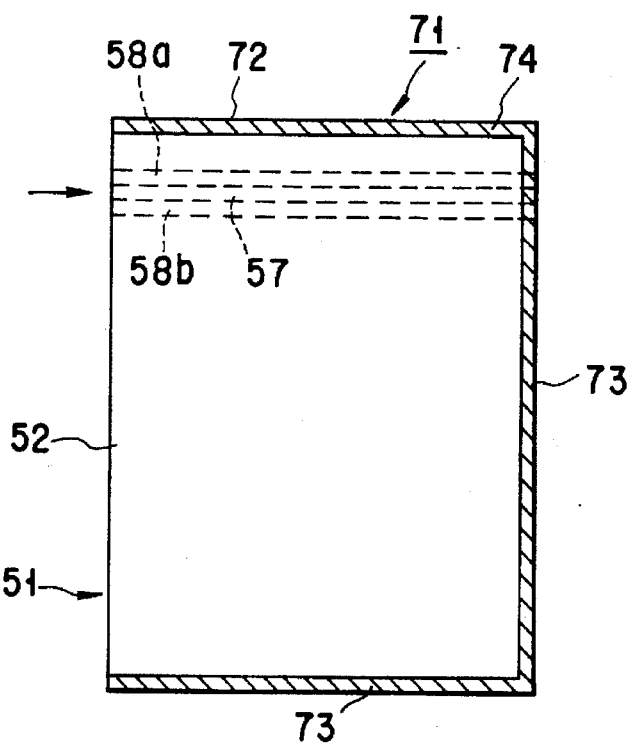
F I G. 24

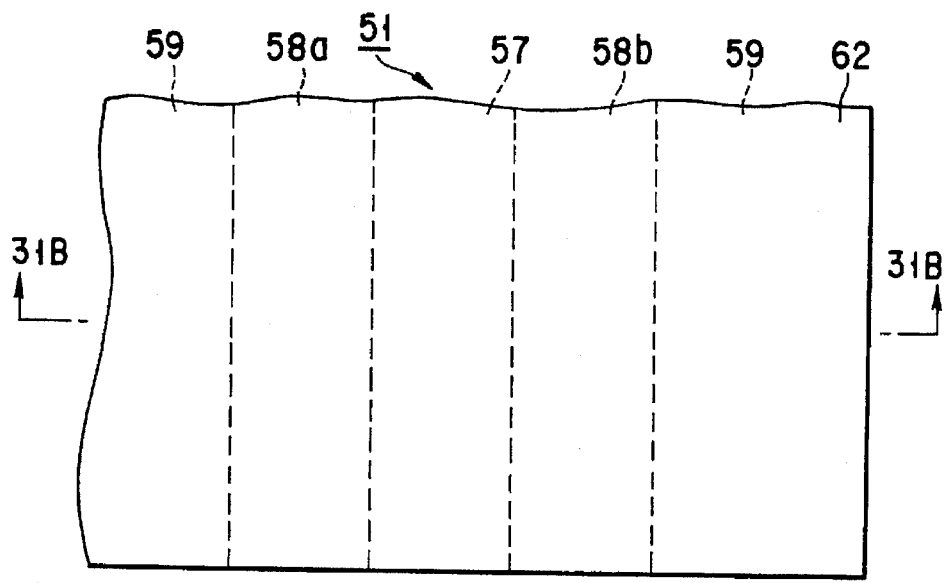
F I G. 31A
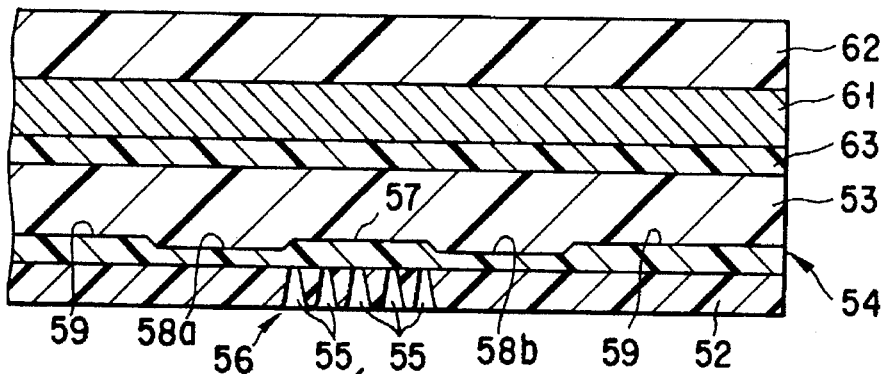
F I G. 31B
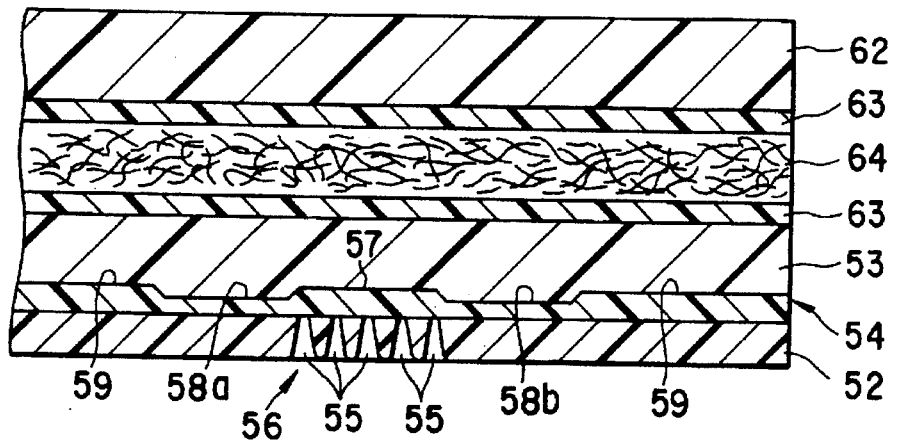
F I G. 32

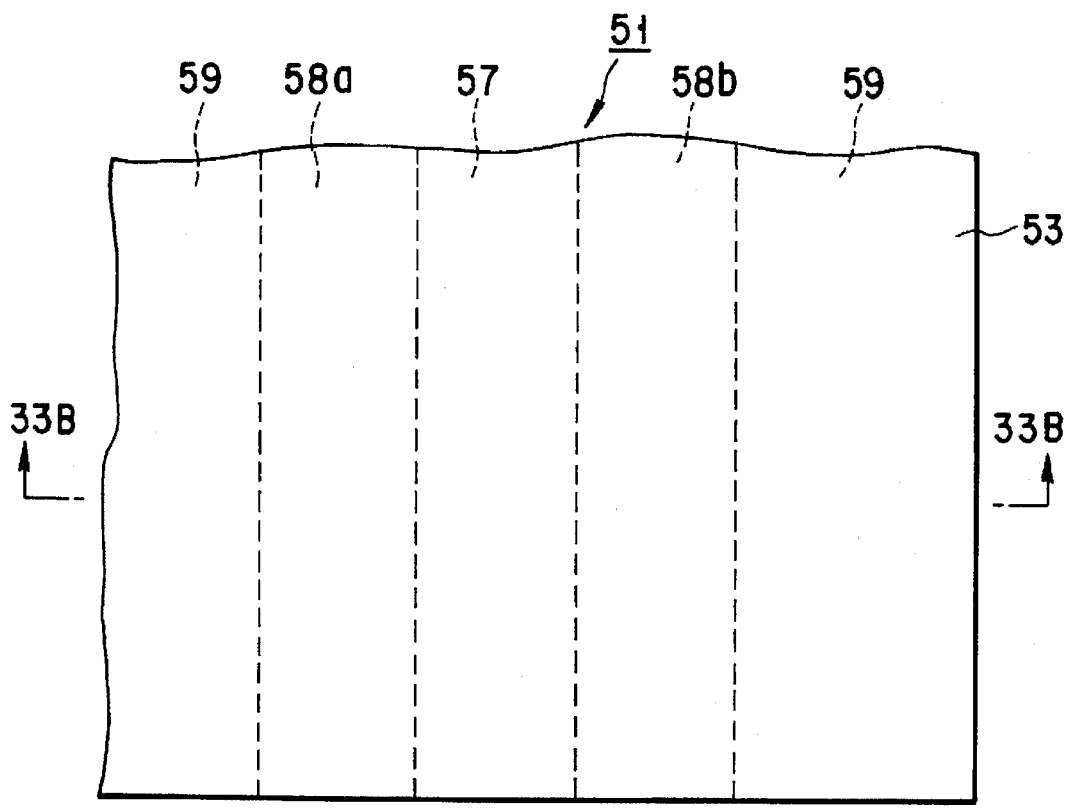
F I G. 33A
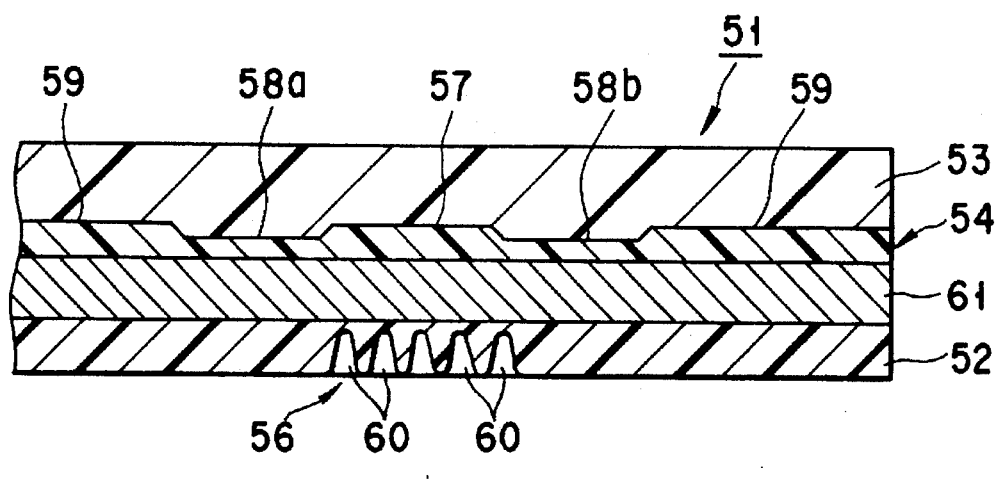
F I G. 33B

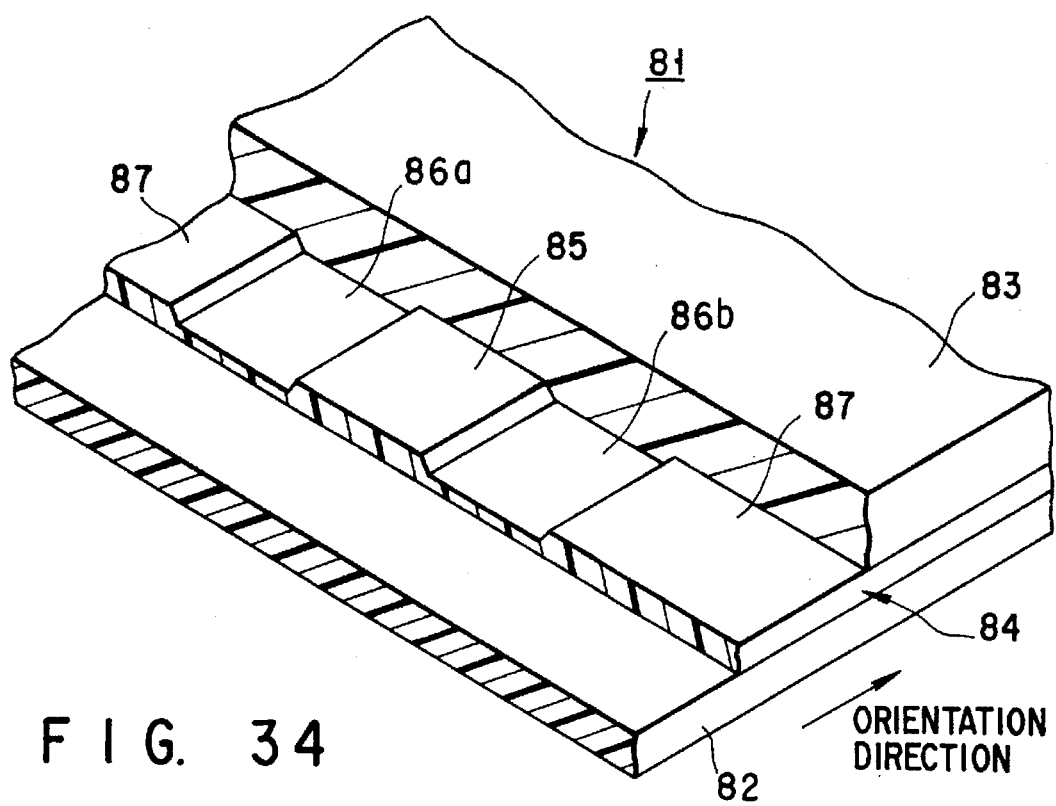
F I G. 34
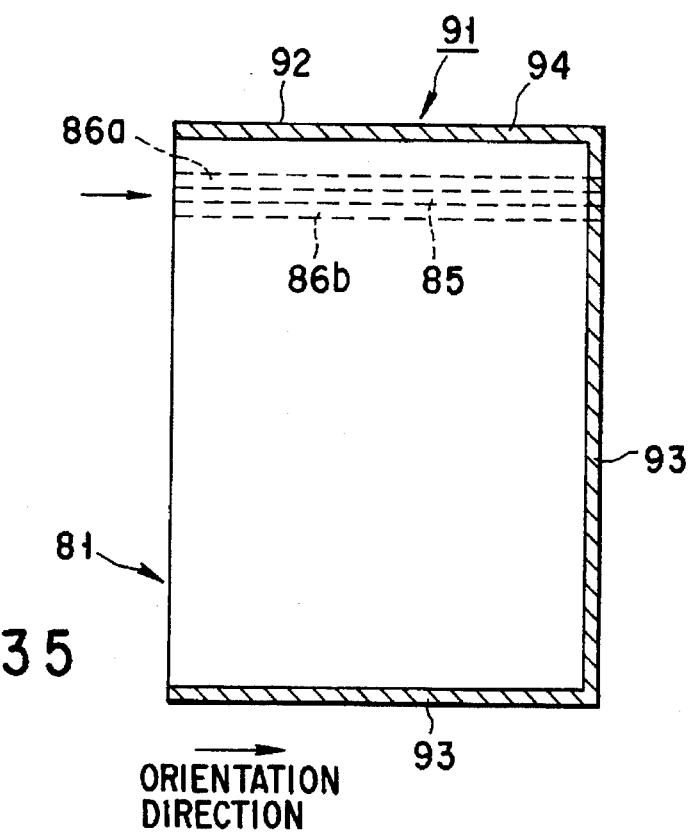
F I G. 35

EASILY TEARABLE LAMINATED FILM AND METHOD OF MANUFACTURING THE SAME

BACKGROUND OF THE INVENTION

1. Field of the Invention

The present invention relates to an easily tearable laminated film and a method of manufacturing the same and, more particularly, to an easily tearable laminated film capable of being easily torn in a specific intended direction and suitable as a packaging material.

2. Description of Related Art

Various types of liquid and powder products such as liquid soup, powder soup, and powder medicines are individually packaged by a composite or laminated packaging material formed using an organic resin film as a base, and are used in this sealed state. In opening these sealed bags, the bags are required to be easily torn so that the contents neither spill nor scatter.

For this reason, the following sealed bags given easy tearability have been conventionally developed.

(1) In manufacturing a sealed bag from a laminated film, a sealed portion is so formed as to position in a film portion inside the peripheral edge of the film. An unbonded film edge portion is left outside the sealed portion, and a V-shaped notch is formed in this film edge portion. This sealed bag can be torn starting from the V-shaped notch.

(2) In manufacturing a sealed bag from a three-layer film, a sealed portion is so formed as to position in a film portion inside the peripheral edge of the film. An unbonded film edge portion is left outside the sealed portion, and a V-shaped notch is formed in this film edge portion. Additionally, a large number of slits are formed along the extension line of the V-shaped notch in a film on the outside (Jpn. UM application. KOKAI Publication No. 61-66137). This sealed bag can be torn in the formation direction of the slits starting from the V-shaped notch.

(3) In manufacturing a sealed bag from a laminated film, sealed portions are so formed as to position in film portions inside two peripheral edges perpendicular to an opening portion. An unbonded film edge portion is formed outside these sealed portions, and a scar portion having a large number of band-like scars is formed in each film edge portion (Jpn. UM application. KOKAI Publication No. 5-178352). An easily openable sealed bag of this type can be torn from an arbitrary position of the film edge portions.

The sealed bags (1) to (3) described above are manufactured by using, as a base film, a polyethylene film or an unstretched polypropylene film having good heat-sealing properties with which the film can be readily formed into a bag. Unfortunately, these base films are difficult to tear in either the longitudinal or lateral direction. For this reason, the sealed bag (1) having a V-shaped notch is in many cases inconvenient in that the bag is torn from the V-shaped notch in the oblique direction, rather than in the lateral direction as the direction of the extension line of the notch, and consequently the contents scatter out of the bag.

The sealed bag (2) in which a V-shaped notch and slits are formed is improved in the easy tearability as compared with the sealed bag (1). However, the cost of the sealed bag is increased since a cumbersome operation for forming a large number of slits in the outer layer of the multilayer film is necessary.

The sealed bag (3) in which a scar portion having a large number of band-like scars is formed in the peripheral edge of an unbonded film is readily tearable from any arbitrary portion. As with the V-shaped notch, however, the scar portion merely functions as the starting point of tear. Consequently, the bag is torn obliquely and the contents scatter in many cases.

Among other known sealed bags given linear easy tearability are those for gum and cigarettes, in which a tape is bonded in the tearing direction and one end of the tape is left unbonded and protrudes. This sealed bag can be linearly torn by holding the protruding end of the tape and pulling the end along the tape. It is unfortunate that not only the tape is additionally required in the manufacturing process of the sealed bag, but also the step of bonding the tape to the film is added to the process. This increases the manufacturing cost of the sealed bag.

SUMMARY OF THE INVENTION

It is an object of the present invention to provide an easily tearable laminated film suitable as a sealed bag or a lid of a sealed container, which can be easily and reliably torn along a direction of any specific intended shape such as a linear shape, an annular shape, or a V shape in opening the bag or the lid.

It is another object of the present invention to provide a method capable of readily mass-producing an easily tearable laminated film suitable as a sealed bag or a lid of a sealed container, which can be easily and reliably torn along a direction of any specific intended shape such as a linear shape, an annular shape, or a V shape in opening the bag or the lid.

According to one aspect of the present invention, there is provided an easily tearable laminated film comprising a porous organic resin film, a heat-fusible resin film, and an adhesive layer interposed between the porous organic resin film and the heat-fusible resin film, wherein the porous organic resin film comprises a rigid organic resin film whose entire surface has a large number of fine through and/or non-through pores, and the porous organic resin film has a higher tearability than tearability of an organic resin film having no pores, and the porous organic resin film and the heat-fusible resin film are bonded with a higher strength than a tear strength of the porous organic resin film in a tear region, and with a strength not higher than the tear strength of the porous organic resin film in an adjoining region adjacent to the tear region.

According to another aspect of the present invention, there is provided an easily tearable laminated film comprising a porous organic resin film having one surface on which an aluminum film is vapor-deposited, a heat-fusible resin film, and an adhesive layer interposed between the aluminum film and the heat-fusible resin film, wherein the porous organic resin film comprises a rigid organic resin film whose entire portion has a large number of fine non-through pores formed from a surface away from the surface in contact with the aluminum film, and has a higher tearability than tearability of an organic resin film having no pores, and the aluminum film and the heat-fusible resin film are bonded with a higher strength than a tear strength of the porous organic resin film in a tear region, and with a strength not higher than the tear strength of the porous organic resin film in an adjoining region adjacent to the tear region.

According to still another aspect of the present invention, there is provided an easily tearable laminated film comprising a rigid organic resin film, a heat-fusible resin film, and an adhesive layer interposed between the organic resin film and the heat-fusible resin film, wherein the rigid organic film comprises a non-porous region and a porous region having a large number of fine through and/or non-through pores, and the porous region has a higher tearability than tearability of the non-porous region, and the organic resin film and the heat-fusible resin film are bonded with a higher strength than a tear strength of the porous region of the organic resin film in a tear region which matches the porous region, and with a strength not higher than the tear strength of the porous region of the organic resin film in an adjoining region adjacent to the tear region.

According to still another aspect of the present invention, there is provided an easily tearable laminated film comprising a rigid organic resin film having one surface on which an aluminum film is vapor-deposited, a heat-fusible resin film, and an adhesive layer interposed between the aluminum film and the heat-fusible resin film, wherein the rigid organic resin film comprises a non-porous region and a porous region having a large number of fine non-through pores, and the porous region has a higher tearability than tearability of the non-porous region, and the aluminum film and the heat-fusible resin film are bonded with a higher strength than a tear strength of the porous region of the organic resin film in a tear region which matches the porous region, and with a strength not higher than the tear strength of the porous region of the organic resin film in an adjoining region adjacent to the tear region.

According to still another aspect of the present invention, there is provided a method of manufacturing an easily tearable laminated film, comprising the steps of:

arranging a first roll having a surface on which a large number of particles having acute corner portions and a Mohs hardness of 5 or more are deposited, and a second roll having a smooth surface, such that the first and second rolls oppose each other;

passing a rigid, elongated organic resin film between the first and second rolls by rotating the first and second rolls in opposite directions, and controlling a pressure applied to the elongated organic resin film passing between the first and second rolls such that the pressure is uniform throughout an entire film surface in contact with each of the first and second rolls, thereby performing the acute corner portions of the particles on the surface of the first roll to press into the elongated organic resin film to form an elongated porous organic resin film having a large number of fine through and/or non-through pores on the entire film surface;

coating a dry-laminating adhesive on one surface of the elongated porous organic resin film such that a thickness of the dry-laminating adhesive is large in a tear region and smaller in an adjoining region adjacent to the tear region than the thickness in the tear region, and drying the dry-laminating adhesive; and overlapping an elongated heat-fusible resin film on the adhesive coated surface of the elongated porous organic resin film, and laminating the elongated heat-fusible resin film and the elongated porous organic resin film by applying pressure and heat.

According to still another aspect of the present invention, there is provided a method of manufacturing an easily tearable laminated film, comprising the steps of:

arranging a first roll having a surface on which a large number of particles having acute corner portions and a Mohs hardness of 5 or more are deposited, and a second roll having a circumferential surface on which a desired protruding pattern is formed, at least the protruding pattern formation surface being covered with an elastic organic polymer sheet, such that the first and second rolls oppose each other;

passing a rigid, elongated organic resin film between the first and second rolls by rotating the fist and second rolls in opposite directions, and urging the first and second rolls against the elongated organic resin film passing between the first and second rolls until a distance between a surface of the organic polymer sheet corresponding to the protruding pattern and the points of the particles becomes smaller than a thickness of the elongated organic resin film, thereby performing the acute corner portions of the particles opposing the protruding pattern to selectively press into the elongated organic resin film by a cushioning effect of the organic polymer sheet to selectively form a large number of fine through and/or non-through pores, forming a porous region having a higher tearability than tearability of a non-porous region;

coating a dry-laminating adhesive on one surface of the elongated organic resin film such that a thickness of the dry-laminating adhesive is large in a tear region corresponding to the porous region and smaller in an adjoining region adjacent to the tear region than the thickness in the tear region, and drying the dry-laminating adhesive; and overlapping an elongated heat-fusible resin film on the adhesive coated surface of the elongated organic resin film, and laminating the elongated heat-fusible resin film and the elongated organic resin film by applying pressure and heat.

According to still another aspect of the present invention, there is provided an easily tearable laminated film comprising an oriented organic resin film, a heat-fusible resin film, and an adhesive layer interposed between the oriented organic resin film and the heat-fusible resin film, wherein the organic resin film and the heat-fusible resin film are bonded with a higher strength than a tear strength in an orientation direction of the organic resin film in a tear region along the orientation direction of the organic resin film, and with a strength not higher than the tear strength in the orientation direction of the organic resin film in an adjoining region adjacent to the tear region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a perspective view for explaining the tearing process of the sealed bag in FIG. 3;

FIG. 7 is a front view showing another sealed bag manufactured from the easily tearable film shown in FIGS. 1A and 1B;

FIG. 8 is a front view showing still another sealed bag manufactured from the easily tearable laminated film shown in FIGS. 1A and 1B;

FIG. 9 is a partially cutaway perspective view showing another easily tearable laminated film according to the present invention;

FIG. 11 is a perspective view showing a sealed bag manufactured from the easily tearable laminated film shown in FIGS. 10A and 10B;

FIG. 12A is a plan view showing still another easily tearable laminated film according to the present invention, which has a ring-like tear region;

FIG. 12B is a sectional view taken along the line 12B—12B in FIG. 12A;

FIG. 13 is a perspective view showing a container manufactured using the easily tearable laminated film shown in FIGS. 12A and 12B as a lid;

FIG. 23 is a partially cutaway perspective view showing still another easily tearable laminated film according to the present invention;

FIG. 24 is a partially cutaway perspective view showing a sealed bag manufactured from the easily tearable laminated film shown in FIG. 23;

FIG. 31A is a plan view showing still another easily tearable laminated film according to the present invention;

FIG. 31B is a sectional view taken along the line 31B—31B in FIG. 31A;

FIG. 32 is a sectional view showing still another easily tearable laminated film according to the present invention;

FIG. 33A is a plan view showing still another easily tearable laminated film according to the present invention;

FIG. 33B is a sectional view taken along the line 33B—33B in FIG. 33A;

FIG. 34 is a partially cutaway perspective view showing still another easily tearable laminated film according to the present invention; and FIG. 35 is a front view showing a sealed bag manufactured from the easily tearable laminated film shown in FIG. 34.

DETAILED DESCRIPTION OF THE PREFERRED EMBODIMENTS

Figure 1A:
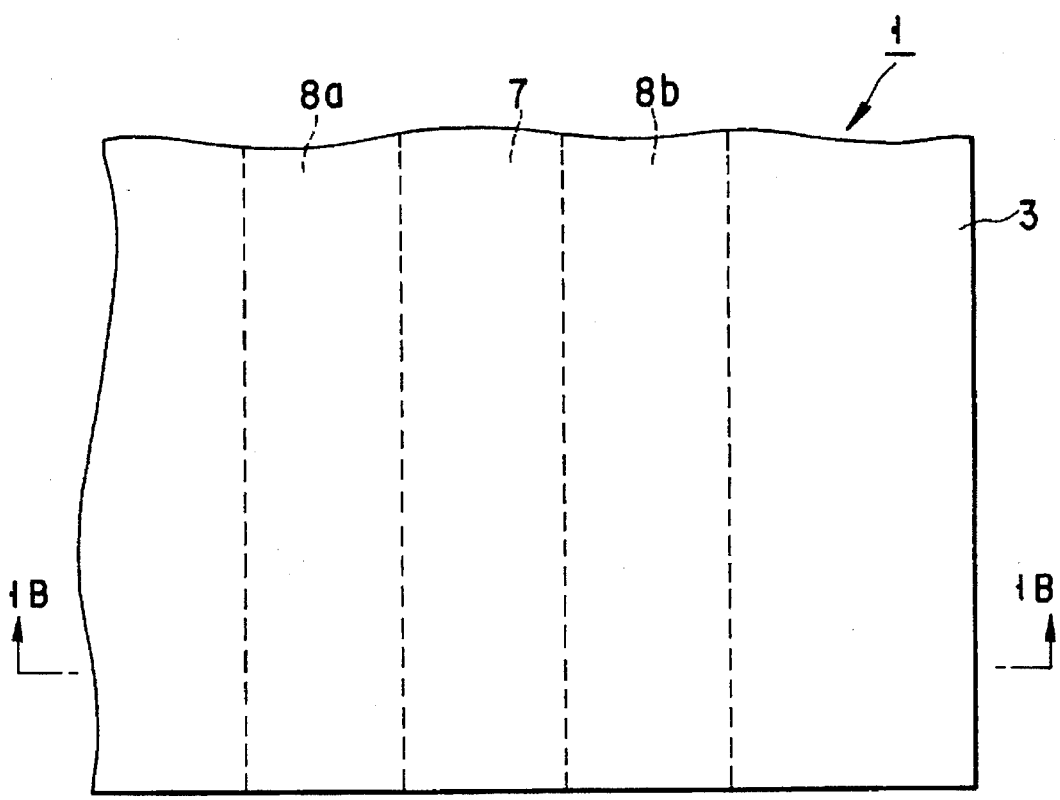
FIG. 1A is a plan view showing an easily tearable laminated film according to the present invention.

An easily tearable laminated film according to the present invention is a laminated film comprising a porous organic resin film, a heat-fusible resin film, and an adhesive layer interposed between the porous organic resin film and the heat-fusible resin film, wherein the porous organic resin film comprises a rigid organic resin film whose entire surface has a large number of fine through and/or non-through pores, and the porous organic resin film has a higher tearability than tearability of an organic resin film having no pores, and the porous organic resin film and the heat-fusible resin film are bonded with a higher strength than a tear strength of the porous organic resin film in a tear region, and with a strength not higher than the tear strength of the porous organic resin film in an adjoining region adjacent to the tear region.

Examples of the rigid organic resin are polyethyleneterephthalate (PET), nylon, and an oriented polypropylene film. A film made of any of these organic resins preferably has a thickness of 6 μm or more, since the film is given easy tearability by forming a large number of fine through and/or non-through pores in the film. Although the upper limit of the thickness is not particularly restricted, it is preferably 30 μm or less in respect of the cost.

Examples of the heat-fusible resin are polyethylene such as low-density polyethylene and linear, low-density polyethylene, an ethylvinylacetate copolymer (EVA), and unstretched polypropylene. Usually, the thickness of a film made of any of these heat-fusible resins is 10 to 50 μm.

The adhesive is not particularly limited. Examples are adhesives primarily consisting of a polyester-based urethane resin and a polyether-based urethane resin.

The tear strength means a value obtained by measuring a maximum stress by which a sample piece of a predetermined shape, which is formed from an organic resin film, is torn when pulled, and dividing this maximum stress by the original thickness of the test piece.

The tear strength of the porous organic resin film is preferably 0.5 times or less the tear strength of an organic resin film having no pores. This is so because, if the tear strength of the porous organic resin film exceeds 0.5 times that of an organic resin film having no pores, there is the possibility that a sealed bag made from the easily tearable laminated film becomes difficult to reliably and easily tear in the tear region when opened. The tear strength of the porous organic resin film is more preferably 0.35 times or less the tear strength of an organic resin film having no pores.

In the porous organic resin film, it is preferable that the mean pore opening of the through or non-through pores be 0.5 to 100 μm, more preferably 5 to 80 μm, and the through and/or non-through pores be formed at a density of 500 pores/cm$^2$ or higher, more preferably 1,000 to 5,000 pores/cm$^2$ in the organic resin film. A porous organic resin film having through and/or non-through pores with these mean pore opening and density of 1,000 pores/cm$^2$ or higher has a tear strength which is sufficiently lower than, e.g., 0.35 times or less the tear strength of an organic resin film having no pores. Consequently, this porous organic resin film shows a higher tearability than that of an organic resin film having no pores.

The mean pore opening of the through or non-through pores of the porous organic resin film is defined as above for the reasons explained below. That is, if the mean pore opening is smaller than 0.5 μm, a sealed bag made from the easily tearable laminated film may become difficult to reliably and easily tear in the tear region when opened. On the other hand, if the mean pore opening is larger than 100 μm, the printing properties of the porous organic resin film may be impaired.

The pore density of the porous organic resin film is defined as above for the reasons explained below. That is, if the pore formation density is lower than 500 pores/cm$^2$, there is the possibility that a sealed bag made from the easily tearable laminated film becomes difficult to reliably and easily tear in the tear region when opened. The upper limit value of the formation density of the through and/or non-through pores is not particularly specified. A pore density of 25,000 pores/cm$^2$ can be realized by one-time processing by a pore forming apparatus used in the manufacture of an easily tearable laminated film to be described later.

The shape of the tear region is not particularly limited. For example, the tear region can take any of a ring-like shape such as a circular ring, a rectangular ring, and a hexagonal ring, a band-like shape, and a V shape.

The region (adjoining region) which is adjacent to the tear region means a peripheral region along the tearing direction of the tear region or an entire region except for the tear region. If the adjoining region is the peripheral region of the tear region, the porous organic resin film and the heat-fusible resin film can be bonded with a strength not higher than the tear strength of the porous organic resin film in the adjoining region, and with a higher strength than the tear strength of the porous organic resin film in the remaining region.

The adhesive force between the porous organic resin film and the heat-fusible resin film in the tear region is desirably higher than the tear strength of the porous organic resin film. That is, the adhesive force is preferably 1.2 times or more, and more preferably 1.5 times or more the tear strength of the porous organic resin film. In addition, it is desirable that the adhesive force between the porous organic resin film and the heat-fusible resin film in the adjoining region be lower than the tear strength of the porous organic resin film. The adhesive force is preferably 0.8 times or less, and more preferably 0.5 times or less the tear strength of the porous organic resin film. A sealed bag made from an easily tearable laminated film with this structure can be easily and reliably torn in the tear region in the early stages of tear. Even if the sealed bag is torn obliquely in the tear region in the subsequent tearing process, the bag can be reliably torn along the boundary between the tear region and the adjoining region.

Any of the forms described below is used to bond the porous organic resin film to the heat-fusible resin film with a higher strength than the tear strength of the porous organic resin film in the tear region, and with a strength not higher than the tear strength of the porous organic resin film in the adjoining region.

(a) The thickness of the adhesive layer in the tear region is made larger than that of the adhesive layer in the adjoining region.

(b) The adhesive layer in the tear region is formed by using a material with a higher strength than the tear strength of the porous organic resin film, and the adhesive layer in the adjoining region is formed by using a material with a zero or near-zero adhesive force. The adhesive layer in the adjoining region is formed by coating an adhesive, which is prepared by dispersing polyamide and a small amount of microsilica in toluene, ethyl acetate, and isopropylalcohol, on the surface of the heat-fusible resin film corresponding to the adjoining region, and drying the coated adhesive prior to overlapping the porous organic resin film. An adhesive layer of this sort has a property of repelling an adhesive coated on it. This makes it possible to readily form a layer consisting of an adhesive having a higher strength than the tear strength of the porous organic resin film on the surface of the heat-fusible resin film except for the adjoining region.

(c) The adhesive layer in the tear region is formed by using a material with a higher strength than the tear strength of the porous organic resin film, and the porous organic resin film and the heat-fusible resin film are left unbonded in the adjoining region without forming any adhesive layer between them.

The easily tearable laminated film discussed above will be described in detail below with reference to the accompanying drawings.

Figure 1B:
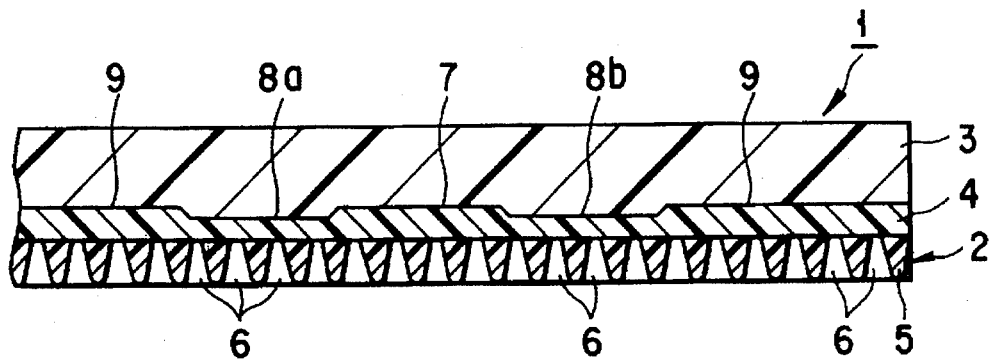
FIG. 1B is a sectional view taken along the line 1B—1B in FIG. 1A.
Figure 2:
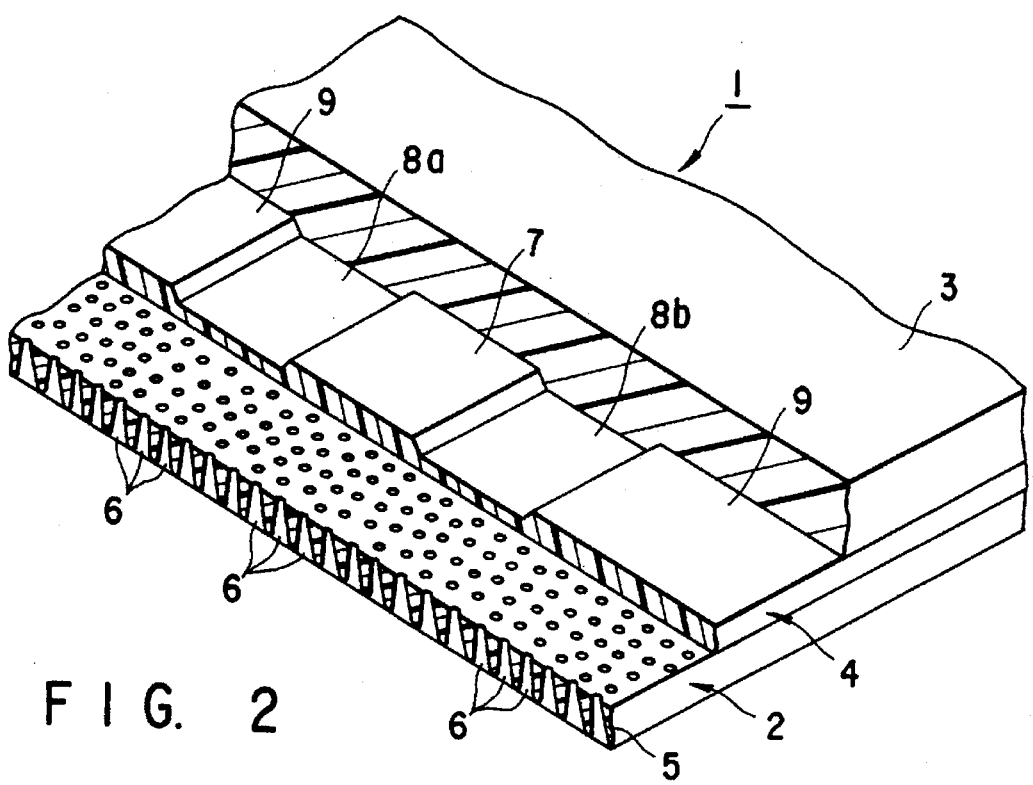
FIG. 2 is a partially cutaway perspective view of the easily tearable laminated film shown in FIGS. 1A and 1B.

FIG. 1A is a plan view of an easily tearable laminated film having a band-like tear region. FIG. 1B is a sectional view taken along the line 1B—1B in FIG. 1A. FIG. 2 is a partially cutaway perspective view of the easily tearable laminated film shown in FIGS. 1A and 1B. An easily tearable laminated film 1 consists of a porous organic resin film 2, a heat-fusible resin film 3 and an adhesive layer 4 interposed between these films 2 and 3.

The porous organic resin film 2 is made of an organic resin film 5 in which a large number of fine through pores 6 are formed. Therefore, the film 2 has a higher tearability than that of an organic resin film having no pores. In a band-like tear region 7, the adhesive layer 4 is made thick and bonds the porous organic resin film 2 to the heat-fusible resin film 3 with a higher strength than the tear strength of the porous organic resin film 2. In band-like adjoining regions 8a and 8b adjacent to the tear region 7, the adhesive layer 4 is made thinner than the adhesive layer in the tear region 7 and bonds the porous organic resin film 2 to the heat-fusible resin layer 3 with a strength not higher than the tear strength of the porous organic resin film 2. In a region 9 except for the tear region 7 and the adjoining regions 8a and 8b, the adhesive layer 4 is made thick as in the tear region 7 and bonds the porous organic resin film 2 to the heat-fusible resin film 3 with a higher strength than the tear strength of the porous organic resin film 2.

Note that in the easily tearable laminated film 1, a plurality of sets of the band-like tear region 7 and a plurality of the adjoining regions 8a and 8b are formed at predetermined intervals in, e.g., the widthwise direction.

Figure 3:
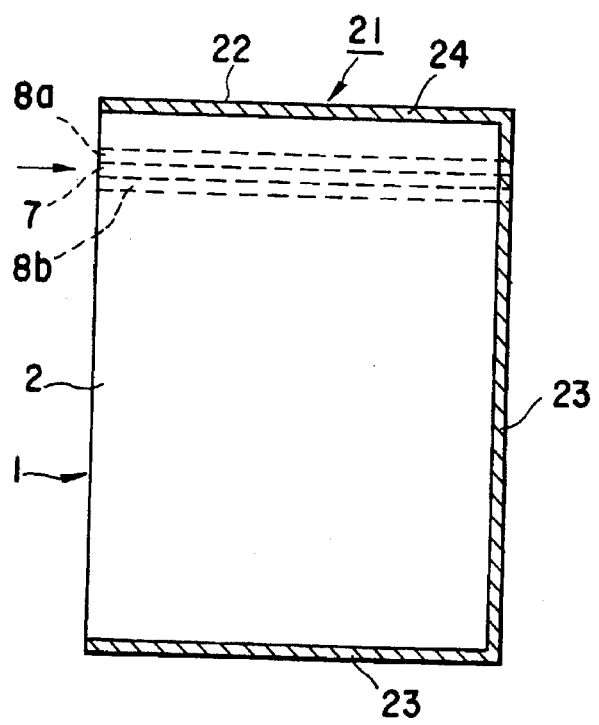
FIG. 3 is a front view showing a sealed bag manufactured from the easily tearable laminated film shown in FIGS. 1A and 1B.

FIG. 3 is a front view showing a sealed bag manufactured from the above easily tearable laminated film. A sealed bag 21 is manufactured by cutting the easily tearable laminated film 1 into desired dimensions, overlapping the cut films such that the porous organic resin films 2 are located outside, and heat-sealing the heat-fusible resin films 3 at two perpendicular edges such that the band-like tear region 7 is parallel to an opening portion 22. The opening portion 22 is closed by heat sealing after desired contents (e.g., snacks) are placed in the bag. Note that in FIG. 3, reference numeral 23 denotes a sealed portion; and 24, an opening-side sealed portion.

This sealed bag 21 is made of the easily tearable laminated film 1 in which, as illustrated in FIG. 2, in the band-like tear region 7, the adhesive layer 4 is made thick and bonds the porous organic resin film 2 to the heat-fusible resin film 3 with a higher strength than the tear strength of the porous organic resin film 2, and in the band-like adjoining regions 8a and 8b adjacent to the tear region 7, the adhesive layer 4 bonds the porous organic resin film 2 to the heat-fusible resin layer 3 with a strength not higher than the tear strength of the porous organic resin film 2. Therefore, when a tearing force is applied by fingers of both hands to the end portion of the tear region 7 of the sealed bag 21 in the direction indicated by the arrow in FIG. 3, the bag is torn in the tear region 7 in the early stages of tear. Even if the sealed bag 21 is torn obliquely in the tear region 7 in the subsequent tearing process, the bag can be linearly torn along the boundary between the tear region 7 and the band-like adjoining region 8a or 8b.

Figure 4:
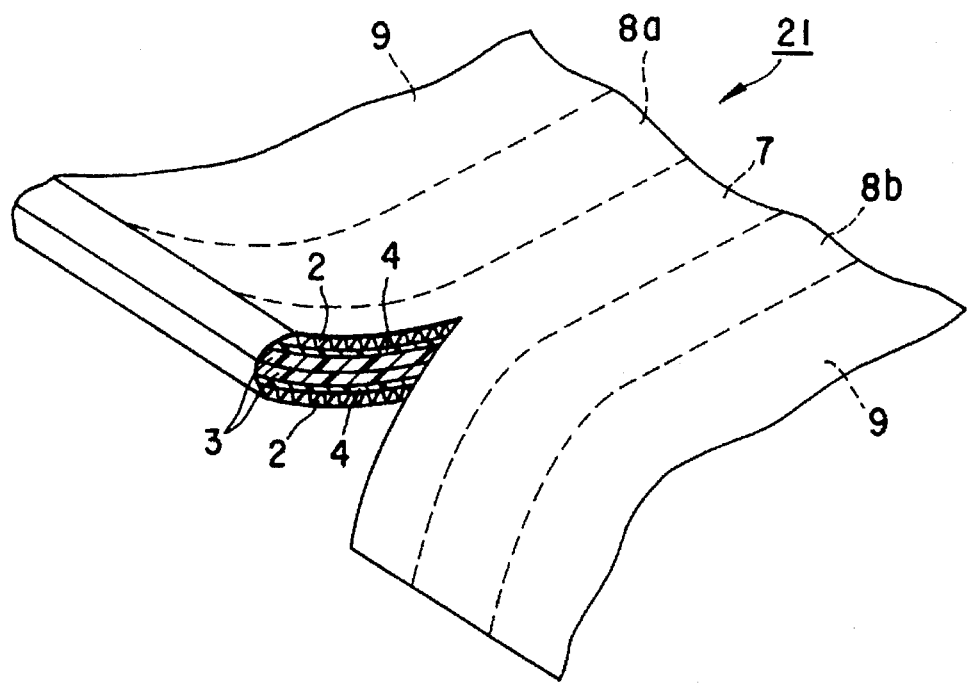
FIG. 4 is a perspective view showing the state in which the sealed bag in FIG. 3 is torn in a tear region.

That is, a large number of the through pores 6 are formed in the porous organic resin film 2 arranged on each outer surface of the sealed bag 21. These through pores 6 form tear starting points in the tearing direction and also decrease the tear strength to facilitate tear. In addition, in the tear region 7, the porous organic resin film 2 and the heat-fusible resin film 3 are bonded with a higher strength than the tear strength of the porous organic resin film 2. Therefore, the tearability of the heat-fusible resin film 3 which is hard to tear depends upon the porous organic resin film 2 which is readily tearable. As a result, when a force exceeding the tear strength of the porous organic resin film 2 is applied by fingers of both hands to the end of the band-like tear region 7 in the arrow direction in FIG. 3, this force tears not only the porous organic resin film 2 but the heat-fusible resin film 3 which is bonded to the film 2 with a higher strength than the tear strength of the film 2. As shown in FIG. 4, therefore, although the heat-fusible resin film 3 is difficult to tear, in the tear region 7, it is possible to easily and reliably tear the easily tearable laminated films 1 having the two overlapped heat-fusible resin films 3. It is particularly desirable that the porous organic resin film 2 used have a tear strength which is 0.5 times or less, and preferably 0.35 times or less the tear strength of an organic resin film having no pores, and that the adhesive force between the porous organic resin film 2 and the heat-fusible resin film 3 be 1.2 times or more, and preferably 1.5 times or more the tear strength of the porous organic resin film 2. In this case, it is possible to more easily and reliably tear the easily tearable laminated films 1 having the two overlapped heat-fusible resin films 3 in the band-like tear region 7.

Figure 5:
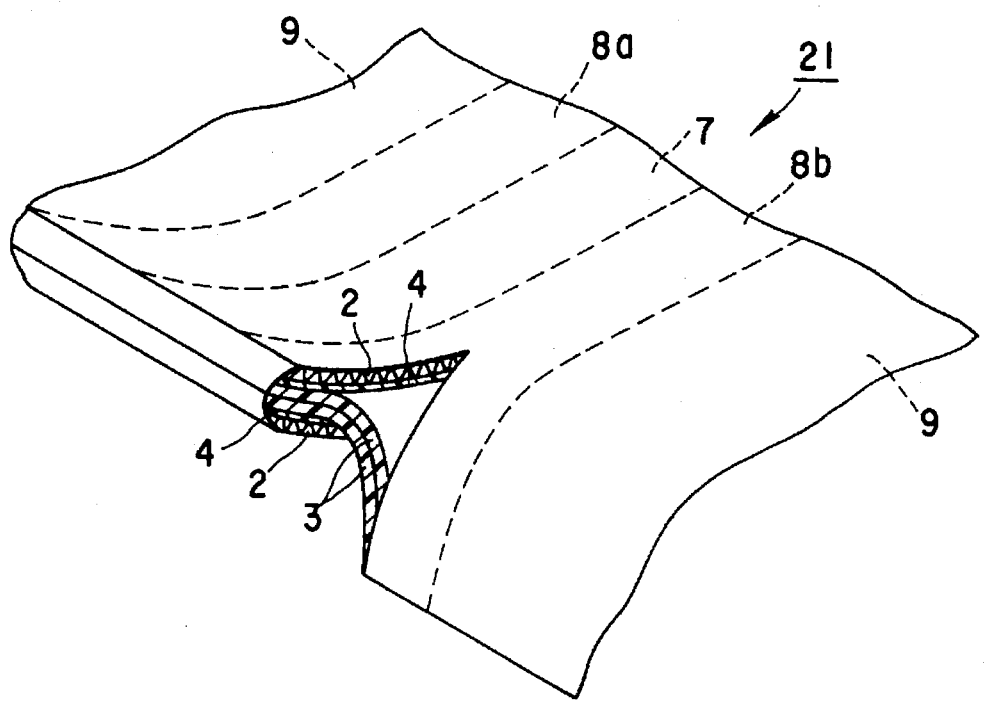
FIG. 5 is a perspective view showing the state in which the sealed bag in FIG. 3 is torn in an adjoining region.

On the other hand, when a force similar to the one discussed above is applied to the end of the band-like adjoining region 8b of the sealed bag 21 in a direction analogous to the above-mentioned direction, the porous organic resin film 2 and the heat-fusible resin film 3 are pealed in the torn portion since the adhesive force between the films 2 and 3 in the adjoining region 8b is lower than the tear strength of the film 2. If the films 2 and 3 are thus peeled, the hardly tearable nature of the heat-fusible resin film 3 emerges in the torn portion independently of the porous organic resin film 2 which is easily tearable. Consequently, as shown in FIG. 5, in the vicinity of the tear starting point, the porous organic resin film 2 alone is torn, and the heat-fusible resin film 3 is only stretched but difficult to tear any further. Therefore, the adjoining regions 8a and 8b function as stoppers which are not torn even with application of a force exceeding the tear strength of the porous organic resin film 2 or with application of the tearing force by which the tear region 7 is torn. It is particularly desirable that the adhesive force between the porous organic resin film 2 and the heat-fusible resin film 3 in the adjoining regions 8a and 8b be preferably 0.8 times or less, and more preferably 0.5 times or less the tear strength of the porous organic resin film 2. In this case, the porous organic resin film 2 and the heat-fusible resin film 3 are readily peeled when the tearing force is applied on the adjoining regions 8a and 8b. This allows the adjoining regions 8a and 8b to well function as the stoppers with respect to the tear region 7.

As discussed above, when a force exceeding the tear strength of the porous organic resin film 2 is applied by fingers of both hands to the end of the band-like tear region 7 of the sealed bag 21 in the arrow direction in FIG. 3, the sealed bag 21 can be easily torn in the tear region 7, as in FIG. 4, in the early stages of tear. Even if the sealed bag is torn obliquely in the tear region in the subsequent tearing process, the band-like adjoining regions 8a and 8b function as the stoppers which inhibit the tear. Consequently, as illustrated in FIG. 6, the sealed bag 21 can be readily and reliably torn along the boundary between the tear region 7 and the adjoining region 8a (or 8b). Therefore, the sealed bag 21 has good linear cut properties, and this prevents spill or scattering of the contents when a sealed bag is torn in an unexpected direction, such as use of conventional easily tearable sealed bags.

Note that sealed bags having structures shown in FIGS. 7 and 8 can be manufactured from the easily tearable laminated film with the above structure.

In a sealed bag 21 illustrated in FIG. 7, a band-like tear region 7 parallel to an opening portion 22 is arranged only on one surface. A band-like tongue 25 extends from the end of the tear region 7 along its lengthwise direction. When the sealed bag 21 with this structure is held in one hand and the tongue 25 is pulled by the other hand along the tear region 7, the bag is torn along the boundary between the band-like tear region 7 and one of band-like adjoining regions 8a and 8b by the actions illustrated in FIGS. 4 to 6. Consequently, the bag 21 is torn within the width of the tear region 7, and only one surface of the bag 21 is linearly opened.

A sealed bag 21 shown in FIG. 8 has a structure in which a V-shaped notch 26 is formed in a portion of a band-like tear region 7 in a heat-sealed portion 23 on one side. The sealed bag 21 with this structure can be notably improved in the tearability in the early stages of tear, since the V-shaped notch 26 can be used as the starting point of tear.

An easily tearable laminated film 1 shown in FIG. 9 uses a porous organic resin film 2 which is formed by forming a large number of fine non-through pores 10 in an organic resin film 5 and therefore has a higher tearability than that of an organic resin film having no pores. The surface of the porous organic resin film 2 away from the surface in which the non-through pores 10 are formed is used as the surface to be bonded to a heat-fusible resin film 3. The rest of the arrangement is identical with that illustrated in FIG. 2. A sealed bag 21 manufactured from the easily tearable laminated film 1 including the porous organic resin film 2 having a large number of the non-through pores 10 can be easily and reliably torn, when opened, along the boundary between the tear region 7 and the adjoining region 8a or 8b, as in the case of the bag using the easily tearable laminated film 1, FIG. 2, including the porous organic resin film 2 having a large number of the through pores 6.

In the easily tearable laminated film 1 shown in FIG. 9, the surface of the porous organic resin film 2 away from the surface in which the non-through pores 10 are formed is used as the surface to be bonded to the heat-fusible resin film 3. However, it is also possible to use the surface of the porous organic resin film 2 in which the non-through pores are formed as the surface to be bonded to the heat-fusible resin film 3.

The easily tearable laminated film with a high tearability shown in FIGS. 1A, 1B, and 2 or in FIG. 9 can be effectively used as a sealed bag for a variety of liquid or powder products such as liquid soup, powder soup, fine granulated sugar, instant coffee containing sugar and powder cream, and powder medicines.

An easily tearable laminated film having a V-shaped or ring-like tear region will be described below.

Figure 10A:
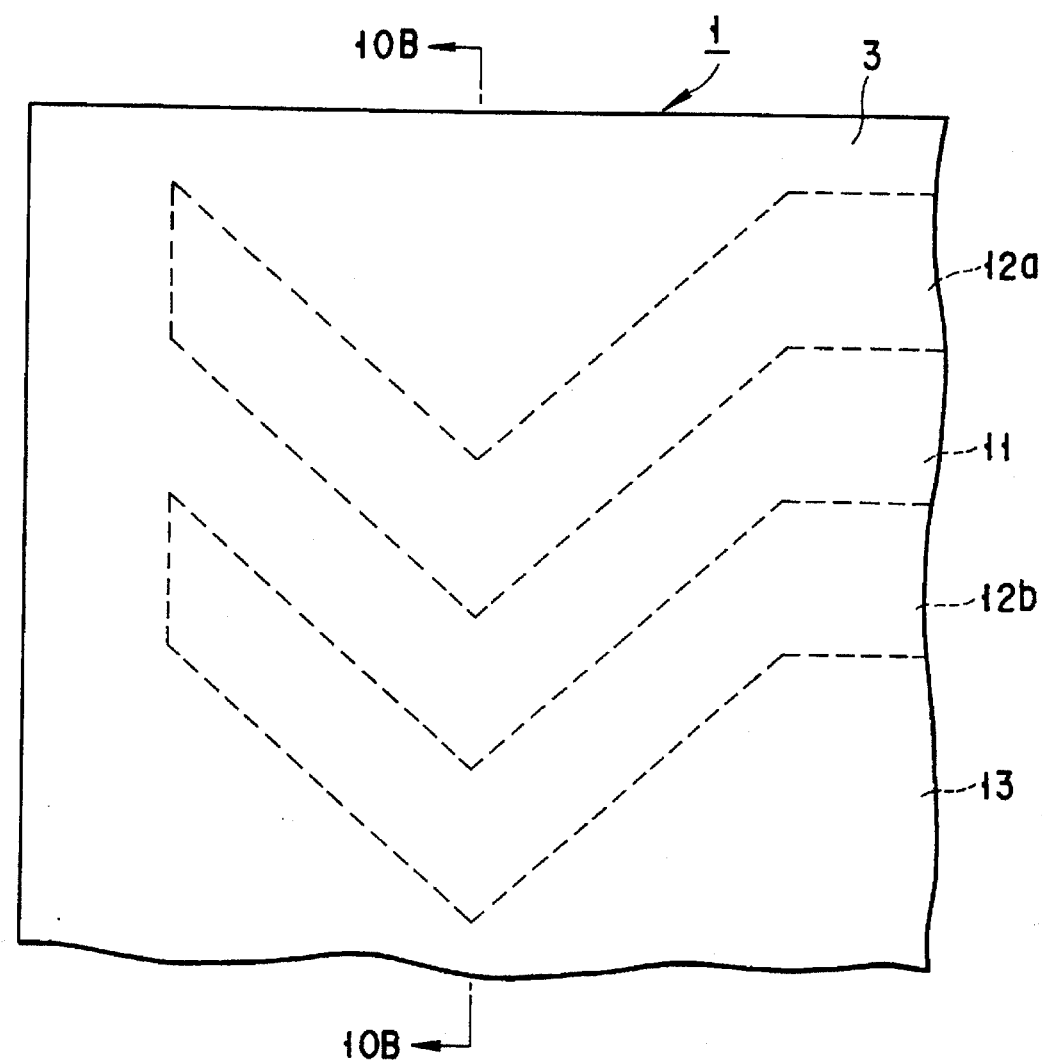
FIG. 10A is a plan view showing still another easily tearable laminated film according to the present invention, which has a V-shaped tear region.
Figure 10B:
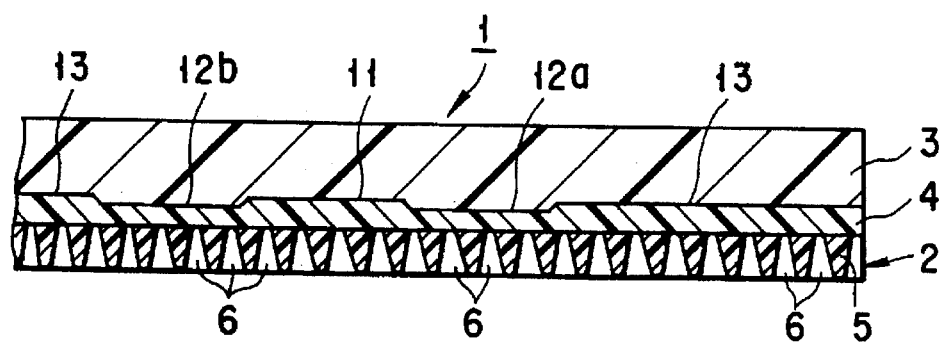
FIG. 10B is a sectional view taken along the line 10B—10B in FIG. 10A.

FIG. 10A is a plan view of an easily tearable laminated film having a V-shaped tear region. FIG. 10B is a sectional view taken along the line 10B—10B in FIG. 10A. This easily tearable laminated film 1 consists of a porous organic resin film 2 and a heat-fusible resin film 3. The porous organic resin film 2 is formed by forming a large number of fine through pores 6 in an organic resin film 5 and hence has a higher tearability than that of an organic resin film having no pores. The easily tearable laminated film 1 is laminated by interposing an adhesive layer 4 between these films 2 and 3. In a V-shaped tear region 11, the adhesive layer 4 is made thick and bonds the porous organic resin film 2 to the heat-fusible resin layer 3 with a higher strength than the tear strength of the porous organic resin film 2. In V-shaped adjoining regions 12a and 12b adjacent to the tear region 11, the adhesive layer 4 is made thinner than the adhesive layer in the tear region 11 and bonds the porous organic resin film 2 to the heat-fusible resin layer 3 with a strength not higher than the tear strength of the porous organic resin film 2. In a region 13 excluding the V-shaped adjoining regions 12a and 12b, which is connected to the end of the V-shaped tear region 11, the adhesive layer 4 is made thick as in the tear region 11 and bonds the porous organic resin film 2 to the heat-fusible resin film 3 with a higher strength than the tear strength of the porous organic resin film 2.

FIG. 11 is a perspective view of a sealed bag which is manufactured from the easily tearable laminated film with the structure shown in FIGS. 10A and 10B and used for a flat, parallelepiped case accommodating a cassette tape or a floppy disk. A sealed bag 31 is manufactured as follows. That is, the easily tearable laminated film 1 is cut into desired dimensions and overlapped on the case such that the porous organic resin film 2 is located outside. The film 1 is so heat-sealed at three side surfaces of the case that the V-shaped tear region 11 is arranged on the front square surface of the case and on the rear square surface opposite to the front surface. Thereafter, the film 1 is folded and heat-sealed on the opposing side surfaces. A band-like tongue 32 obliquely extends from the end of the tear region 11, which is located at the side edge of the case, in the lengthwise direction of the region 11.

In the sealed bag 31 with this arrangement, in the V-shaped tear region 11, the adhesive layer 4 is made thick and bonds the porous organic resin film 2 to the heat-fusible resin film 3 with a higher strength than the tear strength of the porous organic resin film 2. In the V-shaped adjoining regions 12a and 12b, the adhesive layer 4 is made thinner than that in the tear region 11 and bonds the porous organic resin film 2 to the heat-fusible resin 3 with a strength not higher than the tear strength of the porous organic resin film 2. Therefore, when the bag 31 is held in one hand and the tongue 32 is pulled by the other hand along the V-shaped tear region 11, the bag 31 is torn along the boundaries between the tear region 11 and the adjoining regions 12a and 12b adjacent to the tear region 11 by actions similar to those explained above with reference to FIGS. 4 to 6. Consequently, the bag 31 is torn across the width of the V-shaped tear region 11. The remaining film has the shape of the projecting part of the V shape in the upper portion, and the shape of the recessed part of the V shape in the lower portion. Even if the sealed bag remains on the case, therefore, the upper portion of the remaining film can be readily removed, and the lower portion of the film can be easily torn and removed from the bottom of the V shape.

That is, conventional sealed bags used for flat, parallelepiped cases accommodating cassette tapes or floppy disks have a structure in which a tape is provided near the upper portion of a bag along the upper side of a case. When a sealed bag of this type is torn by pulling the tape, a remaining narrow film on the upper portion of the case can be removed relatively easily. However, a remaining wide film on the lower portion cannot be removed unless the film is cut by, e.g., a knife, since the shape of the upper edge of the film is linear, i.e., similar to the shape of the open bag. Therefore, when the sealed bag 31 shown in FIG. 11 is manufactured by using the easily tearable laminated film 1 having the V-shaped tear region 11 (FIGS. 10A and 10B), the films remaining on the case after tear can be very easily removed without cutting the films with a knife or the like.

FIG. 12A is a plan view of an easily tearable film having a ring-like tear region. FIG. 12B is a sectional view taken along the line 12B—12B in FIG. 12A. This easily tearable film 1 consists of a porous organic resin film 2 and a heat-fusible resin film 3. The porous organic resin film 2 is formed by forming a large number of fine through pores 6 in an organic resin film 5 and hence has a higher tearability than that of an organic resin film having no pores. The easily tearable laminated film 1 is laminated by interposing an adhesive layer 4 between these films 2 and 3. In a ring-like tear region 14, the adhesive layer 4 is made thick and bonds the porous organic resin film 2 to the heat-fusible resin film 3 with a higher strength than the tear strength of the porous organic resin film 2. In a ring-like adjoining region 15a outside the tear region 14 and in a circular adjoining region 15b inside the tear region 14, the adhesive layer 4 is made thinner than the adhesive layer in the tear region 14 and bonds the porous organic resin film 2 to the heat-fusible resin film 3 with a strength not higher than the tear strength of the porous organic resin film 2. In a region 16 which is connected to the outer peripheral portion of the ring-like tear region 14 through a portion of the ring-like adjoining region 15a and located outside the adjoining region 15a, the adhesive layer 4 is made thick as in the tear region 14 and bonds the porous organic resin film 2 to the heat-fusible resin film 3 with a higher strength than the tear strength of the porous organic resin film 2.

FIG. 13 is a perspective view showing a container for containing a fluid food such as yogurt or pudding, which has the easily tearable laminated film 1 as its lid. A disk-like lid 42 made of the easily tearable laminated film 1 is attached to the edge of the opening of a container main body 41 which is made of, e.g., polypropylene and contains, e.g., yogurt. The lid 42 has a tongue 43 which is formed by cutting the easily tearable laminated film 1 along the outer peripheral edge of the ring-like adjoining region 15a such that a band-like portion projects from the portion connected to the adjoining region 15a. The lid 42 is arranged such that the porous organic resin film 2 is located outside and the heat-fusible resin film 3 is in contact with the opening edge of the container main body 41. Yogurt is liquid-tightly contained in the container by heat-sealing the heat-fusible resin film 3 to the opening edge of the container main body 41.

In the lid 42 attached to the container as discussed above, the adhesive layer 4 is made thick in the region 16 in a portion of the tongue 43 and in the ring-like tear region 14 connected to the region 16. Therefore, in these regions, the adhesive layer 4 bonds the porous organic resin film 2 to the heat-fusible resin film 3 with a higher strength than the tear strength of the porous organic resin film 2. In the ring-like adjoining region 15a and the circular adjoining region 15b, the adhesive layer 4 is made thinner than that in the tear region 14 and bonds the porous organic resin film 2 to the heat-fusible resin film 3 with a strength not higher than the tear strength of the porous organic resin film 2. Therefore, when the container main body 41 is held in one hand and the tongue 43 is pulled by the other hand toward the ring-like tear region 14 of the lid 42, the lid 42 is torn along the boundary between the tear region 14 and the ring-like adjoining region 15a and the boundary between the tear region 14 and the circular adjoining region 15b by actions analogous to those illustrated in FIGS. 4 to 6. Consequently, the lid 42 except for a portion near the opening edge of the container main body 41 can be readily removed to open the container, without spilling the yogurt out of the container main body 41, unlike conventional containers.

That is, conventional containers for containing fluid food such as yogurt or pudding have the following structure. A heat-fusible resin film and a rigid organic film such as a polypropylene film are laminated via an adhesive layer, and the resultant laminated film is so punched as to form a tongue integrally with the outer peripheral portion, thereby forming a lid. This lid is attached to the edge of the opening of a container main body made of, e.g., polypropylene and containing, e.g., yogurt, such that the heat-fusible resin film is in contact with the opening edge. By heat-sealing the heat-fusible resin film to the opening edge of the container main body, the yogurt is liquid-tightly contained in the container. In opening this container, the tongue is pulled by a hand toward the center of the container to peel the heat-sealed portion of the heat-fusible resin film and the opening edge of the main body, thereby removing the entire lid. It is unfortunate that the heat-sealing strength between the heat-fusible resin film and the opening edge of the main body cannot be extremely decreased to ensure the liquid tightness. Therefore, a strong force is required to peel the heat-sealed portion of the heat-fusible resin film from the opening edge of the main body. As a result, in opening the container, the yogurt spills out of the container with application of an excess force, or the lid is torn in a portion other than the heat-sealed portion to make it impossible to completely open the container. Since, the lid 42 of the container shown in FIG. 13 is manufactured by using the easily tearable laminated film 1 having the ring-like tear region 14, FIGS. 12A and 12B, unlike conventional containers, in opening the container the lid 42, excluding the portion near the opening edge of the container main body 41, can be readily removed without spilling the yogurt out of the container main body 41.

The easily tearable laminated film according to the present invention discussed above is manufactured by a method of manufacturing an easily tearable laminated film, comprising the steps of:

arranging a first roll having a surface on which a large number of particles having acute corner portions and a Mohs hardness of 5 or more are deposited, and a second roll having a smooth surface, such that the first and second rolls oppose each other;

passing a rigid, elongated organic resin film between the first and second rolls by rotating the first and second rolls in opposite directions, and controlling a pressure applied to the elongated organic resin film passing between the first and second rolls such that the pressure is uniform throughout an entire film surface in contact with each of the first and second rolls, thereby performing the acute corner portions of the particles on the surface of the first roll to press into the elongated organic resin film to form an elongated porous organic resin film having a large number of fine through and/or non-through pores on the entire film surface;

coating a dry-laminating adhesive on one surface of the elongated porous organic resin film such that a thickness of the dry-laminating adhesive is large in a tear region and smaller in an adjoining region adjacent to the tear region than the thickness in the tear region, and drying the dry-laminating adhesive; and overlapping an elongated heat-fusible resin film on the adhesive coated surface of the elongated porous organic resin film, and laminating the elongated heat-fusible resin film and the elongated porous organic resin film by applying pressure and heat.

The first roll has a metal roll main body and particles having acute corners and a Mohs hardness of 5 or more. These particles are deposited on the surface of the roll main body by, e.g., an electro-deposition method or a bonding method using an organic or inorganic binder. It is desirable that these particles be deposited at a ratio of 70% or more on the surface of the first roll.

The metal roll main body consists of, e.g., iron or an iron alloy. The roll main body can also be a roll made from iron or an iron alloy and having a surface covered with a nickel-plating layer or a chromium-plating layer.

Examples of the particle having a Mohs hardness of 5 or more are a carbide alloy particle (e.g., a tungsten carbide particle), a silicon carbide particle, a boron carbide particle, a sapphire particle, a cubic boron nitride (CBN) particle, and a natural or synthetic diamond particle. In particular, a natural or a synthetic diamond particle with a high hardness and a high strength is desirable. It is preferable to use particles with a particle size of 10 to 100 μm and a particle size variation of 5% or less.

If diamond particles are to be used as a large number of particles with a Mohs hardness of 5 or more, these diamond particles are preferably deposited on the surface of the roll main body by electro-deposition. Electro-deposition of the diamond particles onto the roll main body is done by a method including the steps of: degreasing the roll main body; masking the end portions of surface and the shaft of the roll main body; degreasing and washing the roll main body with water; washing the roll main body with an acid and with water; forming a hard plating layer consisting primarily of, e.g., nickel on the exposed surface of the roll main body and temporarily adhering a large number of diamond particles on the hard plating layer; performing a hard plating treatment for portions of the hard plating layer between the diamond particles such that acute corner portions of the diamond particles sufficiently protrude, thereby fixing the diamond particles to the roll main body; and removing the masking material. In this electro-deposition, it is desirable that an Ni layer or a Cr layer be formed beforehand on the electro-deposition surface of the roll main body by using a plating technique or the like. By the use of such an electro-deposition technique, it is possible to deposit the diamond particles on the surface of the roll main body with a very high strength.

As the second roll, it is possible to use any of an iron roll, an iron alloy roll, an iron roll whose surface is Ni-plated or Cr-plated, a stainless steel roll, and a metal roll having the surface entirely covered with a polymeric resin layer. Various types of resins can be used as this polymeric resin. Suitable examples are a urethane resin, silicone rubber, and fluorine-based rubber, each of which has a large cushioning effect with respect to the elongated organic resin film.

Perforation of the through or non-through pores in the elongated organic resin film is accomplished by controlling the pressure applied to the elongated organic resin film passing between the first and second rolls.

In the step of coating the dry-laminating adhesive, it is also possible to coat the adhesive only in the tear region without coating the adhesive in the adjoining regions.

A method of manufacturing the easily tearable laminated film having the band-like tear region discussed above will be described in detail below with reference to FIGS. 14 to 19.

Figure 14:
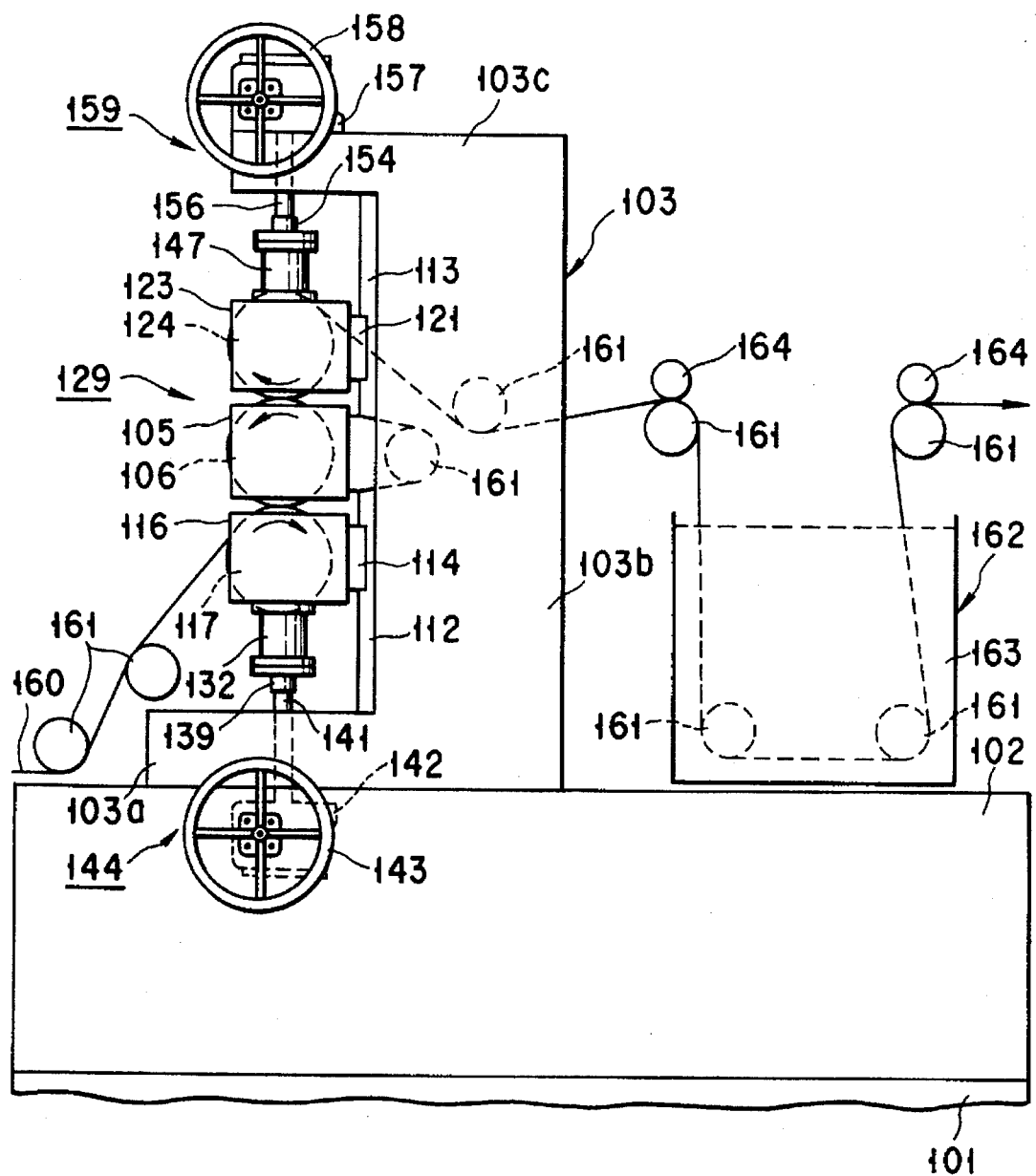
FIG. 14 is a front view showing a pore forming apparatus used in the manufacture of an easily tearable laminated film according to the present invention.
Figure 15:
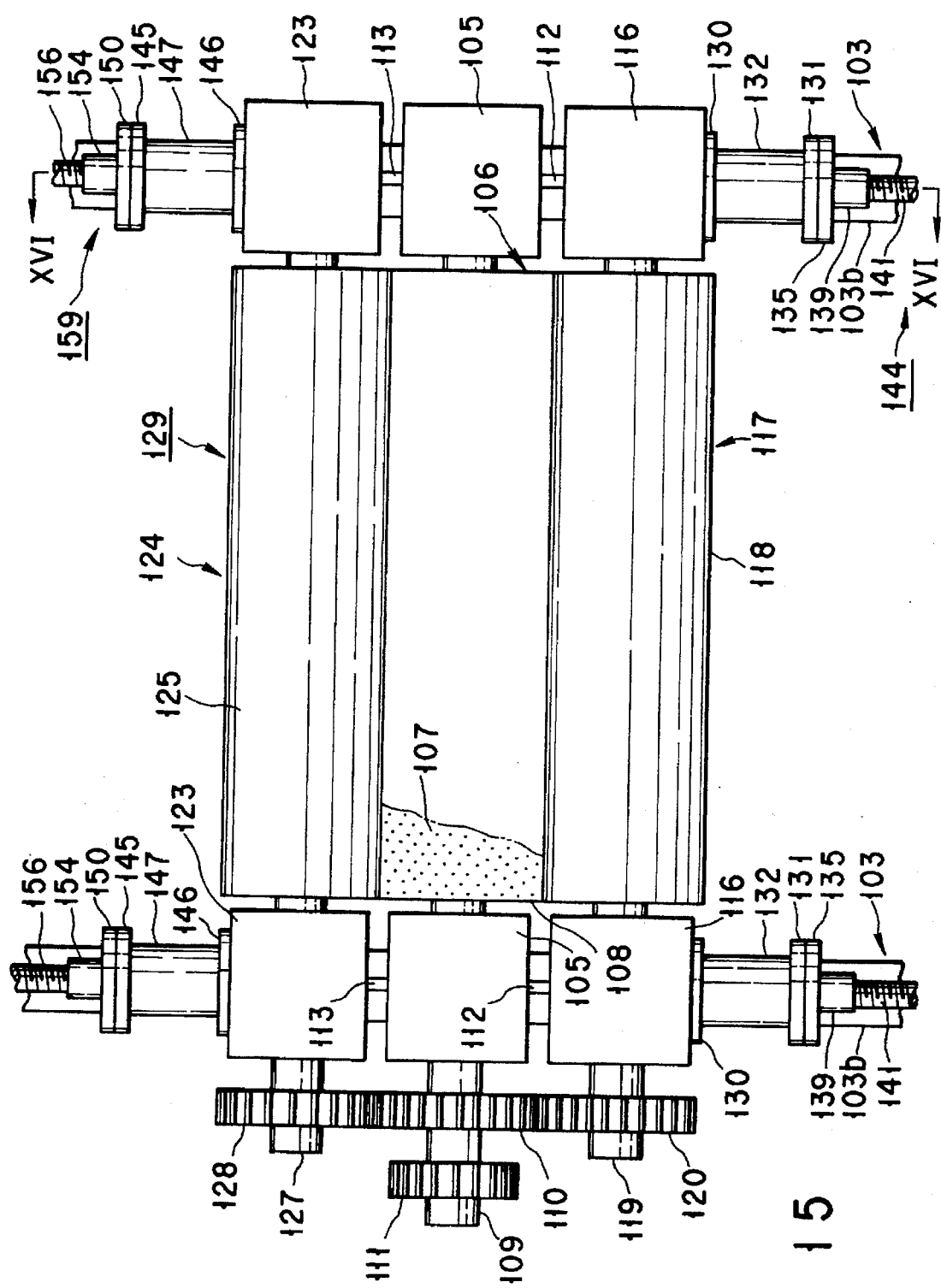
FIG. 15 is a side view showing the major components of the pore forming apparatus in FIG. 14.
Figure 16:
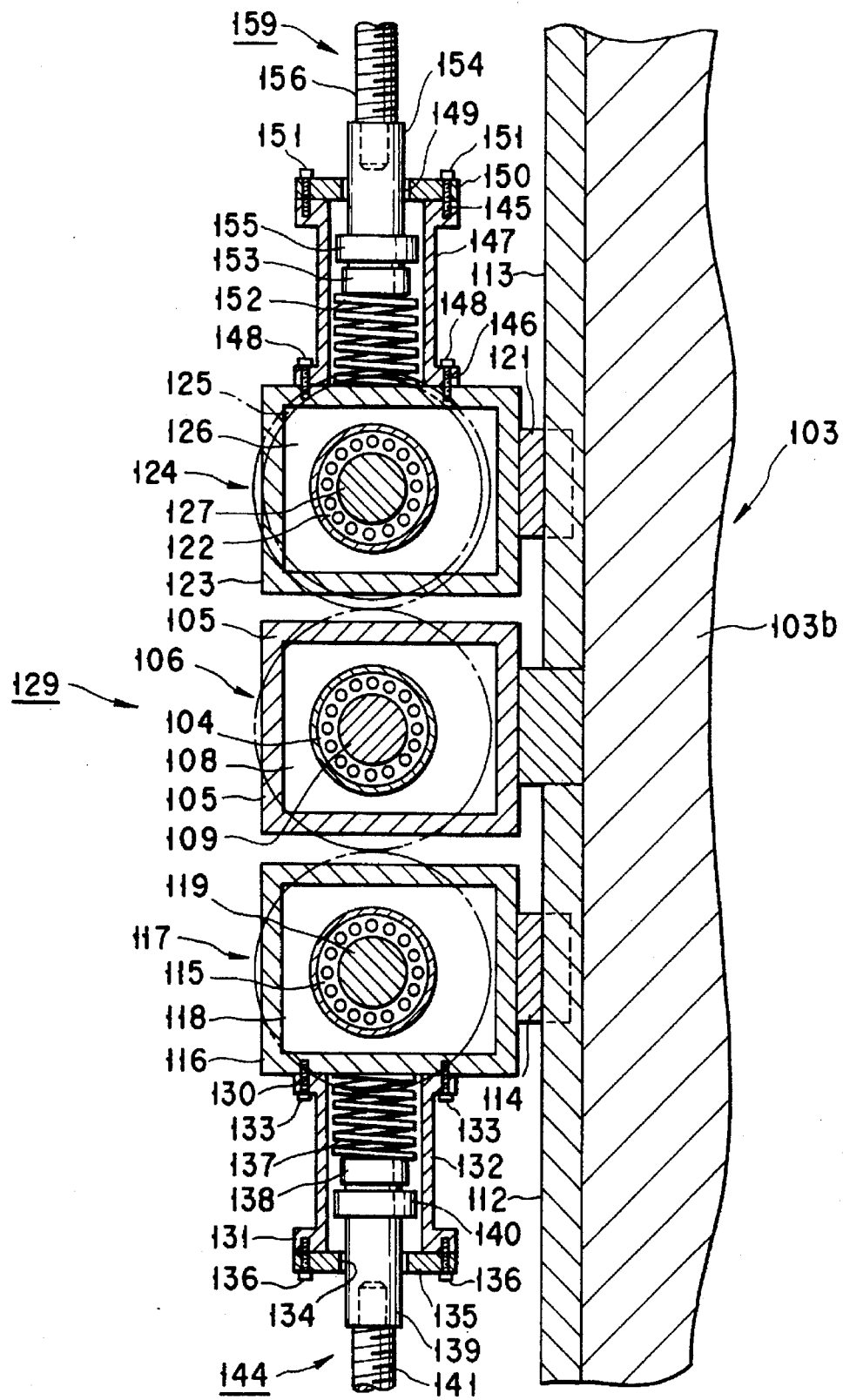
FIG. 16 is a sectional view taken along the line XVI—XVI in FIG. 15.
Figure 17:
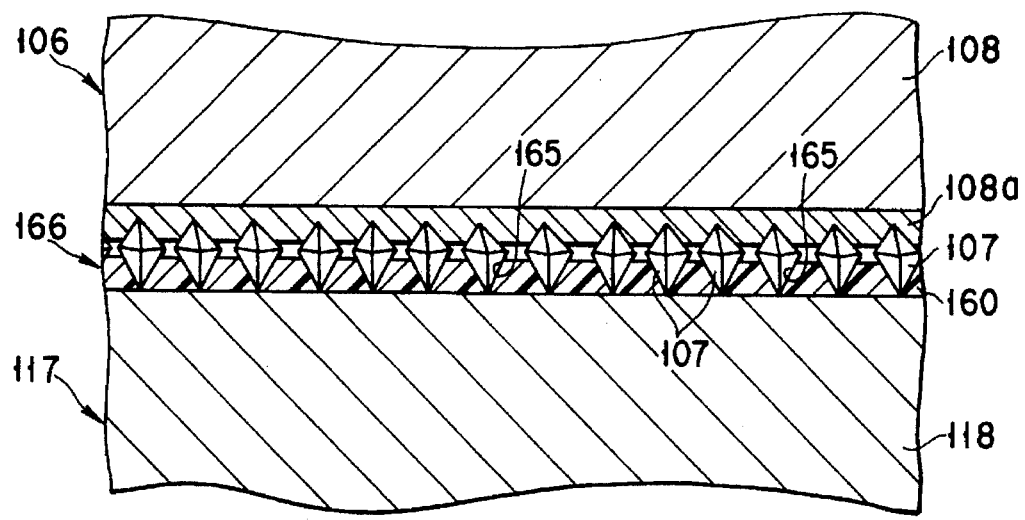
FIG. 17 is an enlarged sectional view showing the main parts of first and second rolls of the pore forming apparatus in FIG. 14.

FIG. 14 is a front view showing a pore forming apparatus for forming a porous organic resin film. FIG. 15 is a side view showing the main parts of the pore forming apparatus in FIG. 14. FIG. 16 is a sectional view taken along the line XVI—XVI in FIG. 15. FIG. 17 is an enlarged sectional view showing the major components of the first and second rolls of the pore forming apparatus in FIG. 14.

In FIG. 14, reference numeral 101 denotes a bed. A table 102 is provided on the upper surface of the bed 101 except for a portion near the right end of the bed. Two hook-shaped frames 103 are arranged on the table 102 with a predetermined distance between them in the widthwise direction of the table 102. Each of the frames 103 consists of a lower plate 103a, a side plate 103b, and an upper plate 103c. A first box 105 incorporating a bearing 104 is fixed to a portion near the middle portion of each frame 103. A first roll 106 is arranged between the frames 103. As illustrated in FIGS. 15 and 17, the first roll 106 consists of an iron roll main body 108 and a shaft 109. A large number of particles (e.g., synthetic diamond particles) 107 having acute corners and a Mohs hardness of 5 or more are fixed on the surface of the roll main body 108 at an area ratio of 70% or higher by being embodded in an electro-deposited layer 108a containing nickel as its main constituent, such that their acute corner portions sufficiently project from the layer 108a. The shaft 109 extends through the center of the main body 108 to protrude from the two end faces of the main body 108. The two protruding end portions of the shaft 109 are axially supported by the bearings 104 in the first boxes 105. A portion of the shaft 109 at one end (e.g., the left end) of the first roll 106 extends through the box 105. This protruding portion of the shaft 109 is fitted in a gear 111 which meshes with the gear of the driving shaft of a motor (not shown). Therefore, the first roll 106 is rotated, e.g., clockwise when the motor is driven. A gear 110 is fitted on the protruding portion of the shaft 109 between the gear 111 and the left side surface of the box 105.

Rails 112 and 113 are formed on the side plate 103b of each frame 103 at positions below and above, respectively, the first box 105. As shown in FIG. 16, sliders 114 (only one is shown) are arranged on the lower rails 112 so as to be vertically movable along the rails 112. A second box 116 incorporating a bearing 115 is fixed to each slider 114 and thereby can move vertically along the rail 112. A second roll 117 is arranged between the frames 103. The second roll 117 is positioned below the first roll 106 so as to oppose the first roll 106. The second roll 117 consists of a roll main body 118 made of, e.g., stainless steel and a shaft 119. The shaft 119 extends through the center of the roll main body 118 to protrude from the two end faces of the main body 118. The two protruding end portions of the shaft 119 are axially supported by the bearings 115 of the second boxes 116. A portion of the shaft 119 at one end (e.g., the left end) of the second roll 117 protrudes through the second box 116. This protruding portion of the shaft 119 is fitted in a gear 120 which meshes with the gear 110 of the shaft 109 of the first roll 106. Therefore, the second roll 117 can be moved vertically along the rails 112 by the second boxes 116 and the sliders 114. Also, when the motor rotates the shaft 109 of the first roll 106 clockwise, the shaft 119 with the gear 120 meshed with the gear 110 of the shaft 109 rotates counterclockwise. As a result, the second roll 117 is rotated counterclockwise.

As illustrated in FIG. 16, sliders 121 (only one is shown) are arranged on the upper rails 113 so as to be vertically movable on the rails 113. A third box 123 incorporating a bearing 122 is fixed to each slider 121 and thereby can move vertically along the rail 113. A third roll 124 is arranged between the frames 103. The third roll 124 is positioned above the first roll 106 so as to oppose the first roll 106. The third roll 124 consists of an iron roll main body 126 and a shaft 127. A polymeric resin layer 125 such as a urethane resin layer is coated on the surface of the roll main body 126. The shaft 127 extends through the center of the main body 126 to protrude from the two end faces of the main body 126. The two protruding end portions of the shaft 127 are axially supported by the bearings 122 of the third boxes 123. A portion of the shaft 127 at one end (e.g., the left end) of the third roll 124 protrudes through the third box 123. This protruding portion of the shaft 127 is fitted in a gear 128 which meshes with the gear 110 of the shaft 109 of the first roll 106. Therefore, the third roll 124 can be moved vertically along the rails 113 by the third boxes 123 and the sliders 121. Also, when the motor rotates the shaft 109 of the first roll 106 clockwise, the shaft 127 with the gear 128 meshed with the gear 110 of the shaft 109 rotates counterclockwise. As a result, the third roll 124 is rotated counterclockwise.

A perforating unit 129 is constituted by the two frames 103, the two first boxes 105, the first roll 106, the two pairs of sliders 114 and 121, the two second boxes 116, the second roll 117, the two third boxes 123, and the third roll 124.

Cylindrical members 132 each having upper and lower flanges 130 and 131 are arranged on the lower walls of the two second boxes 116. As in FIG. 16, each cylindrical member 132 is fixed to the second box 116 by a plurality of screws 133 threadably engaged with the lower wall of the second box 116 through the upper flange 130. A disk 135 with a hole 134 in its center is arranged on the lower flange 131 of each cylindrical member 132. Each disk 135 is fixed by a plurality of screws 136 threadably engaged with the lower flange 131 through the disk 135. A coil spring 137 is housed in each cylindrical member 132 so as to apply an elastic force in the vertical direction. A rod 139 with a pressure sensor 138 attached to its upper end is inserted into each cylindrical member 132 through the hole 134 of the disk 135. Each pressure sensor 138 is in contact with the lower end of the coil spring 137 and thereby can sense the pressure applied on the coil spring 137 when the rod 139 is moved upward. A disk-like guide 140 for smoothly moving the rod 139 up and down is attached to a portion of each rod 139 below the sensor 138. A ball screw 141 is fitted in the lower end portion of each rod 139. These ball screws 141 extend through the lower plates 103a of the frames 103 to protrude into recessed portions (not shown) of the bed 101. Casings (only one is shown) 142 each incorporating a threaded engaging plate (not shown) are provided in the recessed portions. The engaging plate of each casing 142 is threadably engaged with the lower protruding end portion of the ball screw 141. A worm shaft (not shown) which engages with the lower protruding end portion of the ball screw 141 is horizontally inserted into each casing 142. Handles (only one is shown) 143 are attached to the ends on one side of these worm shafts. By rotating the handle 143, therefore, the ball screw 141 engaged with the worm shaft of the handle 143 rotates to raise (or lower) the rod 139 in which this ball screw 141 is fitted. When the rod 139 is moved downward a certain distance or more, the disk-like guide 140 attached to the rod 139 comes in contact with the inner surface of the disk 135 below the cylindrical member 132, moving the cylindrical member 132 downward. Consequently, the second box 116 fixed to the upper end of the cylindrical member 132 is moved down along the lower rail 112 by the slider 114.

A first pressure control means 144 for controlling the pressure applied to a rigid elongated organic resin film passing between the first and second rolls 106 and 117 is constituted by the two cylindrical members 132, the two disks 135, the two coil springs 137, the two pressure sensors 138, the two rods 139, the two disk-like guides 140, the two ball screws 141, the two casings 142, the two worm shafts (not shown), and the two handles 143.

Cylindrical members 147 each having upper and lower flanges 145 and 146 are arranged on the upper walls of the two third boxes 123. As shown in FIG. 16, each cylindrical member 147 is fixed to the third box 123 by a plurality of screws 148 threadably engaged with the upper wall of the third box 123 through the lower flange 146. A disk 150 with a hole 149 in its center is arranged on the upper flange 145 of each cylindrical member 147. Each disk 150 is fixed by a plurality of screws 151 threadably engaged with the upper flange 145 through the disk 150. A coil spring 152 is so housed in each cylindrical member 147 as to apply an elastic force in the vertical direction. The lower end of each coil spring 152 is in contact with the upper wall of the third box 123. A rod 154 with a pressure sensor 153 attached to its lower end is inserted into each cylindrical member 147 through the hole 149 of the disk 150. Each pressure sensor 153 is in contact with the upper end of the coil spring 152 and thereby can sense the pressure applied on the coil spring 152 when the rod 154 is lowered. A disk-like guide 155 for allowing a smooth vertical motion of the rod 154 is attached to a portion of each rod 154 above the sensor 153. A ball screw 156 is fitted in the upper end portion of each rod 154. These ball screws 156 protrude upward through the upper plates 103c of the frames 103. Casings (only one is shown) 157 each incorporating a threaded engaging plate (not shown) are provided on the upper surfaces of the upper plates 103c. The upper protruding end portion of each ball screw 156 is threadably engaged with the engaging plate of the casing 157. A worm shaft (not shown) which engages with the upper protruding end portion of the ball screw 156 is horizontally inserted into each casing 157. Handles (only one is shown) 158 are attached to the ends on one side of these worm shafts. Therefore, by rotating the handle 158, the ball screw 156 engaged with the worm shaft of the handle 158 rotates to raise (or lower) the rod 154 in which this ball screw 156 is fitted. When the rod 154 is raised a certain distance or more, the disk-like guide 155 attached to the rod 154 comes in contact with the inner surface of the disk 150 above the cylindrical member 147, moving the cylindrical member 147 upward. Consequently, the third box 123 fixed to the lower end of the cylindrical member 147 is raised along the rail 113 by the slider 121.

A second pressure control means 159 for controlling the pressure applied to an elongated organic resin film passing between the first and third rolls 106 and 124 is constituted by the two cylindrical members 147, the two disks 150, the two coil springs 152, the two pressure sensors 153, the two rods 154, the two disk-like guides 155, the two ball screws 156, the two casings 157, the two worm shafts (not shown), and the two handles 158.

A supply roll (not shown) of a rigid elongated organic resin film is arranged before the perforating unit 129. A rigid elongated organic resin film 160 of the supply roll is fed to positions between the first and second rolls 106 and 117 and between the first and third rolls 106 and 124 of the perforating unit 129 via two feed rolls 161.

A destaticizing means 162 is arranged after the unit 129. This destaticizing means 162 is placed on the table 102 and includes a vessel 163 containing distilled water and an ultrasonic generating member (not shown) for applying ultrasonic waves to the distilled water. The feed rolls 161 are arranged between the unit 129 and the destaticizing means 162, inside the vessel 163, and after the vessel 163, in order to convey the elongated organic resin film 160 passing between the first and third rolls 106 and 124. Note that abutment rolls 164 are provided for the two feed rolls 161 located before and behind the vessel 163. The destaticizing means 162 is succeeded by a plurality of hot air blasting members (not shown) for drying the elongated organic resin film 160 passing between the feed roll 161 and the abutment roll 164, and a take-up roll (not shown), arranged in this order.

A method of manufacturing an elongated porous organic resin film will be described below, in which a large number of through pores are formed by perforating a rigid, elongated organic resin film 160 between the first and second rolls 106 and 117 of the perforating unit 129 of the pore forming apparatus with the above arrangement.

In the pore forming apparatus having the structure illustrated in FIGS. 14 to 17, by rotating the two handles 143 of the first pressure control means 144, e.g., counterclockwise, the second boxes 116 of the perforating unit 129, which are coupled with the upper ends of the cylindrical members 132, are moved down along the rails 112 of the frames 103 by the sliders 114. Consequently, the second roll 117 axially supported by the bearings 115 of the second boxes 116 is separated a sufficient distance from the first roll 106. Also, by rotating the two handles 158 of the second pressure control means 159, e.g., clockwise, the third boxes 123 coupled with the lower ends of the cylindrical members 147 are moved up along the rails 113 of the frames 103 by the sliders 121. This separates the third roll 124 axially supported by the bearings 122 of the third boxes 123 from the first roll 106 by a sufficient distance. In this state, the elongated organic resin film 160 is fed from the supply roll (not shown) and passed between the first and second rolls 106 and 117 of the unit 129 by the two feed rolls 161. Thereafter, the elongated organic resin film 160 is passed through the vessel 163 of the destaticizing means 162 by the four feed rolls 161. The film 160 is then passed through the hot air blasting members (not shown), and the leading end of the film is wound around the take-up roll (not shown). Note that if the elongated organic resin film 160 is to be passed between first and third rolls 106 and 124, the film 160 is passed so as not to be brought into contact with the surface of the first roll 106.

After the leading end of the elongated organic resin film 160 is taken up by the take-up roll, the two handles 143 of the first pressure control means 144 are rotated clockwise. Consequently, the second boxes 116 coupled to the upper ends of the cylindrical members 132 are raised along the rails 112 of the frames 103 by the sliders 114. This brings the second roll 117, which is axially supported by the bearings 115 of the second boxes 116, into contact with the first roll 106 above the second roll 117. Additionally, by rotating the handles 143 in the same direction, the coil springs 137 are compressed by the sensors 138 at the upper ends of the rods 139. Upon compression of the coil springs 137, a pressure is applied to the lower walls of the second boxes 116, increasing the urging force between the second roll 117 axially supported by the bearings 115 of the second boxes 116 and the first roll 106. This compressing force between the second and first rolls 117 and 106 is detected by the pressure sensors 138, and the forward and reverse rotations of the individual handles 143 are controlled in accordance with the detection results. As a result, the pressure applied to the elongated organic resin film 160 between the first and second rolls 106 and 117 is controlled. By this pressure control to the unit 129 by the first pressure control means 144, a constant pressure is applied to the entire surface of the continuous organic resin film 160 between the first and second rolls 106 and 117 in the widthwise direction, completing the preparation of perforation.

After the preparation of perforation is completed, the ultrasonic generating member (not shown) applies ultrasonic waves to the distilled water contained in the vessel 163 of the destaticizing means 162. Subsequently, the take-up roll is rotated and at the same time the driving shaft of the motor (not shown) is also rotated. This rotation is transmitted from the gear of the driving shaft to the gear 111 of the shaft 109 of the first roll 106, rotating the first roll 106 clockwise. Upon rotation of the first roll 106, the second roll 117 is rotated counterclockwise by transmission of the rotation from the gear 110 of the shaft 109 to the gear 120 of the shaft 119 of the second roll 117. Since the third roll 124 is separated upward a sufficient distance from the first roll 106, the gear 128 of the shaft 127 of the third roll 124 is disengaged from the gear 110 of the shaft 109 of the first roll 106. Therefore, the third roll 124 is not driven by the rotation of the motor, i.e., is free to rotate. Upon rotation of the first and second rolls 106 and 117 in this fashion, a large number of through pores are formed in the lengthwise direction of the elongated organic resin film 160 passing between the rolls 106 and 117.

That is, as illustrated in FIGS. 15 and 17, the first roll 106 includes the iron roll main body 108 having the surface on which the synthetic diamond particles 107 with acute corners are electro-deposited, with the electro-deposited layer 108a, at an area ratio of 70% or more. In addition, the second roll 117 includes the hard-surface roll main body 118 made of, e.g., stainless steel. Therefore, the elongated organic resin film 160 is mechanically perforated in passing between the first and second rolls 106 and 117, since, as shown in FIG. 17, the acute corners of the synthetic diamond particles 107 on the surface of the first roll 106 evenly press into the film 160. As result, a perforated elongated organic resin film (elongated porous organic resin film) 166 having a large number of through pores 165 is formed.

The elongated porous organic resin film thus perforated by the unit 129 is conveyed through the vessel 163 of the destaticizing means 162 by the plurality of rolls 161 and the two abutment rolls 164. The perforation to the elongated organic resin film 160 by the unit 129 is done primarily by friction between the first and second rolls 106 and 117. Therefore, a large quantity of static electricity is generated on the surface of the elongated organic resin film thus perforated, and attracts surrounding dust. The dust adhered to the elongated porous organic resin film is washed away by passing the film through the vessel 163, which contains distilled water, of the destaticizing means 162, and by applying ultrasonic waves to the distilled water by the ultrasonic generating member (not shown). The elongated porous organic resin film is then passed through the hot air blasting members (not shown), removing water from the surface of the film by evaporation. Thereafter, the film is taken up by the take-up roll (not shown).

A method of manufacturing an easily tearable laminated film will be described below, in which the take-up roll on which the elongated porous organic resin film is taken up as discussed above is used as a first supply roll 170 of a dry-laminating apparatus illustrated in FIG. 18.

Figure 18:
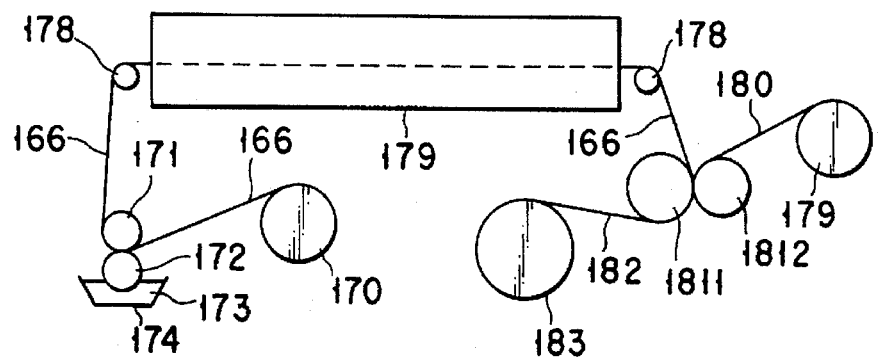
FIG. 18 is a schematic view showing a dry-laminating apparatus used in the manufacture of another easily tearable laminated film according to the present invention.
Figure 19:
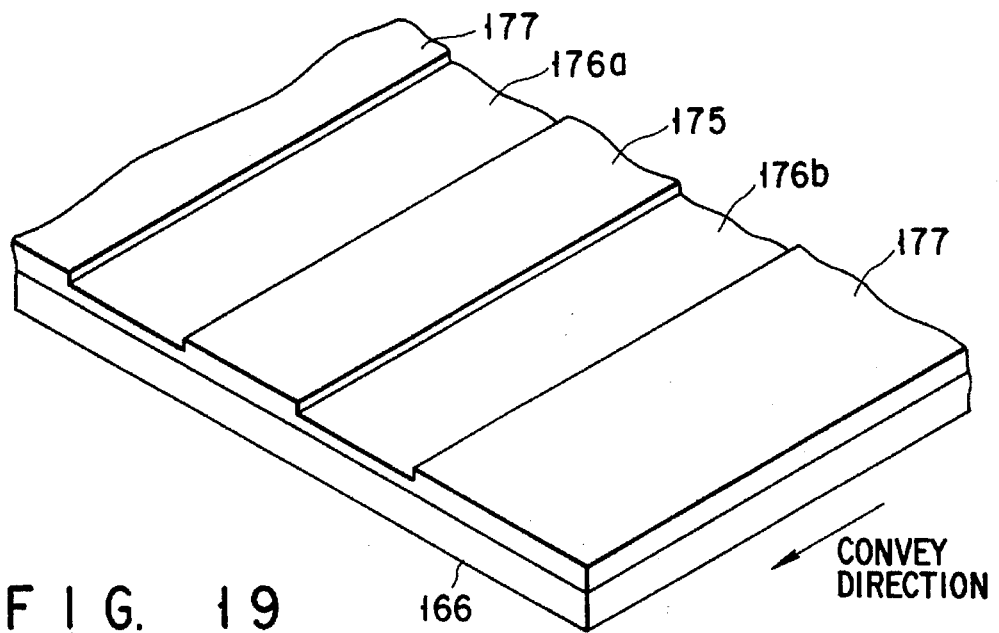
FIG. 19 is a perspective view showing the state in which a coating film is formed on one surface of a porous organic resin film by using a coating roll of the dry-laminating apparatus shown in FIG. 18.

As shown in FIG. 18, the elongated porous organic resin film 166 is supplied from the first supply roll 170 to a portion between an abutment roll 171 and a coating roll 172. A lower portion along the axial direction of the coating roll 172 is immersed in a coating bath 174 containing, e.g., a urethane-based adhesive solution 173. Also, mesh grooves with a fine width are formed on the entire circumferential surface of the coating roll 172. The depths of the grooves are the same in all regions along the circumferential direction and different in adjacent regions along the axial direction. That is, the mesh regions different in the depth of the groove hold different amounts of the adhesive solution; a mesh region in which the grooves are deep holds a large amount of the adhesive solution, and a mesh region in which the grooves are shallow holds a small amount of the adhesive solution. For this reason, by supplying the elongated porous organic resin film 166 to a portion between the abutment roll 171 and the coating roll 172 on which a plurality of the mesh regions holding different amounts of the adhesive are arranged in the axial direction, as illustrated in FIG. 19, a band-like thick coating film 175 along the convey direction of the film 166, band-like thin coating films 176a and 176b on the both sides of the coating film 175, and thick coating films 177 on the sides of the coating films 176a and 176b away from the sides of the coating film 175 are formed on one surface of the elongated porous organic resin film 166. A plurality of sets of the band-like thick coating film 175 and the band-like thin coating films 176a and 176b are formed on one surface of the elongated porous organic resin film 166 at predetermined intervals in the widthwise direction. The thick coating film 175 serves as a tear region after a heat-fusible resin film (to be described later) is laminated. The thin coating films 176a and 176b serve as adjoining regions after the lamination.

Subsequently, the elongated porous organic resin film 166 on which the coating films of different thicknesses are formed is guided by a feed roll 178 and conveyed into a drying oven 179. In the oven 179, the solvent in the coating films is vaporized to leave only the adhesive on the elongated porous organic resin film 166. The film 166 and an elongated heat-fusible resin film 180 supplied from a second supply roll 179 are supplied to a portion between nipple rolls 1811 and 1812 so that the adhesive coated surface of the film 166 is in contact with the film 180. The films 166 and 180 are laminated upon application of pressure and heat. This laminated film (easily tearable laminated film) 182, as shown in FIGS. 1A, 1B, and 2, consists of a porous organic resin film 2, which is formed by forming a large number of fine through pores 6 in an organic resin film 5 and hence has a lower tear strength than that of an organic resin film having no pores, a heat-fusible resin film 3, and an adhesive layer 4 interposed between these films 2 and 3. In a band-like tear region 7, the adhesive layer 4 is made thick and bonds the porous organic resin film 2 to the heat-fusible resin film 3 with a higher strength than the tear strength of the porous organic resin film 2. In band-like adjoining regions 8a and 8b adjacent to the tear region 7, the adhesive layer 4 is made thinner than the adhesive layer in the tear region 7 and bonds the porous organic resin film 2 to the heat-fusible resin film 3 with a strength not higher than the tear strength of the porous organic resin film 3. The laminated film 182 with this structure is taken up by a take-up roll 183.

In this method, an elongated porous organic resin film is formed by perforating a large number of through pores in an elongated organic resin film. Coating films different in thickness are formed in a predetermined region on one surface of the elongated porous organic resin film and dried. The resultant organic resin film is laminated with an elongated heat-fusible resin film by applying heat and pressure. Therefore, an easily tearable laminated film having the structure illustrated in FIGS. 1A, 1B, and 2 can be manufactured by an exceedingly simple process.

Note that in the perforation to the elongated organic resin film, a large number of non-through pores can also be formed by changing the gap between the first and second rolls or by replacing the second roll with one whose surface is covered with a polymeric resin layer.

To manufacture the easily tearable laminated film (FIG. 10) having the V-shaped tear region and the V-shaped adjoining regions different from the tear region in the thickness of the adhesive layer, the dry-laminating step is performed by using a coating roll on which a V-shaped mesh region having a plurality of deep grooves and V-shaped mesh regions adjacent to the first V-shaped mesh region and having a plurality of shallow grooves are formed.

To manufacture the easily tearable laminated film (FIG. 12) having the ring-like tear region and the ring-like and circular adjoining regions different from the tear region in the thickness of the adhesive layer, the dry-laminating step is performed by using a coating roll on which an elliptic, annular mesh region having a plurality of deep grooves and an elliptic, annular mesh region and an elliptic mesh region which are adjacent to the first elliptic, annular mesh region and have a plurality of shallow grooves are formed.

Furthermore, in addition to the dry-laminating method, an extrusion-laminating method can also be used to laminate the elongated porous organic resin film and the elongated heat-fusible resin film.

In the easily tearable laminated film according to the present invention, a film made of a material selected from aluminum, paper, and unwoven fabric and a second heat-fusible resin film can be stacked in this order on the heat-fusible resin film as one film material of the laminated film, and these films can be laminated via adhesive layers. In this case, the heat-fusible resin film, the film made of any of the above materials, and the second heat-fusible resin film are bonded with a higher strength than the tear strength of the porous organic resin film as the other film material of the easily tearable laminated film.

The thickness of the aluminum film (aluminum foil) is normally 5 to 20 μm.

The paper preferably has an amount of 30 to 150 g/m².

Figure 20A:
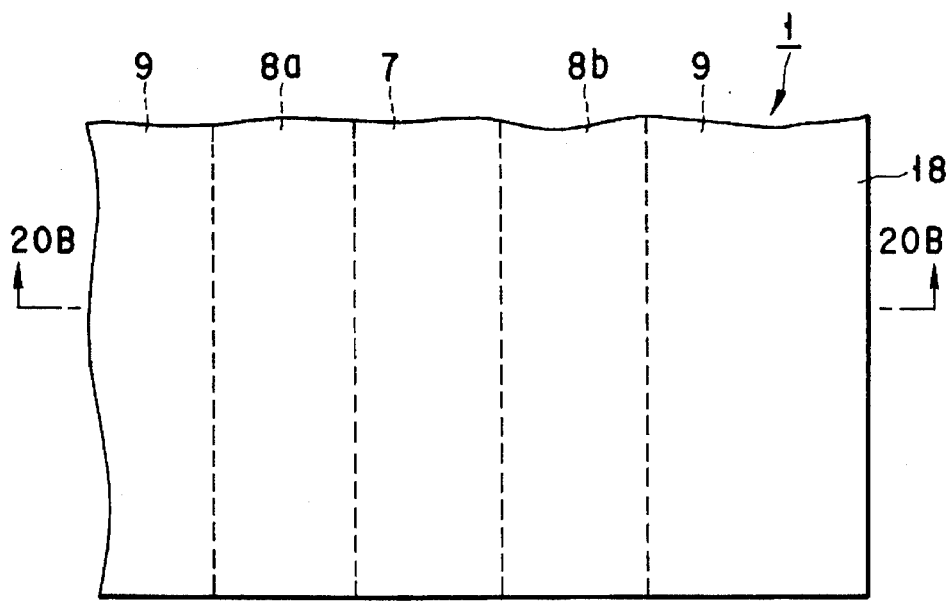
FIG. 20A is a plan view showing still another easily tearable laminated film according to the present invention.
Figure 20B:
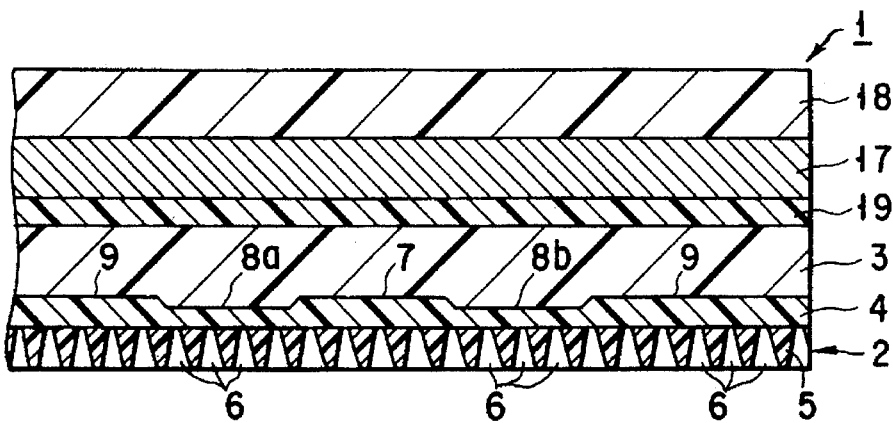
FIG. 20B is a sectional view taken along the line 20B—20B in FIG. 20A.
Figure 21:
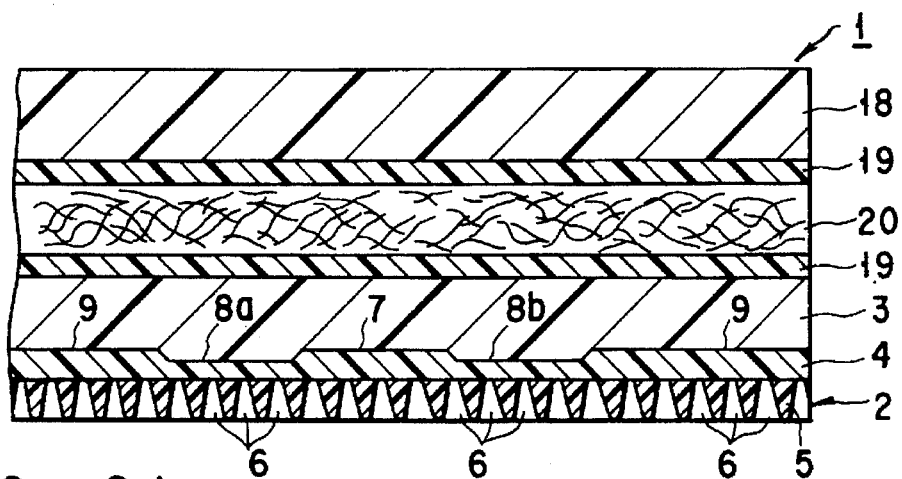
FIG. 21 is a sectional view showing still another easily tearable film according to the present invention.

This easily tearable laminated film has a structure shown in FIGS. 20A and 20B or FIG. 21.

FIG. 20A is a plan view of an easily tearable laminated film 1 which has a band-like tear region and in which an aluminum film and another heat-fusible resin film are laminated. FIG. 20B is a sectional view taken along the line 20B—20B in FIG. 20A. A porous organic resin film 2 is made of an organic resin film 5 having a large number of fine through pores 6 and has a higher tearability than that of an organic resin film having no pores. A heat-fusible resin film 3 is bonded and laminated to the porous organic resin film 2 by an adhesive layer 4 interposed between the films 2 and 3. In a band-like tear region 7, the adhesive layer 4 is made thick and bonds the porous organic resin 2 to the heat-fusible resin film 3 with a higher strength than the tear strength of the porous organic resin film 2. In band-like adjoining regions 8a and 8b adjacent to the tear region 7, the adhesive layer 4 is made thinner than the adhesive layer in the tear region 7 and bonds the porous organic resin film 2 to the heat-fusible resin film 3 with a strength not higher than the tear strength of the porous organic resin film 2. In a region 9 other than the tear region 7 and the adjoining regions 8a and 8b, the adhesive layer 4 is made thick as in the tear region 7 and bonds the porous organic resin film 2 to the heat-fusible resin film 3 with a higher strength than the tear strength of the porous organic resin film 2. Another heat-fusible film 18 having one surface on which an aluminum film 17 is vapor-deposited is stacked on the heat-fusible film 3 such that the aluminum film 17 is in contact with the heat-fusible film 3. This heat-fusible film 18 is laminated to the heat-fusible film 3 by an adhesive layer 19 interposed between the aluminum film 17 and the heat-fusible film 3. The adhesive layer 19 bonds the aluminum film 17 to the heat-fusible resin film 3 with a higher strength than the tear strength of the porous organic resin film 2.

When the sealed bag 21, FIG. 3, is manufactured from the easily tearable laminated film 2 with the above arrangement, the bag 21 is given excellent gas barrier properties by the aluminum film 17. Consequently, the contents in the bag can be very properly sealed. Additionally, the aluminum film 17 on one surface of the heat-fusible resin film 18 is bonded to the heat-fusible resin film 3 by the adhesive layer 19 with a higher strength than the tear strength of the porous organic resin film 2. Therefore, the sealed bag 21 can be easily torn in the tear region 7 in the early stages of tear by the actions discussed earlier with reference to FIGS. 4 to 6. Even if the sealed bag 21 is torn obliquely in the tear region 7 in the subsequent tearing process, the bag can be readily and reliably torn linearly along the boundary between the tear region 7 and the adjoining region 8a (or 8b).

Note that the aluminum film and the second heat-fusible resin film can also be bonded by using an adhesive layer interposed between the aluminum foil and the second heat-fusible resin film, rather than by vapor deposition. In this case it is necessary that this adhesive layer bond the aluminum foil to the second heat-fusible resin film with a higher strength than the tear strength of the porous organic resin film.

FIG. 21 is a sectional view of an easily tearable laminated film which has a band-like tear region and in which paper and another heat-fusible resin film are laminated. This easily tearable laminated film 1 consists of a porous organic resin film 2 and a heat-fusible resin film 3. The easily tearable laminated film 1 is laminated by interposing an adhesive layer 4, which is given a function similar to that of the adhesive layer used in the easily tearable laminated film shown in FIGS. 20A and 20B, between the films 2 and 3. Paper 20 and another heat-fusible resin film 18 are stacked in this order on the heat-fusible resin film 3. The heat-fusible resin film 3 and the paper 20 are laminated by an adhesive layer 19, and the paper 20 and the heat-fusible resin film 18 are laminated by another adhesive layer 19. These adhesive layers 19 bond the heat-fusible resin film 3 to the paper 20, and the paper 20 to the heat-fusible resin film 18, with a higher strength than the tear strength of the porous organic resin film 2.

The sealed bag 21 (FIG. 3) manufactured from the easily tearable laminated film 1 with this arrangement has the hand of the paper 20. Additionally, the heat-fusible resin film 3 and the paper 20, and the paper 20 and the heat-fusible resin film 18, are bonded by the adhesive layers 19 with a higher strength than the tear strength of the porous organic resin film 2. Therefore, the sealed bag 21 can be easily torn in the tear region 7 in the early stages of tear by the actions discussed earlier with reference to FIGS. 4 to 6. Even if the sealed bag 21 is torn obliquely in the tear region 7 in the subsequent tearing process, the bag can be readily and reliably torn linearly along the boundary between the tear region 7 and the adjoining region 8a (or 8b).

Note that in the above easily tearable laminated film, unwoven fabric can also be used instead of the paper. In this case, it is necessary that the first heat-fusible resin film and the unwoven fabric, and the unwoven fabric and the second heat-fusible resin film, be bonded by adhesive layers with a higher strength than the tear strength of the porous organic resin film.

Another easily tearable laminated film according to the present invention is a laminated film comprising a porous organic resin film having one surface on which an aluminum film is vapor-deposited, a heat-fusible resin film, and an adhesive layer interposed between the aluminum film and the heat-fusible resin film, wherein the porous organic resin film comprises a rigid organic resin film whose entire portion has a large number of fine non-through pores formed from a surface away from the surface in contact with the aluminum film, and has a higher tearability than tearability of an organic resin film having no pores, and the aluminum film and the heat-fusible resin film are bonded with a higher strength than a tear strength of the porous organic resin film in a tear region, and with a strength not higher than the tear strength of the porous organic resin film in an adjoining region adjacent to the tear region.

The same materials as discussed earlier can be used as the rigid organic resin, the heat-fusible resin, and the adhesive.

The aluminum film has a thickness of, e.g., 100 to 1,000 nm.

The tear strength of the porous organic resin film is preferably 0.5 times or less, and more preferably 0.35 times or less the tear strength of an organic resin film having no pores for the same reasons as discussed above.

In the porous organic resin film, it is preferable that the mean pore opening of the non-through pores be 0.5 to 100 µm, more preferably 5 to 80 µm, and the non-through pores be formed at a density of 500 pores/cm$^2$ or higher, more preferably 1,000 to 5,000 pores/cm$^2$ in the organic resin film. A porous organic resin film having non-through pores with these mean pore opening and density of 1,000 pores/cm$^2$ or higher has a tear strength which is sufficiently lower than, e.g., 0.35 times or less the tear strength of an organic resin film having no pores. Consequently, this porous organic resin film shows a higher tearability than that of an organic resin film having no pores.

The shape of the tear region is not particularly limited. For example, the tear region can take any of a ring-like shape such as a circular ring, a rectangular ring, and a hexagonal ring, a band-like shape, and a V shape.

The region (adjoining region) which is adjacent to the tear region means a peripheral region along the tearing direction of the tear region or an entire region except for the tear region. If the adjoining region is the peripheral region of the tear region, the aluminum film and the heat-fusible resin film can be bonded with a strength not higher than the tear strength of the porous organic resin film in the adjoining region, and with a higher Strength than the tear strength of the porous organic resin film in the remaining region.

The adhesive force between the aluminum film and the heat-fusible resin film in the tear region is desirably higher than the tear strength of the porous organic resin film. That is, the adhesive force is preferably 1.2 times or more, and more preferably 1.5 times or more the tear strength of the porous organic resin film. In addition, it is desirable that the adhesive force between the aluminum film and the heat-fusible resin film in the adjoining region be lower than the tear strength of the porous organic resin film. The adhesive force is preferably 0.8 times or less, and more preferably 0.5 times or less the tear strength of the porous organic resin film. A sealed bag made from an easily tearable laminated film with this construction can be easily and reliably torn in the tear region in the early stages of tear. Even if the sealed bag is torn obliquely in the tear region in the subsequent tearing process, the bag can be reliably torn along the boundary between the tear region and the adjoining region.

Any of the forms (a) to (c) mentioned earlier is used to bond the aluminum film to the heat-fusible resin film with a higher strength than the tear strength of the porous organic resin film in the tear region, and with a strength not higher than the tear strength of the porous organic resin film in the adjoining region.

The easily tearable laminated film discussed above will be described in detail below with reference to the accompanying drawings.

Figure 22A:
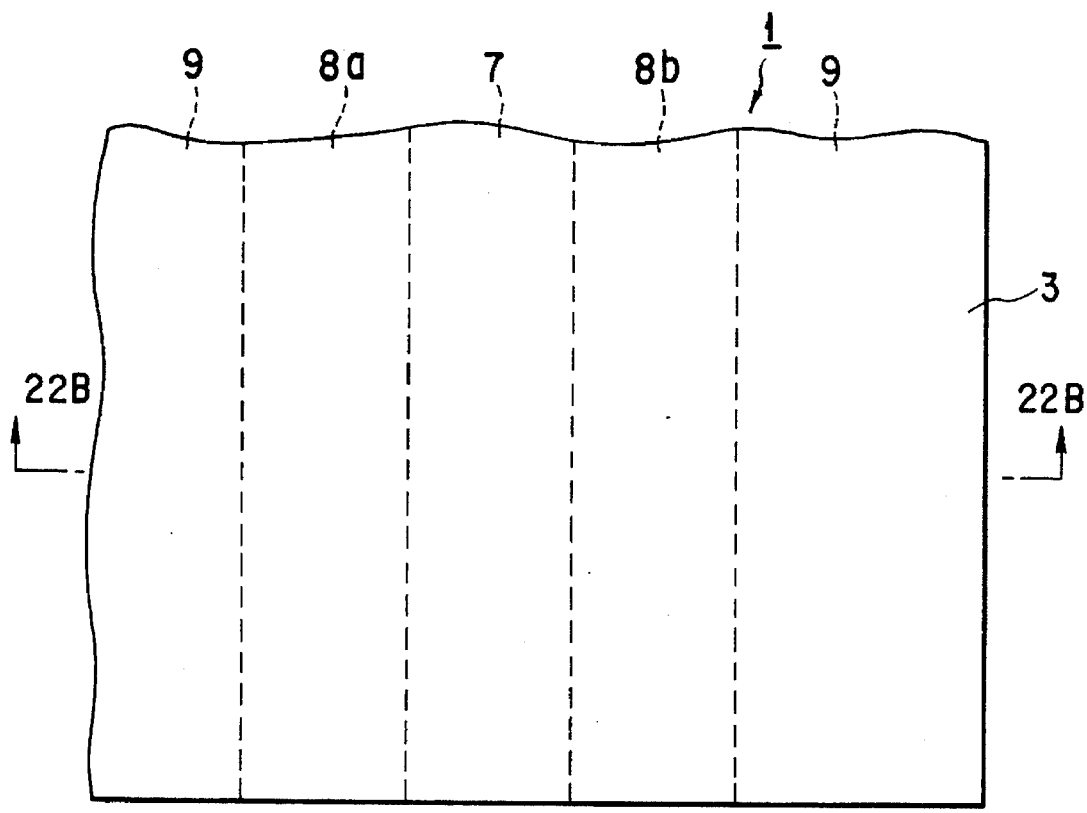
FIG. 22A is a plan view showing still another easily tearable laminated film according to the present invention.
Figure 22B:
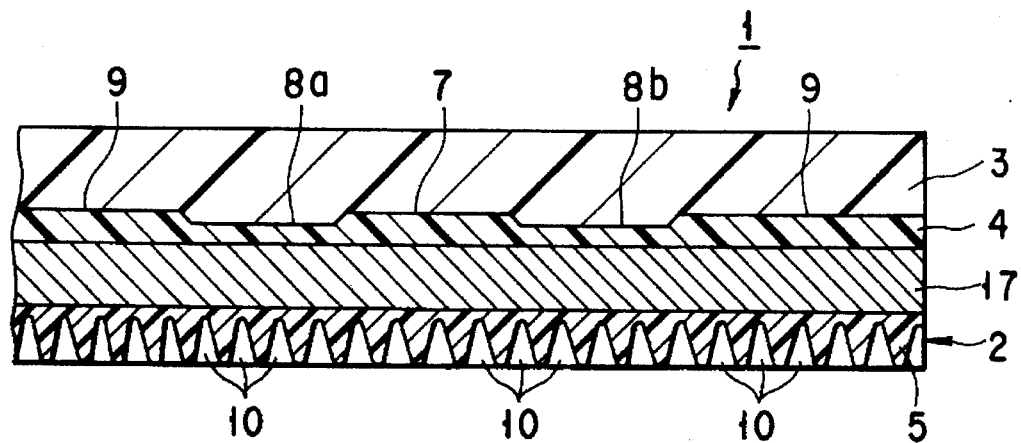
FIG. 22B is a sectional view taken along the line 22B—22B in FIG. 22A.

FIG. 22A is a plan view of an easily tearable laminated film having a band-like tear region. FIG. 22B is a sectional view taken along the line 22B—22B in FIG. 22A. An easily tearable laminated film 1 consists of a porous organic resin film 2 having one surface on which an aluminum film 17 is vapor-deposited, and a heat-fusible resin film 3, and an adhesive layer 4 interposed between the aluminum film 17 and the heat-fusible resin film 3.

The porous organic resin film 2 is made of an organic resin film 5 having one surface on which the aluminum film 17 is vapor-deposited. A large number of fine non-through pores 10 are formed from the other surface of the film 5. Therefore, the porous organic resin film 2 has a higher tearability than that of an organic resin film having no pores. In a band-like tear region 7, the adhesive layer 4 is made thick and bonds the aluminum film 17 to the heat-fusible resin film 3 with a higher strength than the tear strength of the porous organic resin film 2. In band-like adjoining regions 8a and 8b adjacent to the tear region 7, the adhesive layer 4 is made thinner than the adhesive layer in the tear region 7 and bonds the aluminum film 17 to the heat-fusible resin layer 3 with a strength not higher than the tear strength of the porous organic resin film 2. In a region 9 except for the tear region 7 and the adjoining regions 8a and 8b, the adhesive layer 4 is made thick as in the tear region 7 and bonds the aluminum film 17 to the heat-fusible resin film 3 with a higher strength than the tear strength of the porous organic resin film 2.

When the sealed bag 21 (FIG. 3) is manufactured from the easily tearable laminated film 2 with the above arrangement, the bag 21 is given excellent gas barrier properties by the aluminum film 17. Consequently, the content in the bag can be very properly sealed. Additionally, in the band-like tear region 7, the adhesive layer 4 is made thick and bonds the aluminum film 17 to the heat-fusible resin film 3 with a higher strength than the tear strength of the porous organic resin film 2. In the band-like adjoining regions 8a and 8b adjacent to the tear region 7, the adhesive layer 4 bonds the aluminum film 17 to the heat-fusible resin layer 3 with a strength not higher than the tear strength of the porous organic resin film 2. Therefore, the sealed bag 21 can be easily torn in the tear region 7 in the early stages of tear by the actions discussed earlier with reference to FIGS. 4 to 6. Even if the sealed bag 21 is torn obliquely in the tear region 7 in the subsequent tearing process, the bag can be readily and reliably torn linearly along the boundary between the tear region 7 and the adjoining region 8a (or 8b).

Still another easily tearable laminated film according to the present invention is a laminated film comprising a rigid organic resin film, a heat-fusible resin film, and an adhesive layer interposed between the organic resin film and the heat-fusible resin film, wherein the rigid organic resin film comprises non-porous region and a porous region having a large number of fine through and/or non-through pores, and the porous region has a higher tearability than tearability of the non-porous region, and the organic resin film and the heat-fusible resin film are bonded with a higher strength than a tear strength of the porous region of the organic resin film in a tear region which corresponds to the porous region, and with a strength not higher than the tear strength of the porous region of the organic resin film in an adjoining region adjacent to the tear region.

Examples of the rigid organic resin are polyethyleneterephthalate (PET), nylon, and an oriented polypropylene film. A film made of any of these organic resins preferably has a thickness of 6 μm or more, since the film is given easy tearability by forming a large number of fine through and/or non-through pores in the film. Although the upper limit of the thickness is not particularly restricted, it is preferably 30 μm or less in respect of the cost.

Examples of the heat-fusible resin are polyethylene such as low-density polyethylene and linear, low-density polyethylene, an ethylvinylacetate copolymer (EVA), and unstretched polypropylene. Usually, the thickness of a film made of any of these heat-fusible resins is 10 to 50 μm.

The adhesive is not particularly limited. Examples are adhesives primarily consisting of a polyester-based urethane resin and a polyether-based urethane resin.

The tear strength means a value obtained by measuring a maximum stress by which a sample piece of a predetermined shape, which is formed from an organic resin film, is torn when pulled, and dividing this maximum stress by the original thickness of the test piece.

The tear strength of the porous region of the organic resin film is preferably 0.5 times or less the tear strength of the non-porous region. This is so because, if the tear strength of the porous region of the organic resin film exceeds 0.5 times that of the non-porous region, there is the possibility that a sealed bag made from the easily tearable laminated film becomes difficult to reliably and easily tear in the tear region when opened. The tear strength of the porous region is more preferably 0.35 times or less the tear strength of the non-porous region.

It is preferable that the mean pore opening of the through or non-through pores in the porous region be 0.5 to 100 μm, more preferably 5 to 80 μm, and the through and/or non-through pores be formed at a density of 500 pores/cm$^2$ or higher, more preferably 1,000 to 5,000 pores/cm$^2$ in the organic resin film. A porous region having through and/or non-through pores with these mean pore opening and density of 1,000 pores/cm$^2$ or higher has a tear strength which is sufficiently lower than, e.g., 0.35 times or less the tear strength of a non-porous region of an organic resin film. Consequently, this porous region shows a higher tearability than that of the non-porous region.

The mean pore opening of the through or non-through pores in the porous region is defined as above for the reasons explained below. That is, if the mean pore opening is smaller than 0.5 μm, a sealed bag made from the easily tearable laminated film may become difficult to reliably and easily tear in the tear region when opened. On the other hand, if the mean pore opening is larger than 100 μm, the printing properties may be impaired in the pore formation region.

The pore density in the porous region is defined as above for the reasons explained below. That is, if the pore formation density is lower than 500 pores/cm$^2$, there is the possibility that a sealed bag made from the easily tearable laminated film becomes difficult to reliably and easily tear in the tear region when opened. The upper limit value of the formation density of the through or non-through pores is not particularly specified. A pore density of 35,000 pores/cm$^2$ can be realized by one-time processing by a pore forming apparatus used in the manufacture of an easily tearable laminated film to be described later.

The shape of the tear region is not particularly limited. For example, the tear region can take any of a ring-like shape such as a circular ring, a rectangular ring, and a hexagonal ring, a band-like shape, and a V shape.

The region (adjoining region) which is adjacent to the tear region means a peripheral region along the tearing direction of the tear region or an entire region except for the tear region. If the adjoining region is the peripheral region of the tear region, the organic resin film and the heat-fusible resin film can be bonded with a strength not higher than the tear strength of the porous region in the adjoining region, and with a higher strength than the tear strength of the porous region in the remaining region.

The adhesive force between the organic resin film and the heat-fusible resin film in the tear region is desirably higher than the tear strength of the porous region. That is, the adhesive force is preferably 1.2 times or more, and more preferably 1.5 times or more the tear strength of the porous region. In addition, it is desirable that the adhesive force between the organic resin film and the heat-fusible resin film in the adjoining region be lower than the tear strength of the porous region. The adhesive force is preferably 0.8 times or less, and more preferably 0.5 times or less the tear strength of the porous region. A sealed bag made from an easily tearable laminated film with this structure can be easily and reliably torn in the tear region in the early stages of tear. In the subsequent tearing process, the bag can be reliably torn along the boundary between the tear region and the adjoining region.

Any of the forms (a) to (c) mentioned earlier is used to bond the organic resin film to the heat-fusible resin film with a higher strength than the tear strength of the porous region in the tear region, and with a strength not higher than the tear strength of the porous region in the adjoining region.

The easily tearable laminated film discussed above will be described in detail below with reference to the accompanying drawings.

FIG. 23 is partially cutaway perspective view of an easily tearable laminated film having a band-like tear region. This easily tearable laminated film 51 consists of an organic resin film 52, a heat-fusible resin film 53, and an adhesive layer 54 interposed between these films 52 and 53.

The organic resin film 52 comprises a non-porous region and a band-like porous region 56 having a large number Of fine through pores 55, and this porous region 56 has a higher tearability than that of the non-porous region. In a band-like tear region 57 corresponding to the porous region 56, the adhesive layer 54 is made thick and bonds the organic resin film 52 to the heat-fusible resin film 53 with a higher strength than the tear strength of the porous region 56. In band-like adjoining regions 58a and 58b adjacent to the tear region 57, the adhesive layer 54 is made thinner than the adhesive layer in the tear region 57 and bonds the organic resin film 52 to the heat-fusible resin layer 53 with a strength not higher than the tear strength of the porous region 56. In a region 59 except for the tear region 57 and the adjoining regions 58a and 58b, the adhesive layer 54 is made thick as in the tear region 57 and bonds the organic resin film 52 to the heat-fusible resin film 53 with a higher strength than the tear strength of the porous region 56.

FIG. 24 is a front view showing a sealed bag manufactured from the easily tearable laminated film 51. A sealed bag 71 is manufactured by cutting the easily tearable laminated film 51 into desired dimensions, overlapping the cut films such that the organic resin films 52 are located outside, and heat-sealing the heat-fusible resin films 53 at two perpendicular edges such that the band-like tear region 57 is parallel to an opening portion 72. The opening portion 72 is closed by heat sealing after desired contents (e.g., snacks) are placed in the bag. Note that in FIG. 24, reference numeral 73 denotes a sealed portion; and 74, an opening-side sealed portion.

This sealed bag 71 is made of the easily tearable laminated film 51 in which, as illustrated in FIG. 23, in the band-like tear region 57, the adhesive layer 54 is made thick and bonds the organic resin film 52 to the heat-fusible resin film 53 with a higher strength than the tear strength of the porous region 56, and in the band-like adjoining regions 58a and 58b adjacent to the tear region 57, the adhesive layer 54 bonds the organic resin film 52 to the heat-fusible resin layer 53 with strength not higher than the tear strength of the porous region 56. Therefore, when a tearing force is applied by fingers of both bands to the end portion of the tear region 57 of the sealed bag 71 in the direction indicated by an arrow in FIG. 24, the bag is torn in the tear region 57 in the early stages of tear. Even if the sealed bag 71 is torn obliquely in the tear region 57 in the subsequent tearing process, the bag can be linearly torn along the boundary between the tear region 57 and the band-like adjoining region 58a or 58b.

Figure 25:
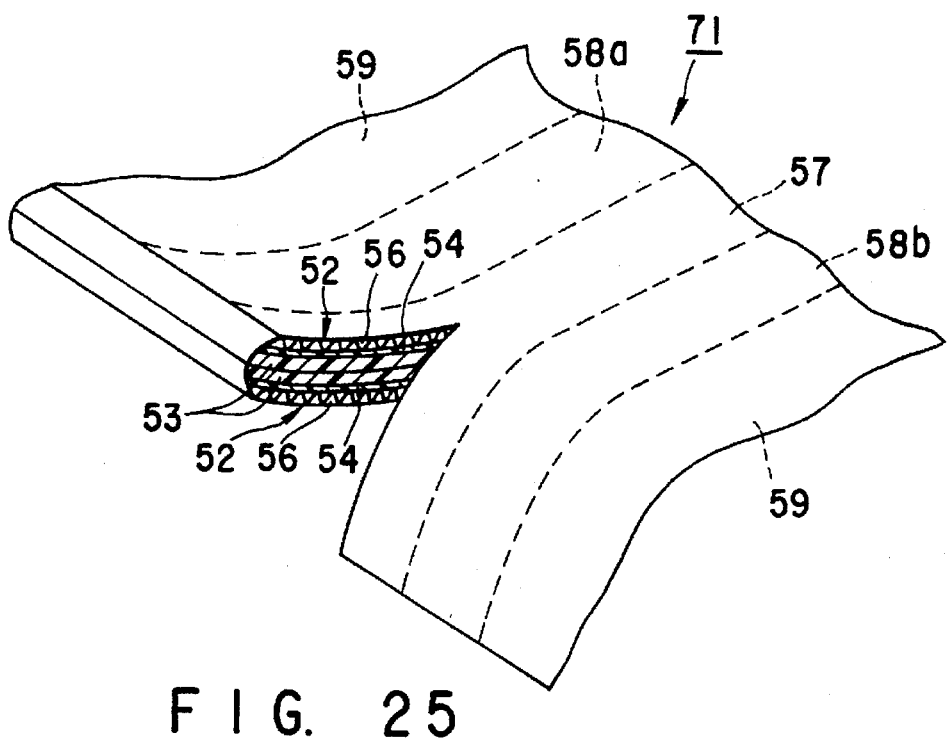
FIG. 25 is a perspective view showing the state in which the sealed bag in FIG. 24 is torn in a tear region.

That is, the porous region 56 is formed by selectively forming a large number of the through pores in the organic resin film 52 arranged on the outer surfaces of the sealed bag 71. In the tear region 57 corresponding to the porous region 56, these through pores 55 form tear starting points in the tearing direction and also decrease the tear strength to facilitate tear. In addition, in the tear region 57, the organic resin film 52 and the heat-fusible resin film 53 are bonded with a higher strength than the tear strength of the porous region 56. Therefore, the tearability of the heat-fusible resin film 53 which is hard to tear depends upon the tearability of the porous region 56 of the organic resin film 52. As a result, when a force exceeding the tear strength of the porous region 56 is applied by fingers of both hands to the end of the band-like tear region 57 in the arrow direction in FIG. 24, this force tears not only the organic resin film 52 but the heat-fusible resin film 53 which is bonded to the film 2 with a higher strength than the tear strength of the porous region 56. As shown in FIG. 25, therefore, although the heat-fusible resin film 53 is difficult to tear, in the tear region 57, it is possible to easily and reliably tear the easily tearable laminated films 51 having the two overlapped heat-fusible resin films 53. It is particularly desirable that the porous region 56 of the organic resin film 52 have a tear strength which is 0.5 times or less, and preferably 0.35 times or less the tear strength of the non-porous region, and that the adhesive force between the organic resin film 52 and the heat-fusible resin film 53 be 1.2 times or more, and preferably 1.5 times or more the tear strength of the porous region 56. In this case, it is possible to more easily and reliably tear the easily tearable laminated films 51 having the two overlapped heat-fusible resin films 53 in the band-like tear region 57.

On the other hand, the non-porous region of the organic resin film 52 in the band-like adjoining region 58a (or 58b) of the sealed bag 71 does not form starting point. In addition, in the adjoining regions 58a and 58b, the adhesive force between the organic resin film 52 and the heat-fusible resin film 53 is lower than the tear strength of the porpus region 56. Therefore, even if a force exceeding the tear strength of the porous region 56 is applied, the films 52 and 53 are pealed, i.e., the hardly tearable nature of the heat-fusible resin film 53 emerges. Consequently, even when applied with a strong tearing force, only the heat-fusible resin film 53 is stretched but difficult to tear any further. Therefore, the adjoining regions 58a and 58b function as stoppers which are not torn even with application of a force exceeding the tear strength of porous region 56 or with application of the tearing force by which the tear region 57 is torn.

Figure 26:
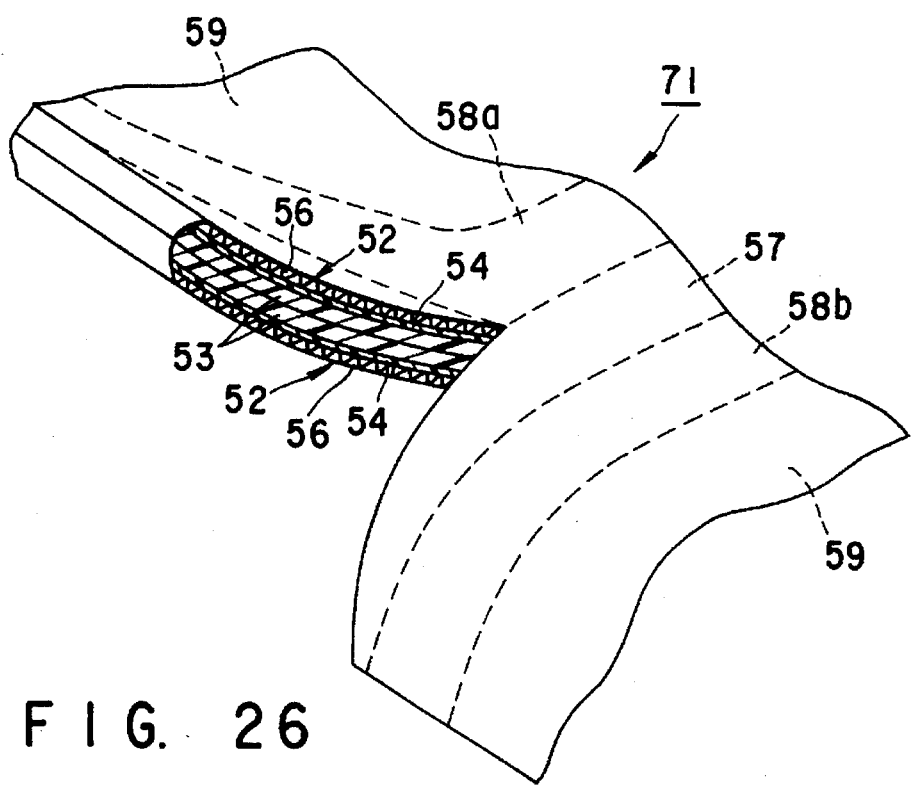
FIG. 26 is a perspective view for explaining the tearing process of the sealed bag in FIG. 24.

As discussed above, when a tearing force is applied by fingers of both hands to the end of the band-like tear region 57 of the sealed bag 71 in the arrow direction in FIG. 24, the sealed bag 71 can be easily torn in the tear region 57, as in FIG. 25, in the early stages of tear. Even if the sealed bag 71 is torn obliquely in the tear region in the subsequent tearing process, the band-like adjoining regions 58a and 58b function as the stoppers which inhibit the tear. Consequently, as illustrated in FIG. 26, the sealed bag 71 can be readily and reliably torn along the boundary between the tear region 57 and the adjoining region 58a (or 58b).

In particular, in the easily tearable laminated film 51 shown in FIG. 23, the tear region 57 matches the porous region 56 in which the tear strength is reduced, and the tear inhibiting properties of the adjoining regions 58a and 58b in which the non-porous regions are positioned are enhanced. Consequently, the tearability of the sealed bag 71 formed from the easily tearable laminated film 51 is significantly improved in the boundary between the band-like tear region 57 and the band-like adjoining region 58a (or 58b), as compared with the sealed bag 21 formed from the easily tearable laminated film 2 shown in FIG. 2. Therefore, the sealed bag 71 has good linear cut properties, and this prevents spill or scattering of the contents when a sealed bag is torn in an unexpected direction, such as use of conventional easily tearable sealed bags.

Note that sealed bags having the structures shown in FIGS. 7 and 8 can be similarly manufactured from the easily tearable laminated film with the above structure.

Figure 27:
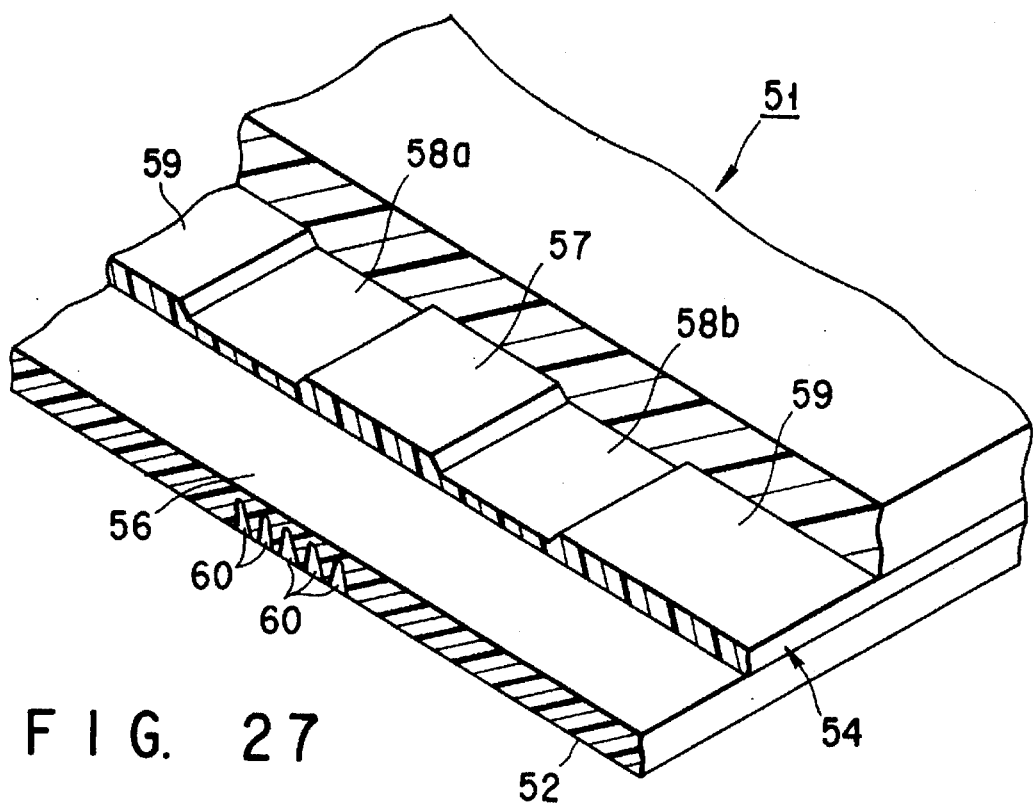
FIG. 27 is a partially cutaway perspective view showing still another easily tearable laminated film according to the present invention.

An easily tearable laminated film 51 shown in FIG. 27 uses an organic resin film 52 which consists of a non-porous region and a porous region 56 having a large number of fine non-through pores 60, and this porous region 56 has a higher tearability than that of the non-porous region. The surface of the organic resin film 52 away from the surface in which the non-through pores 60 are formed is used as the surface to be bonded to a heat-fusible resin film 53. The rest of the arrangement is identical with that illustrated in FIG. 23. A sealed bag 71 manufactured from the easily tearable laminated film 51 including the organic resin film 52 consisting of the non-porous region and the porous region 56 having a large number of the non-through pores 60 can be easily and reliably torn, when opened, along the boundary between the tear region 57 and the adjoining region 58a or 58b, as in the case of the bag using the easily tearable laminated film 51 (FIG. 23) including the organic resin film 52 having the porous region 56.

In the easily tearable laminated film 51 shown in FIG. 27, the surface of the organic resin film 52 away from the surface in which the non-through pores 60 are formed is used as the surface to be bonded to the heat-fusible resin film 53. However, it is also possible to use the surface of the organic resin film 52 in which the non-through pores are formed as the surface to be bonded to the heat-fusible resin film 53.

The easily tearable laminated film with a high tearability shown in FIG. 23 or 27 can be effectively used as a sealed bag for a variety of liquid or powder products such as liquid soup, powder soup, fine granulated sugar, instant coffee containing sugar and powder cream, and powder medicines.

In this easily tearable laminated film according to the present invention, the tear region corresponding to the porous region and the adjoining regions can be formed into the V shape as illustrated in FIGS. 10A and 10B. In this case the easily tearable laminated film can be used as a sealed bag for a flat, parallelepiped case (FIG. 11) for accommodating, e.g., a cassette tape or a floppy disk.

Also, in this easily tearable laminated film according to the present invention, the tear region matching the porous region can be formed into the ring-like shape, and the adjoining regions can be formed into the ring-like shape and the circular shape, as illustrated in FIGS. 12A and 12B. In this case, the easily tearable laminated film can be used as a lid of the container for containing a fluid food, such as yogurt or pudding, shown in FIG. 13.

The easily tearable laminated film according to the present invention as discussed above is manufactured by a method comprising the steps of:

arranging a first roll having a surface on which a large number of particles having acute corner portions and a Mohs hardness of 5 or more are deposited, and a second roll having a circumferential surface on which a desired protruding pattern is formed, at least the protruding pattern formation surface being covered with an elastic organic polymer sheet, such that the first and second rolls oppose each other;

passing a rigid, elongated organic resin film between the first and second rolls by rotating the fist and second rolls in opposite directions, and urging the first and second rolls against the elongated organic resin film passing between the first and second rolls until a distance between a surface of the organic polymer sheet corresponding to the protruding pattern and the points of the particles becomes smaller than a thickness of the elongated organic resin film, thereby performing the acute corner portions of the particles opposing the protruding pattern to selectively press into the elongated organic resin film by a cushioning effect of the organic polymer sheet to selectively form a large number of fine through and/or non-through pores, forming a porous region having a higher tearability than tearability of a non-porous region of the organic film;

coating a dry-laminating adhesive on one surface of the elongated organic resin film such that a thickness of the dry-laminating adhesive is large in a tear region corresponding to the porous region and smaller in an adjoining region adjacent to the tear region than the thickness in the tear region, and drying the dry-laminating adhesive; and overlapping an elongated heat-fusible resin film on the adhesive coated surface of the elongated organic resin film, and laminating the elongated heat-fusible resin film and the elongated organic resin film by applying pressure and heat.

The first roll has a metal roll main body and particles having acute corners and a Mohs hardness of 5 or more. These particles are deposited on the surface of the roll main body by, e.g., an electro-deposition method or a bonding method using an organic or inorganic binder. It is desirable that these particles be deposited at a ratio of 70% or more on the surface of the first roll.

The metal roll main body consists of, e.g., iron or an iron alloy. The roll main body can also be a roll made from iron or an iron alloy and having a surface covered with a nickel-plating layer or a chromium-plating layer.

Examples of the particle having a Mohs hardness of 5 or more are a carbide alloy particle (e.g., a tungsten carbide particle), a silicon carbide particle, a boron carbide particle, a sapphire particle, a cubic boron nitride (CBN) particle, and a natural or synthetic diamond particle. In particular, a natural or a synthetic diamond particle with a high hardness and a high strength is desirable. It is preferable to use particles with a particle size of 10 to 100 μm and a particle size variation of 5% or less.

If diamond particles are to be used as a large number of particles with a Mohs hardness of 5 or more, these diamond particles are preferably deposited on the surface of the roll main body by the same electro-deposition method as discussed earlier. In this electro-deposition method, it is desirable that an Ni layer or a Cr layer be formed beforehand on the electro-deposition surface of the roll main body by using a plating technique or the like. By the use of such an electro-deposition technique, it is possible to deposit the diamond particles on the surface of the roll main body with a very high strength.

The protruding pattern on the circumferential surface of the second roll is formed by processing the surface of a roll main body consisting of iron or an iron alloy by a mechanical polishing method or a selective etching method using a mask. Ni plating or Cr plating can be performed on the surface on which the protruding pattern is formed.

The protruding pattern formed on the surface of the second roll main body can be any of a grating pattern, a stripe pattern, and a pattern consisting of a plurality of separate circular projections or polygonal projections, e.g., triangular, rectangular, or hexagonal projections. This protruding pattern preferably has a height of 0.1 to 10 mm. If the height of the protruding pattern is smaller than 0.1 mm, it may become difficult to form through pores and/or non-through pores corresponding to the protruding pattern in the elongated organic resin film fed to a position between the organic polymer sheet under which the protruding pattern is located and a large number of particles on the surface of the first roll. If the height of the protruding pattern is larger than 10 mm, the pattern becomes more susceptible to mechanical abrasion. Consequently, the shape of the protruding pattern may change after relatively short use periods. The height of the protruding pattern is more preferably 0.5 to 2.0 mm.

As the elastic organic polymer sheet to be coated on the surface of the protruding pattern of the second roll, it is possible to use, e.g., rubber sheets such as a natural rubber sheet, a styrenebutadiene rubber sheet, an elastomer sheet, a urethane rubber sheet, a silicone rubber sheet, and a neoprene rubber sheet; and organic polymer foamed sheets such as a polyurethane foamed sheet, a polystyrene foamed sheet, and a rubber-based foamed sheet, e.g., an elastomer foamed sheet.

The rubber sheet preferably has a thickness of 0.1 to 8 mm. If the thickness of the rubber sheet is less than 0.1 mm, the rubber sheet may be broken during perforation. If the thickness of the rubber sheet exceeds 8 mm, the elasticity during perforation of the elongated organic resin film decreases, and this makes it difficult to form a large number of through pores and/or non-through pores corresponding to the protruding pattern. The thickness of the rubber sheet is more preferably 0.5 to 5 mm. It is particularly preferable that the thickness of the rubber sheet be chosen within the above thickness range (0.1 to 8 mm) in accordance with the height of the protruding pattern. That is, it is preferable to choose a thin rubber sheet if the height of the protruding pattern is small, and a thick rubber sheet if the height of the pattern is large.

It is preferable that the organic polymer foamed sheet have a thickness of 1 to 15 mm. If the thickness of the organic foamed sheet is smaller than 1 mm, there is the possibility that the organic foamed sheet is broken during perforation. If the thickness of the organic foamed sheet is larger than 15 mm, the elasticity during perforation of the continuous film decreases to make it difficult to form a large number of through pores and/or non-through pores corresponding to the protruding pattern. A more preferred thickness of the organic foamed sheet is 1 to 10 mm. It is particularly desirable that the thickness of the organic foamed sheet be selected within the above thickness range (1 to 15 mm) in accordance with the height of the protruding pattern; that is, it is preferable to select a thin organic foamed sheet if the protruding pattern is low, and a thick organic foamed sheet if the pattern is high.

In the step of coating the dry-laminating adhesive, it is also possible to coat the adhesive only in the tear region without coating the adhesive in the adjoining regions.

A method of manufacturing the easily tearable laminated film having the band-like tear region discussed above will be described in detail below with reference to the accompanying drawings.

Figure 28:
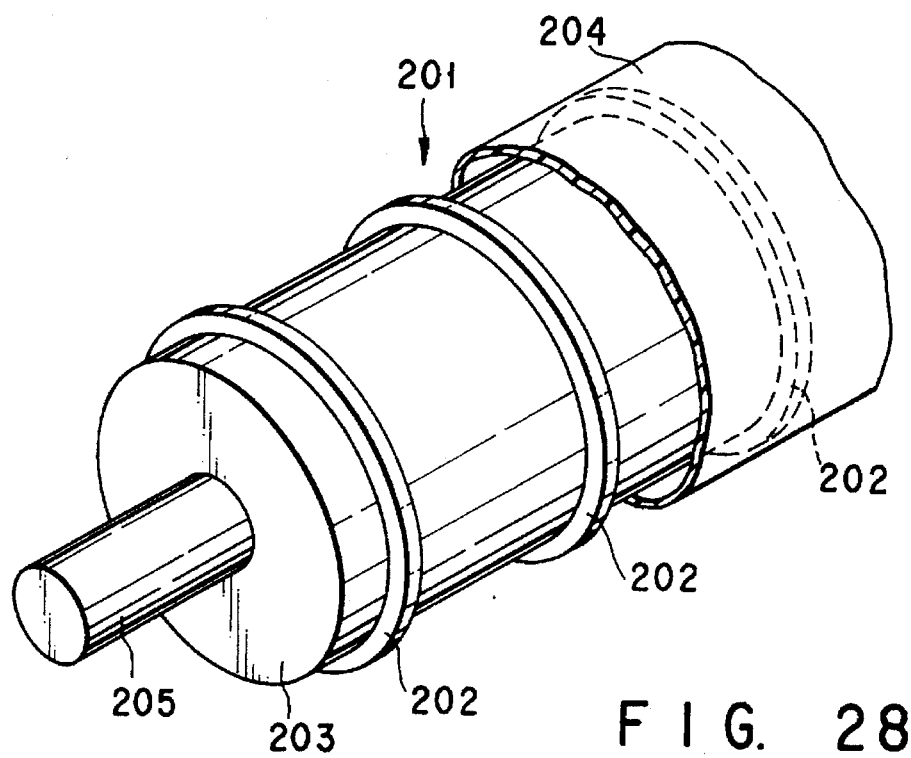
FIG. 28 is a partially cutaway perspective view showing a second roll (pattern roll) incorporated into a pore forming apparatus used in the manufacture of still another easily tearable laminated film according to the present invention.

FIG. 28 shows a pattern roll which is incorporated in place of the second roll of the pore forming apparatus illustrated in FIGS. 14 to 16. This pattern roll 201 is constituted by a stainless steel roll main body 203, an elastic organic polymer sheet (e.g., a urethane rubber sheet) 204, and a shaft 205. On the circumferential surface of the roll main body 203, a plurality of annular protruding patterns 202 are formed at desired intervals in the axial direction. The organic polymer sheet 204 is so coated as to cover the protruding patterns 202 of the main body 203. The shaft 205 extends through the center of the roll main body 203 to protrude from the two end faces of the main body 203. The two protruding ends of the shaft 205 are axially supported by the bearings 116 inside the boxes 117 illustrated in FIGS. 15 and 16.

A method of performing pattern perforation for a rigid, elongated organic resin film will be described below, in which the pattern roll 201 with the above structure is used as the second roll of the pore forming apparatus in FIGS. 14 to 16.

First, following the same procedure as in the perforation operation by the pore forming apparatus illustrated in FIGS. 14 to 16, the pressure applied to the perforating unit 129 is controlled by the first pressure control means 144. By this control, a constant pressure is applied to the entire elongated organic resin film 160 in the widthwise direction, which is located between the first roll 106 and the second roll (pattern roll 201), thereby completing the preparation of perforation.

After the preparation of perforation is completed, the ultrasonic generating member (not shown) applies ultrasonic waves to the distilled water contained in the vessel 163 of the destaticizing means 162. Subsequently, the take-up roll is rotated and at the same time the driving shaft of the motor (not shown) is also rotated. Consequently, the first roll 106 is rotated clockwise, and the pattern roll 201 is rotated counterclockwise. Upon rotation of the first roll 106 and the second roll (pattern roll 201), the elongated organic resin film 160 passing between the rolls 106 and 117 is perforated.

Figure 29:
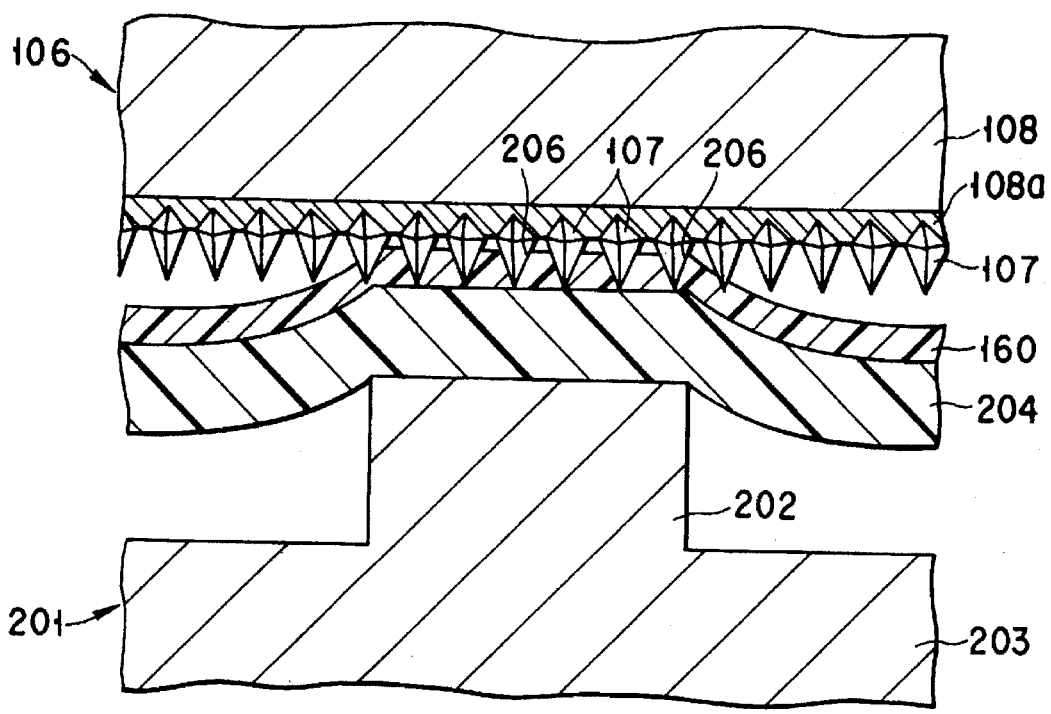
FIG. 29 is a sectional view for explaining selective perforation performed for an organic resin film by using a first roll and the pattern roll.
Figure 30:
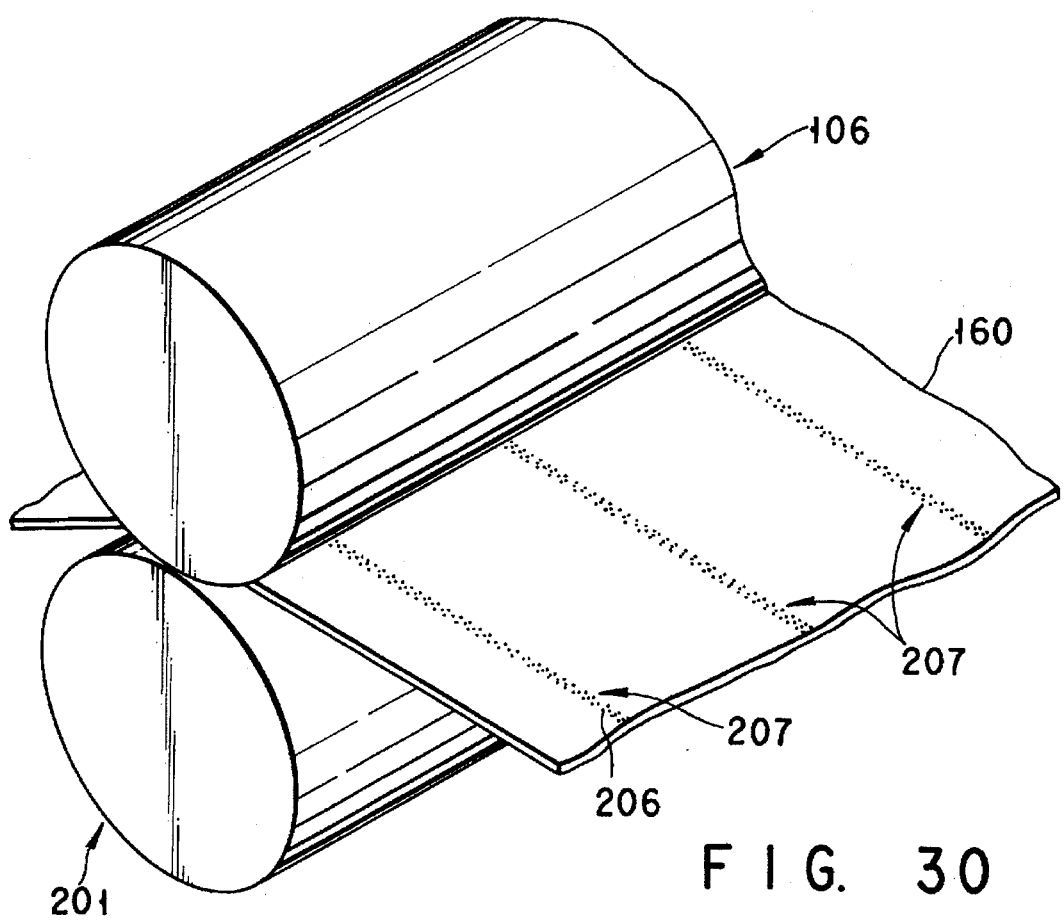
FIG. 30 is a perspective view for explaining the selective perforation performed for an organic resin film by using the first roll and the pattern roll.

That is, as illustrated in FIG. 29, the first roll 106 includes the iron roll main body 108 having the surface on which the synthetic diamond particles 107 with acute corners are electro-deposited at an area ratio of 70% or more. In addition, the pattern roll 201 used as the second roll 117 includes the roll main body 203 having the circumferential surface on which the annular protruding patterns 202 are formed and which is covered with the elastic organic polymer sheet 204. Therefore, when the pressure control means 144 urges the pattern roll 201 toward the first roll 106 until the distance between the surface of a portion of the organic polymer sheet 204 corresponding to each protruding pattern 202 and the points of the synthetic diamond particles 107 becomes smaller than the thickness of the elongated organic resin film 160, i.e., becomes smaller than zero, and simultaneously the rolls 106 and 201 are rotated in the opposite directions, the elongated organic resin film 160 is sandwiched between the surface of the portion of the organic polymer sheet 204 corresponding to each protruding pattern 202 and the acute corners of the synthetic diamond particles 107, as in FIG. 29. Consequently, the elongated organic resin film 160 is mechanically perforated since the acute corners of the synthetic diamond particles 107 opposing the protruding patterns 202 selectively press into the film 160 owing to the cushioning effect of the organic polymer sheet 204. As a result, as shown in FIGS. 29 and 30, a large number of through pores 206 are regularly formed in the elongated organic resin film 160 in accordance with the annular protruding patterns 202, thereby forming a band-like porous region 207.

The elongated organic resin film thus perforated by the perforating unit 129 is conveyed through the vessel 163 of the destaticizing means 162 by the plurality of feed rolls 161 and the two abutment rolls 164. The perforation to the elongated organic resin film 160 by the unit 129 is done primarily by friction between the first roll 106 and the pattern roll 201. Therefore, a large quantity of static electricity is generated on the surface of the elongated organic resin film thus perforated, and attracts surrounding dust. The dust adhered to the elongated organic resin film is washed away by passing the film through the vessel 163, which contains distilled water, of the destaticizing means 162, and by applying ultrasonic waves to the distilled water by the ultrasonic generating member (not shown). The elongated organic resin film is then passed through the hot air blasting members (not shown), removing water from the surface of the film by evaporation. Thereafter, the film is taken up by the take-up roll (not shown).

Subsequently, the elongated organic resin film having the band-like porous region is set as the first supply roll 170 of the dry-laminating apparatus shown in FIG. 18. Following the same procedure as mentioned earlier, the elongated organic resin film is supplied to a portion between the abutment roll 171 and a coating roll 172 to form coating films different in thickness. The film is then conveyed to the drying oven 179, where the solvent in the coating films is vaporized. The resultant elongated resin film and an elongated heat-fusible resin film 180 supplied from the second supply roll 179 are supplied to a portion between nipple rolls $181_1$ and $181_2$ so that the adhesive coated surface is in contact with the film 180. These films 166 and 180 are then laminated by application of pressure and heat. This laminated film (easily tearable laminated film), as shown in FIG. 23, consists of the organic resin film 52 having the porous region 56 which is formed by selectively forming a large number of the fine through pores 55 into the shape of a band and hence has a high tearability than a non-porous region of an organic resin film, the heat-fusible resin film 53, and the adhesive layer 54 interposed between these films 52 and 53. In the band-like tear region 57 matching the porous region 56, the adhesive layer 54 is made thick and bonds the organic resin film 52 to the heat-fusible resin film 53 with a higher strength than the tear strength of the porous region 56. In the band-like adjoining regions 58a and 58b adjacent to the tear region 57, the adhesive layer 54 is made thinner than the adhesive layer in the tear region 57 and bonds the organic resin film 52 to the heat-fusible resin film 53 with a strength not higher than the tear strength of the porous region 56.

The coating roll 172 has a structure in which a mesh region which has a plurality of deep grooves and contains a large amount of the adhesive is formed along the circumferential direction in a portion of the circumferential surface corresponding to the porous region of the elongated organic resin film, and another mesh region which has a plurality of shallow grooves and contains a small amount of the adhesive is formed in a portion adjacent to the first mesh region along the axial direction. Therefore, by supplying the elongated organic resin film to a portion between the abutment roll 171 and the coating roll 172 on which these mesh regions different in content of the adhesive are arranged in the axial direction, a band-like thick coating film matching the porous region of the film, a band-like thin coating film adjacent to the thick coating film, and another band-like thin coating film on the side of the thick coating film away from the side of the first thin coating film are formed on one surface of the elongated organic resin film.

In this method, a porous region is formed by perforating a large number of through pores in an elongated organic resin film. Coating films different in thickness are formed on one surface of the elongated organic resin film and dried. The resultant elongated organic resin film is laminated with an elongated heat-fusible resin film by applying heat and pressure. Therefore, an easily tearable laminated film having the structure illustrated in FIG. 23 can be manufactured by an exceedingly simple process.

To manufacture the easily tearable laminated film (FIGS. 10A and 10B) which has the V-shaped tear region and the V-shaped adjoining regions different from the tear region in the thickness of the adhesive layer, and in which the tear region matches the porous region, the perforation is done by using a pattern roll having V-shaped protruding patterns, and the dry-laminating step is performed by using a coating roll on which a V-shaped mesh region having a plurality of deep grooves and V-shaped mesh regions adjacent to the first V-shaped mesh region and having a plurality of shallow grooves are formed.

To manufacture the easily tearable laminated film (FIGS. 12A and 12B) which has the ring-like tear region and the ring-like and circular adjoining regions different from the tear region in the thickness of the adhesive layer, and in which the tear region matches the porous region, the perforation is done by using a pattern roll having elliptic, annular protruding patterns, and the dry-laminating step is performed by using a coating roll on which an elliptic, annular mesh region having a plurality of deep grooves and an elliptic, annular mesh region and an elliptic mesh region which are adjacent to the first elliptic, annular mesh region and have a plurality of shallow grooves are formed.

Furthermore, in addition to the dry-laminating method, an extrusion-laminating method can also be used to laminate the elongated organic resin film having the porous region and the elongated heat-fusible resin film.

In the easily tearable laminated film according to the present invention which includes the organic resin film having the porous region, a film made of a material selected from aluminum, paper, and unwoven fabric and a second heat-fusible resin film can be stacked in this order on the heat-fusible resin film as one film material of the laminated film, and these films can be laminated via adhesive layers. In this case, the heat-fusible resin film, the film made of any of the above materials, and second heat-fusible resin film are bonded with a higher strength than the tear strength of the porous region as the other film material of the easily tearable laminated film.

The thickness of the aluminum film (aluminum foil) is normally 5 to 30 μm.

The paper preferably has an amount of 30 to 150 g/m².

This easily tearable laminated film has a structure such as shown in FIGS. 31A and 31B or FIG. 32.

FIG. 31A is a plan view of an easily tearable laminated film 51 which has a band-like tear region and in which an aluminum film and another heat-fusible resin film are laminated. FIG. 31B is a sectional view taken along the line 31B—31B in FIG. 31A. An organic resin film 52 comprises a non-porous region and a band-like porous region 56 having a large number of fine through pores 55, and the porous has a higher tearability than the non-porous region. A heat-fusible resin film 53 is bonded and laminated to the organic resin film 52 by an adhesive layer 54 interposed between the films 52 and 53. In a band-like tear region 57 matching the porous region 56, the adhesive layer 54 is made thick and bonds the organic resin film 52 to the heat-fusible resin film 53 with a higher strength than the tear strength of the porous region 56. In band-like adjoining regions 58a and 58b adjacent to the tear region 57, the adhesive layer 54 is made thinner than the adhesive layer in the tear region 57 and bonds the organic resin film 52 to the heat-fusible resin film 53 with a strength not higher than the tear strength of the porous region 56. In a region 59 other than the tear region 57 and the adjoining regions 58a and 58b, the adhesive layer 54 is made thick as in the tear region 57 and bonds the organic resin film 52 to the heat-fusible resin film 53 with a higher strength than the tear strength of the porous region 56. Another heat-fusible film 62 having one surface on which an aluminum film 61 is vapor-deposited is stacked on the heat-fusible film 53 such that the aluminum film 61 is in contact with the heat-fusible film 53. This heat-fusible film 62 is laminated to the heat-fusible film 53 by an adhesive layer 63 interposed between the aluminum film 61 and the heat-fusible film 53. The adhesive layer 63 bonds the aluminum film 61 to the heat-fusible resin film 53 with a higher strength than the tear strength of the porous region 56.

When the sealed bag 71 shown in FIG. 24 is manufactured from the easily tearable laminated film 51 with the above arrangement, the bag 71 is given excellent gas barrier properties by the aluminum film 61. Consequently, the contents in the bag can be very properly sealed. Additionally, the aluminum film 61 on one surface of the heat-fusible resin film 62 is bonded to the heat-fusible resin film 53 by the adhesive layer 63 with a higher strength than the tear strength of the porous region 56. Therefore, the sealed bag 71 can be easily torn in the tear region 57 in the early stages of tear by the actions discussed earlier with reference to FIGS. 25 and 26. In the subsequent tearing process, the bag 71 can be readily and reliably torn linearly along the boundary between the tear region 57, which matches the porous region 56, and the adjoining region 58a or 58b.

Note that the aluminum film and the second heat-fusible resin film can also be bonded by using an adhesive layer interposed between the aluminum foil and the second heat-fusible resin film, rather than by vapor deposition. In this case, it is necessary that this adhesive layer bond the aluminum foil to the second heat-fusible resin film with a higher strength than the tear strength of the porous region.

FIG. 32 is a sectional view of an easily tearable laminated film which has a band-like tear region and in which paper and another heat-fusible resin film are laminated. This easily tearable laminated film 51 comprises an organic resin film 52 having a non-porous region and a porous region 56 as discussed above, a heat-fusible resin film 53, and an adhesive layer 54, which is given a function similar to that of the adhesive layer used in the easily tearable laminated film shown in FIGS. 31A and 31B, interposed between the films 52 and 53. Paper 64 and another heat-fusible resin film 62 are stacked in this order on the heat-fusible resin film 53. The heat-fusible resin film 53 and the paper 64 are laminated by an adhesive layer 63, and the paper 64 and the heat-fusible resin film 62 are laminated by another adhesive layer 63. These adhesive layers 63 bond the heat-fusible resin film 53 to the paper 64, and the paper 64 to the heat-fusible resin film 62, with a higher strength than the tear strength of the porous region 56.

The sealed bag 71 (FIG. 24) manufactured from the easily tearable laminated film 51 with this arrangement has the hand of the paper 64. Additionally, the heat-fusible resin film 53 and the paper 64, and the paper 64 and the heat-fusible resin film 62, are bonded by the adhesive layers 63 with a higher strength than the tear strength of the porous region 56. Therefore, the sealed bag 71 can be easily torn in the tear region 57 matching the porous region 56 of the bag 71 in the early stages of tear by the actions discussed earlier with reference to FIGS. 25 and 26. In the subsequent tearing process, the bag 71 can be readily and reliably torn linearly along the boundary between the tear region 57 and the adjoining region 58a or 58b.

Note that in the above easily tearable laminated film, unwoven fabric can also be used instead of the paper. In this case, it is necessary that the first heat-fusible resin film and the unwoven fabric, and the unwoven fabric and the second heat-fusible resin film, be bonded by adhesive layers with a higher strength than the tear strength of the porous region 56.

Still another easily tearable laminated film according to the present invention is a laminated film comprising a rigid organic resin film having one surface on which an aluminum film is vapor-deposited, a heat-fusible resin film, and an adhesive layer interposed between the aluminum film and the heat-fusible resin film, wherein the rigid organic resin film comprises a non-porous region and a porous region having a large number of fine non-through pores, and the porous region has a higher tearability than tearability of the non-porous region, and the aluminum film and the heat-fusible resin film are bonded with a higher strength than a tear strength of the porous region in a tear region which corresponds to the pore formation region, and with a strength not higher than the tear strength of the porous region in an adjoining region adjacent to the tear region.

The same materials as discussed earlier can be used as the rigid organic resin, the heat-fusible resin, and the adhesive.

The aluminum film has a thickness of, e.g., 100 to 1,000 nm.

The tear strength of the porous region of the organic resin film is preferably 0.5 times or less, and more preferably 0.35 times or less the tear strength of the non-porous region for the same reasons as discussed above.

In the porous region, it is preferable, for the same reasons as for the easily tearable laminated film mentioned earlier, that the mean pore opening and the density of the non-through pores be 0.5 to 100 µm, more preferably 5 to 80 µm and 500 pores/cm$^2$ or higher, more preferably 1,000 to 5,000 pores/cm$^2$, respectively. A porous region having non-through pores with these mean pore opening and density of 1,000 pores/cm$^2$ or higher has a tear strength which is sufficiently lower than, e.g., 0.35 times or less the tear strength of the non-porous region. Consequently, this porous region shows a higher tearability than that of the non-porous region.

The shape of the tear region is not particularly limited. For example, the tear region can take any of a ring-like shape such as a circular ring, a rectangular ring, and a hexagonal ring, a band-like shape, and a V shape.

The region (adjoining region) which is adjacent to the tear region means a peripheral region along the tearing direction of the tear region or an entire region except for the tear region. If the adjoining region is the peripheral region of the tear region, the aluminum film and the heat-fusible resin film can be bonded with a strength not higher than the tear strength of the porous region in the adjoining region, and with a higher strength than the tear strength of the porous region in the remaining region.

The adhesive force between the aluminum film and the heat-fusible resin film in the tear region is desirably higher than the tear strength of the porous region. That is, the adhesive force is preferably 1.2 times or more, and more preferably 1.5 times or more the tear strength of the porous region. In addition, it is desirable that the adhesive force between the aluminum film and the heat-fusible resin film in the adjoining region be lower than the tear strength of the porous region. The adhesive force is preferably 0.8 times or less, and more preferably 0.5 times or less the tear strength of the porous region. A sealed bag made from an easily tearable laminated film with this structure can be easily and reliably torn in the tear region in the early stages of tear. Even if the sealed bag is torn obliquely in the tear region in the subsequent tearing process, the bag can be reliably torn along the boundary between the tear region and the adjoining region.

Any of the forms (a) to (c) mentioned earlier is used to bond the aluminum film to the heat-fusible resin film with a higher strength than the tear strength of the porous region in the tear region, and with a strength not higher than the tear strength of the porous region in the adjoining region.

The easily tearable laminated film discussed above will be described in detail below with reference to the accompanying drawings.

FIG. 33A is a plan view of an easily tearable laminated film having a band-like tear region. FIG. 33B is a sectional view taken along the line 33B—33B in FIG. 33A. An easily tearable laminated film 51 consists of an organic resin film 52 having one surface on which an aluminum film 61 is vapor-deposited, a heat-fusible resin film 53, and an adhesive layer 54 interposed between the aluminum film 61 and the heat-fusible resin film 53.

The organic resin film 52 comprises a non-porous region a band like porous region having a large number of fine non-through pores 60. These non-through pores 60 are selectively formed from the surface away from the surface in contact with the aluminum film 61. This porous region 56 has a higher tearability than that of the non-porous region. In a band-like tear region 57 matching the porous region 56, the adhesive layer 54 is made thick and bonds the aluminum film 61 to the heat-fusible resin film 53 with a higher strength than the tear strength of the porous region 56. In band-like adjoining regions 58a and 58b adjacent to the tear region 57, the adhesive layer 54 is made thinner than the adhesive layer in the tear region 57 and bonds the aluminum film 61 to the heat-fusible resin layer 53 with a strength not higher than the tear strength of the porous region 56. In a region 59 except for the tear region 57 and the adjoining regions 58a and 58b, the adhesive layer 54 is made thick as in the tear region 57 and bonds the aluminum film 61 to the heat-fusible resin film 53 with a higher strength than the tear strength of the porous 56.

When the sealed bag 71 shown in FIG. 24 is manufactured from the easily tearable laminated film 51 with the above arrangement, the bag 71 is given excellent gas barrier properties by the aluminum film 61. Consequently, the contents in the bag can be very properly sealed. Additionally, in the band-like tear region 57 matching the porous region 56, the adhesive layer 54 is made thick and bonds the aluminum film 61 to the heat-fusible resin film 53 with a higher strength than the tear strength of the porous region 56. In the band-like adjoining regions 58a and 58b adjacent to the tear region 57, the adhesive layer 4 bonds the aluminum film 61 to the heat-fusible resin layer 53 with a strength not higher than the tear strength of the porous region 56. Therefore, the sealed bag 71 can be easily torn in the tear region 57 in the early stages of tear by the actions discussed earlier with reference to FIGS. 25 and 26. Even if the sealed bag 71 is torn obliquely in the tear region 57 in the subsequent tearing process, the bag can be readily and reliably torn linearly along the boundary between the tear region 57 and the adjoining region 58a or 58b.

Still another easily tearable laminated film according to the present invention is a laminated film comprising an oriented organic resin film, a heat-fusible resin film, an adhesive layer interposed between the oriented organic resin film and the heat-fusible resin film, wherein the organic resin film and the heat-fusible resin film are bonded with a higher strength than a tear strength in an orientation direction of the organic resin film in a tear region along the orientation direction of the organic resin film, and with a strength not higher than the tear strength in the orientation direction of the organic resin film in an adjoining region adjacent to the tear region.

On example of the oriented organic resin is uniaxially stretched polypropylene. A film made of such an organic resin preferably has a thickness of 6 μm or more in order to give the easily tearable laminated film easy tearability. Although the upper limit of the thickness is not particularly restricted, it is preferably 30 μm or less in respect of the cost.

Examples of the heat-fusible resin are polyethylene such as low-density polyethylene and linear, low-density polyethylene, an ethylvinylacetate copolymer (EVA), and unstretched polypropylene. Usually, the thickness of a film made of any of these heat-fusible resins is 10 to 50 μm.

The adhesive is not particularly limited. Examples are adhesives primarily consisting of a polyester-based urethane resin and a polyether-based urethane resin.

The tear strength means a value obtained by measuring a maximum stress by which a sample piece of a predetermined shape, which is formed from an organic resin film, is torn when pulled, and dividing this maximum stress by the original thickness of the test piece.

The tear region usually assumes a band-like shape.

The region (adjoining region) which is adjacent to the tear region means a peripheral region along the tearing direction of the tear region or an entire region except for the tear region. If the adjoining region is the peripheral region of the tear region, the organic resin film and the heat-fusible resin film can be bonded with a strength not higher than the tear strength in the orientation direction of the organic resin film in the adjoining region, and with a higher strength than the tear strength in the orientation direction of the organic resin film in the remaining region.

The adhesive force between the organic resin film and the heat-fusible resin film in the tear region is preferably 1.2 times or more, and more preferably 1.5 times or more the tear strength in the orientation direction of the organic resin film. In addition, the adhesive force between the organic resin film and the heat-fusible resin film in the adjoining region is preferably 0.8 times or less, and more preferably 0.5 times or less the tear strength in the orientation direction of the organic resin film. A sealed bag made from an easily tearable laminated film with this structure can be easily and reliably torn in the tear region in the early stages of tear. In the subsequent tearing process, the bag can be reliably torn along the boundary between the tear region and the adjoining region.

To bond the organic resin film to the heat-fusible resin film with a high strength in the tear region and a lower strength in the adjoining region than in the tear region, the thickness of the adhesive layer in the tear region is made larger than that of the adhesive layer in the adjoining region. Also, to give the tear region a higher adhesive force than that of the adjoining region, the adhesive layer in the tear region is formed by using an adhesive with a high adhesive strength, and the adhesive layer in the adjoining region is formed by using an adhesive with a lower adhesive strength than that of the adhesive used in the tear region.

Note that in the adjoining region, the organic resin film and the heat-fusible resin film can be left unbonded without forming any adhesive layer.

The easily tearable laminated film discussed above will be described in detail below with reference to the accompanying drawings.

FIG. 34 is a partially cutaway perspective view of an easily tearable laminated film having a band-like tear region. This easily tearable laminated film 81 consists of an oriented organic resin film 82, a heat-fusible resin film 83, and an adhesive layer 84 interposed between these films 82 and 83.

The oriented organic resin film 82 has a high tearability in its orientation direction. In a band-like tear region 85 along the orientation direction of the film 82, the adhesive layer 84 is made thick and bonds the organic resin film 82 to the heat-fusible resin film 83 with a higher strength than the tear strength in the orientation direction of the organic resin film 82. In band-like adjoining regions 86a and 86b adjacent to the tear region 85, the adhesive layer 84 is made thinner than the adhesive layer in the tear region 85 and bonds the organic resin film 82 to the heat-fusible resin layer 83 with a strength not higher than the tear strength in the orientation direction of the organic resin film 82. In a region 87 except for the tear region 85 and the adjoining regions 86a and 86b, the adhesive layer 84 is made thick as in the tear region 85 and bonds the organic resin film 82 to the heat-fusible resin film 83 with a higher strength than the tear strength in the orientation direction of the organic resin film 82.

Note that in the easily tearable laminated film 81, a plurality of sets of the band-like tear region 85 and the adjoining regions 86a and 86b are formed at predetermined intervals in the widthwise direction.

FIG. 35 is a front view showing a sealed bag manufactured from the easily tearable laminated film 81. A sealed bag 91 is manufactured by cutting the easily tearable laminated film 81 into desired dimensions, overlapping the cut films such that the organic resin films 82 are located outside, and heat-sealing the heat-fusible resin films 83 at two perpendicular edges such that the band-like tear region 85 is parallel to an opening portion 92. The opening portion 92 is closed by heat sealing after desired contents (e.g., snacks) are placed in the bag. Note that in FIG. 35, reference numeral 93 denotes a sealed portion; and 94, an opening-side sealed portion.

In this sealed bag 91, as illustrated in FIG. 34, in the band-like tear region 85, the adhesive layer 84 is made thick and bonds the organic resin film 82 to the heat-fusible resin film 83 with a higher strength than the tear strength in the orientation direction of the organic resin film 82, and in the band-like adjoining regions 86a and 86b adjacent to the tear region 85, the adhesive layer 84 bonds the organic resin film 82 to the heat-fusible resin layer 83 with a strength not higher than the tear strength in the orientation direction of the organic resin film 82. Therefore, when a tearing force is applied by fingers of both bands to the end portion of the tear region 85 of the sealed bag 91 in the direction indicated by an arrow in FIG. 34, the bag is torn in the tear region 85 in the early stages of tear and then torn along the boundary between the tear region 85 and the band-like adjoining region 86a or 86b.

That is, the organic resin films 82 arranged on the outer surfaces of the sealed bag 91 are oriented and readily tearable in this orientation direction. In addition, in the tear region 85, the organic resin film 82 and the heat-fusible resin film 83 are bonded with a higher strength than the tear strength in the orientation direction of the organic resin film 82. Therefore, the tearability of the heat-fusible resin film 83 which is hard to tear depends upon the tearability of the easily tearable organic resin film 82. As a result, when a tearing force is applied by fingers of both hands to the end of the band-like tear region 85 in the arrow direction in FIG. 35, i.e., in the orientation direction of the organic resin film 82, no interlayer peeling is caused between the films 82 and 83 upon application of the force exceeding the tear strength in the orientation direction of the organic resin film 82. Consequently, although the heat-fusible resin film 83 is difficult to tear, it is possible to easily and reliably tear the two overlapped easily tearable laminated films 81 in the tear region 85.

On the other hand, as shown in FIG. 34, in the band-like adjoining region 86a or 86b of the sealed bag 91, the organic resin film 82 and the heat-fusible resin film 83 are bonded with a strength not higher than the tear strength in the orientation direction of the organic resin film 82. Therefore, even if a tearing force exceeding the tear strength in the orientation direction is applied by fingers of both hands to the end portion of the adjoining region 86a or 86b, interlayer peeling is brought about between the films 82 and 83, although the films are somewhat torn. As a result, in the portion torn by the fingers of both hands, the tearability of each of the films 82 and 83 is exhibited, i.e., the hardly tearable nature of the heat-fusible resin film 83 is exhibited. Consequently, even when applied with a strong force, the heat-fusible resin film 83 is only stretched but difficult to tear any further. Therefore, the adjoining regions 86a and 86b on the both sides of the tear region 85 function as stoppers which inhibit tear.

As discussed above, when a tearing force is applied by fingers of both hands to the end of the band-like tear region 85 of the sealed bag 91 in the arrow direction in FIG. 35, the sealed bag 91 can be torn relatively easily in the early stages of tear. In the subsequent tearing process, the band-like tear region 85 shows a high tearability, and the band-like adjoining regions 86a and 86b function as the stoppers for inhibiting tear. Consequently, the sealed bag 91 can be readily and reliably torn along the boundary between the tear region 85 and the adjoining region 86a (or 86b). Therefore, the sealed bag 91 has good linear cut properties, and this prevents spill or scattering of the contents when the bag is torn in an unexpected direction.

Note that sealed bags having the structures shown in FIGS. 7 and 8 can be similarly manufactured from the easily tearable laminated film with the above structure.

In the easily tearable laminated film according to the present invention, a film made of a material selected from aluminum, paper, and unwoven fabric and a second heat-fusible resin film can be stacked in this order on the heat-fusible resin film as one film material of the laminated film, and these films can be laminated via adhesive layers. In this case, the heat-fusible resin film, the film made of any of the above materials, and the second heat-fusible resin film are bonded with a higher strength than the tear strength in the orientation direction of the organic resin film as the other film material of the easily tearable laminated film.

The present invention will be described in more detail below by way of its preferred examples with reference to the accompanying drawings discussed above.

EXAMPLE 1

In Example 1, an easily tearable laminated film with the with the structure illustrated in FIGS. 1A, 1B, and 2 was manufactured by using a biaxially stretched polypropylene (OPP) film as a rigid organic resin film and a polyethylene (PE) film as a heat-fusible resin film.

A 20 μm thick elongated OPP film was used as an elongated organic resin film 160. This film 160 was passed between the first and second rolls 106 and 117 of the pore forming apparatus shown in FIGS. 14 to 17. A pressure was applied to the OPP film 160 by moving the second roll 117 upward, such that the gap between the points of the synthetic diamond particles 107 electro-deposited on the roll 106 and the surface of the second roll 117 was zero. Note that the synthetic diamond particles 107 had a particle size of 40 to 50 μm. Subsequently, as shown in FIG. 17, mechanical perforation was performed by allowing the acute corners of the synthetic diamond particles 107 to press into the OPP film 160 by rotating the first and second rolls 106 and 117 in the opposite directions. The result was an elongated porous OPP film in which a large number of through pores with a mean pore opening of 10 μm or less were formed at a density of 1,500 pores/cm$^2$ in the OPP film. The tear strength of this porous OPP film was found to be approximately 0.33 times the tear strength of the OPP film having no pores.

Subsequently, the elongated porous OPP film was supplied to a portion between the abutment roll and the coating roll of the dry-laminating apparatus shown in FIG. 18, and a urethane-based adhesive solution was coated on one surface of the elongated porous OPP film. Consequently, a thick band-like coating film was formed along the convey direction of the film, a thin band-like coating film was formed adjacent to the thick coating film, and another thick coating film was formed on the side of the thin coating film away from the side of the first thick coating film. Thereafter, the solvent in each coating film was evaporated in the drying oven. The resultant elongated porous OPP film and a 20 μm thick elongated PE film, as an elongated heat-fusible film, were supplied to a portion between the nipple rolls such that the adhesive coated surface of the porous OPP film was in contact with the PE film. These films were then laminated by applying heat and pressure. As a result, an easily tearable laminated film 1 with the structure illustrated in FIGS. 1A, 1B, and 2 was manufactured. In this easily tearable laminated film 1, the adhesive force of an adhesive layer 4 between the porous OPP film 3 and the PE film was 1.5 times the tear strength of the porous OPP film 3 in a 5 mm wide band-like tear region 7, and 0.5 times the tear strength of the porous OPP film 3 in 5 mm wide band-like adjoining regions 8a and 8b.

A sealed pouch 21 shown in FIG. 3 was manufactured from the resultant easily tearable laminated film of Example 1. A force exceeding the tear strength of the porous OPP film was applied by fingers of both hands to the end portion of the tear region of this sealed pouch 21 in the arrow direction in FIG. 3. Consequently, the sealed pouch 21 was easily torn in the tear region 7 in the early stages of tear. When the sealed pouch 21 was torn obliquely in the tear region 7 in the subsequent tearing process, the pouch 21 was readily torn along the boundary between the band-like tear region 7 and the adjoining region 8b. That is, the sealed pouch 21 was found to have good linear cut properties. Therefore, the sealed pouch was not torn in an unexpected direction, and this made it possible to prevent spill or scattering of the contents of the pouch.

EXAMPLE 2

In Example 2, an easily tearable laminated film with the V-shaped tear region shown in FIGS. 10A and 10B was manufactured by using an OPP film as a rigid organic resin film and a PE film as a heat-fusible resin film.

An elongated porous OPP film analogous to that in Example 1 was supplied to a portion between the abutment roll and the coating roll of the dry-laminating apparatus shown in FIG. 18, and a urethane-based adhesive solution was coated on one surface of the porous OPP film. Thereafter, the solvent in each coating film was evaporated in the drying oven. The resultant elongated OPP film and a 20 μm thick elongated PE film, as an elongated heat-fusible resin film, were supplied to a portion between the nipple rolls such that the adhesive coated surface of the porous OPP film was in contact with the PE film. These films were then laminated by applying heat and pressure. Note that the coating roll had a V-shaped mesh region with deep grooves and V-shaped mesh regions with shallow grooves formed on the both sides of the V-shaped mesh region with deep grooves. Consequently, an easily tearable laminated film 1 with the structure illustrated in FIGS. 10A and 10B was manufactured. In this easily tearable laminated film 1, the adhesive force of an adhesive layer 4 between the porous OPP film 2 and the PE film 3 was 1.5 times the tear strength of the porous OPP film 2 in a 5 mm wide V-shaped tear region 11, and 0.5 times the tear strength of the porous OPP film 2 in 5 mm wide V-shaped adjoining regions 12a and 12b.

A sealed bag 31 for a flat, parallelepiped case for accommodating a floppy disk, FIG. 11, was manufactured from the resultant easily tearable laminated film of Example 2. The sealed bag 31 was held in one hand, and a band-like tongue 32 was pulled by the other hand along the V-shaped tear region 11. Consequently, the sealed bag 31 was torn along the boundary between the V-shaped tear region 11 and each of the V-shaped adjoining regions 12a and 12b on each of the front and rear surfaces; that is, the V-shaped tear region 11 was torn into the shape of a band. The remaining film had the shape of the projecting part of the V shape in the upper portion, and the shape of the recessed part of the V shape in the lower portion. When the sealed bag remained on the case, therefore, the upper portion of the remaining film could be readily removed, and the lower portion of the film could be easily torn and removed from the bottom of the V shape.

EXAMPLE 3

In Example 3, an easily tearable laminated film with the structure shown in FIGS. 20A and 20B was manufactured by using an OPP film as a rigid organic resin film, a PE film as a heat-fusible resin film, and another PE film as a second heat-fusible resin film having one surface on which an aluminum film was vapor-deposited.

A coating film consisting of a urethane-based adhesive was formed on the entire surface of an aluminum film vapor-deposited on one surface of a 15 μm thick PE film. After the coating film was dried, this PE film was overlapped on the same laminated film having the porous OPP film and a PE film as described Example 1 such that the aluminum film was in contact with PE film of the laminated film. These films were supplied to a portion between the nipple rolls and laminated by applying heat and pressure. As a result, an easily tearable laminated film 1 with the structure shown in FIGS. 20A and 20B was manufactured. In this easily tearable laminated film 1, the adhesive force of an adhesive layer 19 between the PE film 3 and the aluminum film 17 was 1.5 times the tear strength of the porous OPP film 2.

A sealed pouch 21 shown in FIG. 3 was manufactured from the resultant easily tearable laminated film of Example 3. This sealed pouch 21 was given good gas barrier properties by the aluminum film and capable of air-tightly sealing the contents. As with the sealed pouch formed from the easily tearable laminated film of Example 1, this sealed pouch 21 exhibited excellent linear cut properties. That is, since the sealed pouch 21 was not torn in an unexpected direction, it was possible to prevent spill or scattering of the contents.

EXAMPLE 4

In Example 4, an easily tearable laminated film with a structure which was nearly identical with that shown in FIGS. 1A, 1B, and 2, and in which adjoining regions were left unbonded, was manufactured by using an OPP film as a rigid organic resin film and a PE film as a heat-fusible resin film.

An elongated porous OPP film similar to that used in Example 1 was supplied to a portion between the abutment roll and the coating roll of the dry-laminating apparatus shown in FIG. 18, and a urethane-based adhesive solution was coated on one surface of the porous OPP film. Thereafter, the solvent in each coating film was evaporated in the drying oven. The resultant elongated porous OPP film and a 20 µm thick elongated PE film, as an elongated heat-fusible resin film, were supplied to a portion between the nipple rolls such that the adhesive coated surface of the porous OPP film was in contact with the PE film. These films were then laminated by applying heat and pressure. Note that the coating roll had a structure in which a mesh region with deep grooves was formed in the circumferential direction and adjoining regions formed on the both sides of the mesh region had a smooth surface with no grooves. The result was an easily tearable laminated film in which the porous OPP film and the PE film were bonded with a strength that was 1.5 times the tear strength of the porous OPP film in the band-like tear region, and were left unbonded in the band-like adjoining regions.

A sealed pouch 21 shown in FIG. 3 was manufactured from the resultant easily tearable laminated film of Example 4. A force exceeding the tear strength of the porous OPP film was applied by fingers of both hands to the end portion of the tear region of this sealed pouch 21 in the arrow direction in FIG. 3. As a result, the sealed pouch 21 was easily torn in the tear region in the early stages of tear. Even if the tearing direction changed in the tear region in the subsequent tearing process, the pouch was readily torn along the band-like tear region and one of the adjoining regions. In particular, since the porous OPP film and the PE film were left unbonded in the band-like adjoining regions, the tearability along the boundary between the band-like tear region and one of the adjoining regions adjacent to this tear region was excellent in the tearing process, as compared with the sealed pouch manufactured from the easily tearable laminated film of Example 1, and this resulted in good linear cut properties. Consequently, the sealed pouch was not torn in an unexpected direction, and this made it possible to prevent spill or scattering of the contents of the pouch.

EXAMPLE 5

In Example 5, an easily tearable laminated film with the structure illustrated in FIG. 9 was manufactured by using a polyethyleneterephthalate (PET) film as a rigid organic resin film and an unstretched polypropylene (CPP) film as a heat-fusible resin film.

A 12 µm thick elongated PET film was used as an elongated organic resin film 160. This film 160 was passed between the first and second rolls 106 and 117 of the pore forming apparatus shown in FIGS. 14 to 17. A pressure was applied to the PET film 160 by moving the second roll 117 upward, such that the gap between the points of the synthetic diamond particles 107 electro-deposited on the first roll 106 and the surface of the second roll 117 was on a submicron order. Note that the synthetic diamond particles 107 had a particle size of 50 to 70 µm. Subsequently, mechanical perforation was performed by allowing the acute corners of the synthetic diamond particles 107 to press into the PET film 160 by rotating the first and second rolls 106 and 117 in the opposite directions. The result was an elongated porous PET film in which a large number of non-through pores with a mean pore opening of 20 µm were formed at a density of 2,500 pores/cm2 in the PET film. The tear strength of this porous PET film was found to be approximately 0.33 times the tear strength of the PET film having no pores.

Subsequently, the resultant elongated porous PET film was supplied to a portion between the abutment roll and the coating roll of the dry-laminating apparatus shown in FIG. 18, and a urethane-based adhesive solution was coated on one surface of the porous PET film. Consequently, a thick band-like coating film was formed along the convey direction of the film, a thin band-like coating film was formed adjacent to the thick coating film, and another thick coating film was formed on the side of the thin coating film away from the side of the first thick coating film. Thereafter, the solvent in each coating film was evaporated in the drying oven. The resultant elongated porous PET film and a 25 µm thick elongated CPP film, as an elongated heat-fusible film, were supplied to a portion between the nipple rolls such that the adhesive coated surface of the porous PET film was in contact with the CPP film. These films were then laminated by applying heat and pressure. As a result, an easily tearable laminated film 1 with the structure illustrated in FIG. 9 was manufactured. In this easily tearable laminated film 1, the adhesive force of an adhesive layer 4 between the porous PET film 2 and the CPP film 3 was 1.5 times the tear strength of the porous PET film 2 in a 5 mm wide band-like tear region 7, and 0.5 times the tear strength of the porous PET film 2 in 5 mm wide band-like adjoining regions 8a and 8b.

A sealed pouch 21 shown in FIG. 3 was manufactured from the resultant easily tearable laminated film of Example 5. A force exceeding the tear strength of the porous PET film was applied by fingers of both hands to the end portion of the tear region of this sealed pouch 21 in the arrow direction in FIG. 3. Consequently, the sealed pouch 21 was easily torn in the tear region 7 in the early stages of tear. When the sealed pouch 21 was torn obliquely in the tear region in the subsequent tearing process, the pouch 21 was readily and reliably torn along the boundary between the band-like tear region and one of the adjoining regions. That is, the sealed pouch 21 was found to have good linear cut properties. Therefore, the sealed pouch was not torn in an unexpected direction, and this made it possible to prevent spill or scattering of the contents of the pouch.

EXAMPLE 6

In Example 6, an easily tearable laminated film with the structure illustrated in FIGS. 22A and 22B was manufactured by using a PET film as a rigid organic resin film having one surface on which an aluminum film was vapor-deposited, and a CPP film as a heat-fusible resin film.

A 12 µm thick elongated PET film having one surface on which an aluminum film was vapor-deposited, was passed between the first and second rolls 106 and 117 of the pore forming apparatus shown in FIGS. 14 to 17, such that the PET film was in contact with the first roll 106. A pressure was applied to the PET film 160 with the aluminum film by moving the second roll 117 upward, such that the gap between the points of the synthetic diamond particles 107 electro-deposited on the first roll 106 and the surface of the second roll 117 was slightly larger than the thickness of the aluminum film. Note that the synthetic diamond particles 107 had a particle size of 50 to 70 µm. Subsequently, mechanical perforation was performed by allowing the acute corners of the synthetic diamond particles 107 to press into the entire PET film from the surface away from the surface in contact with the aluminum film by rotating the first and second rolls 106 and 117 in the opposite directions. The result was an elongated porous PET film with the aluminum film in which a large number of non-through pores with a mean pore opening of 20 µm were formed at a density of 2,500 pores/cm$^2$ in the PET film. The tear strength of this porous PET film was found to be approximately 0.33 times the tear strength of the PET film having no pores.

Subsequently, the resultant elongated porous PET film with the aluminum film was supplied to a portion between the abutment roll and the coating roll of the dry-laminating apparatus shown in FIG. 18, and a urethane-based adhesive solution was coated on the surface of the aluminum film of the porous PET film. Consequently, a thick band-like coating film was formed along the convey direction of the film, a thin band-like coating film was formed adjacent to the thick coating film, and another thick coating film was formed on the side of the thin coating film away from the side of the first thick coating film. Thereafter, the solvent in each coating film was evaporated in the drying oven. The resultant elongated porous PET film and a 20 µm thick elongated CPP film, as an elongated heat-fusible film, were supplied to a portion between the nipple rolls such that the adhesive coated surface of the aluminum film was in contact with the CPP film. These films were then laminated by applying heat and pressure. As a result, an easily tearable laminated film 1 with the structure illustrated in FIG. 22 was manufactured. In this easily tearable laminated film 1, the adhesive force of an adhesive layer 4 between the aluminum film 17 and the CPP film 3 was 1.5 times the tear strength of the porous PET film 2 in a 5 mm wide band-like tear region 7, and 0.5 times the tear strength of the porous PET film 2 in 5 mm wide band-like adjoining regions 8a and 8b.

A sealed pouch 21 shown in FIG. 3 was manufactured from the resultant easily tearable laminated film of Example 6. This sealed pouch 21 was given good gas barrier properties by the aluminum film and capable of air-tightly sealing the contents. As with the sealed pouch formed from the easily tearable laminated film of Example 1, this sealed pouch 21 exhibited excellent linear cut properties. That is, since the sealed pouch 21 was not torn in an unexpected direction, it was possible to prevent spill or scattering of the contents.

EXAMPLE 7

In Example 7, an easily tearable laminated film with the structure shown in FIG. 23 in which a tear region matching a porous region was manufactured by using an OPP film as a rigid organic resin film and a PE film as a heat-fusible resin film. This easily tearable laminated film of Example 7 was manufactured by using the pore forming apparatus shown in FIGS. 14 to 16 in which the pattern roll 201 (FIG. 28) including the roll main body 203 coated with the urethane rubber sheet 204 and having the annular protruding patterns 202 was incorporated as the second roll.

A 20 µm thick elongated OPP film was used as an elongated organic resin film 160. This film 160 was passed between the first roll 106 and the pattern roll 201 of the pore forming apparatus. A pressure was applied to the OPP film 160 by moving the pattern roll 201 upward, such that the gap between the points of the synthetic diamond particles 107 electro-deposited on the first roll 106 and the surface of the urethane rubber sheet 204 on the pattern roll 201 was zero. Note that the synthetic diamond particles 107 had a particle size of 70 to 80 µm. Subsequently, the first roll 106 and the pattern roll 201 were rotated in the opposite directions. As a result, as in FIG. 30, the OPP film 160 was sandwiched between the portions of the urethane rubber sheet 204 corresponding to the annular protruding patterns 202 and the acute corners of the synthetic diamond particles 107. Consequently, the acute corners of the synthetic diamond particles 107 opposing the protruding patterns 202 selectively and regularly press into the OPP film 160 by the cushioning effect of the urethane rubber sheet 204, thereby accomplishing mechanical perforation. The result was a OPP film which was formed a non-porous region and a 5 mm wide band-like porous region having a large number of through pores with a mean pore opening of 20 µm at a density of 2,500 pores/cm$^2$. In this manner, the band-like porous regions was formed in the convey direction. The tear strength of the porous region of this OPP film was found to be approximately 0.33 times the tear strength of the non-porous region.

Subsequently, the resultant elongated OPP film was supplied to a portion between the abutment roll and the coating roll of the dry-laminating apparatus shown in FIG. 18, and a urethane-based adhesive solution was coated on one surface of the OPP film. Consequently, a thick band-like coating film was formed along the convey direction of the film, a thin band-like coating film was formed adjacent to the thick coating film, and another thick coating film was formed on the side of the thin coating film away from the side of the first thick coating film. Thereafter, the solvent in each coating film was evaporated in the drying oven. The resultant elongated OPP film and a 20 µm thick elongated PE film, as an elongated heat-fusible film, were supplied to a portion between the nipple rolls such that the adhesive coated surface of the OPP film was in contact with the PE film. These films were then laminated by applying heat and pressure. As a result, an easily tearable laminated film 51 with the structure illustrated in FIG. 23 was manufactured. In this easily tearable laminated film 51, the adhesive force of an adhesive layer 54 between the OPP film 52 and the PE film 53 was 1.5 times the tear strength of a band-like porous region 56 in a band-like tear region 57 matching the porous region 56, and 0.5 times the tear strength of the porous region 56 in 5 mm wide band-like adjoining regions 58a and 58b.

A sealed pouch 71 shown in FIG. 24 was manufactured from the resultant easily tearable laminated film of Example 7. A force exceeding the tear strength of the porous region 56 was applied by fingers of both hands to the end portion of the tear region of this sealed pouch 71 in the arrow direction in FIG. 24. Consequently, the sealed pouch 71 was easily torn in the tear region 57 in the early stages of tear. When the sealed pouch 71 was torn obliquely in the tear region 57 in the subsequent tearing process, the pouch 71 was torn along the boundary between the band-like tear region 57 and the adjoining region 58a (or 58b). In particular, since the band-like tear region 57 matched the porous region 56 of the OPP film 52, the sealed pouch could be readily and reliably torn along the boundary between the tear region 57 and one of the adjoining regions 58a and 58b adjacent to the tear region 57. That is, the sealed pouch 71 was found to have very good linear cut properties compared to the sealed pouch manufactured from the easily tearable laminated film of Example 1. Therefore, the sealed pouch was not torn in an unexpected direction, and this made it possible to prevent spill or scattering of the contents of the pouch.

EXAMPLE 8

In Example 8, an easily tearable laminated film with the structure shown in FIGS. 31A and 31B was manufactured by using an OPP film as a rigid organic resin film, a PE film as a heat-fusible resin film, and another PE film as a second heat-fusible resin film having one surface on which an aluminum film was vapor-deposited.

A coating film consisting of a urethane-based adhesive was formed on the entire surface of an aluminum film vapor-deposited on one surface of a 20 µm thick PE film. After the coating film was dried, this PE film was overlapped on the same laminated film having OPP film and PE film as described Example 7 such that the aluminum film was in contact with the PE film of the laminated film. These films were supplied to a portion between the nipple rolls and laminated by applying heat and pressure. As a result, an easily tearable laminated film 51 with the structure shown in FIGS. 31A and 31B was manufactured. In this easily tearable laminated film 51, the adhesive force of an adhesive layer 63 between the PE film 53 and the aluminum film 61 was 1.5 times the tear strength of the porous region of the OPP film 52.

A sealed pouch 71 shown in FIG. 24 was manufactured from the resultant easily tearable laminated film of Example 8. This sealed pouch 71 was given good gas barrier properties by the aluminum film and capable of air-tightly sealing the contents. As with the sealed pouch formed from the easily tearable laminated film of Example 7, this sealed pouch 71 exhibited excellent linear cut properties. That is, since the sealed pouch 71 was not torn in an unexpected direction, it was possible to prevent spill or scattering of the contents.

EXAMPLE 9

In Example 9, an easily tearable laminated film with a structure which was nearly identical with that shown in FIG. 23, and in which adjoining regions were left unbonded, was manufactured by using an OPP film as a rigid organic resin film and a PE film as a heat-fusible resin film.

An elongated OPP film having a band-like porous region similar to that in Example 7 was supplied to a portion between the abutment roll and the coating roll of the dry-laminating apparatus shown in FIG. 18, and a urethane-based adhesive solution was coated on one surface of the elongated OPP film. Thereafter, the solvent in each coating film was evaporated in the drying oven. The resultant elongated OPP film and a 20 µm thick elongated PE film, as an elongated heat-fusible resin film, were supplied to a portion between the nipple rolls such that the adhesive coated surface of the OPP film was in contact with the PE film. These films were then laminated by applying heat and pressure. Note that the coating roll had a structure in which a mesh region with deep grooves was formed in the circumferential direction and adjoining regions formed on the both sides of the mesh region had a smooth surface with no grooves. The result was an easily tearable laminated film in which the OPP film and the PE film were bonded with a strength that was 1.5 times the tear strength of the porous region of the OPP film in a band-like tear region corresponding to the porous region, and left unbonded in band-like adjoining regions.

A sealed pouch 71 shown in FIG. 24 was manufactured from the resultant easily tearable laminated film of Example 9. A force exceeding the tear strength of the OPP film was applied by fingers of both hands to the end portion of the tear region of this sealed pouch 71 in the arrow direction in FIG. 24. As a result, the sealed pouch 71 was easily torn in the tear region in the early stages of tear. When the sealed pouch 71 was torn obliquely in the tear region in the subsequent tearing process, the pouch was torn along the boundary between the band-like tear region and one of the adjoining regions. In particular, since the OPP film and the PE film were left unbonded in the band-like adjoining regions, in the tearing process, it was possible to readily and reliably tear the sealed bag along the boundary between the band-like tear region and one of the adjoining regions adjacent to this tear region, resulting in good linear cut properties. Consequently, the sealed pouch was not torn in an unexpected direction, and this made it possible to prevent spill or scattering of the contents of the pouch.

EXAMPLE 10

In Example 10, an easily tearable laminated film with the structure illustrated in FIG. 27 was manufactured by using a PET film as a rigid organic resin film and a CPP film as a heat-fusible resin film.

A 16 µm thick elongated PET film was used as an elongated organic resin film 160. This film 160 was passed between the first roll 106 and the pattern roll 201 of the pore forming apparatus similar to that used in Example 7. A pressure was applied to the PET film 160 by moving the pattern roll 201 upward, such that the gap between the points of the synthetic diamond particles 107 electro-deposited on the first roll 106 and the surface of the urethane rubber sheet 204 of the pattern roll 201 was on a submicron order. Note that the synthetic diamond particles 107 had a particle size of 100 to 125 µm. Subsequently, the first roll 106 and the pattern roll 201 were rotated in the opposite directions. As a result, the PET film 160 was sandwiched between the portions of the urethane rubber sheet 204 corresponding to the annular protruding patterns 202 and the acute corners of the synthetic diamond particles 107. Consequently, the acute corners of the synthetic diamond particles 107 opposing the protruding patterns 202 selectively and regularly press into the PET film 160 by the cushioning effect of the urethane rubber sheet 204, thereby accomplishing mechanical perforation. The result was an PET film which was formed a non-porous region and a 5 mm wide band-like porous region having a large number of non-through pores with a mean pore opening of 50 µm at a density of 1,500 pores/cm$^2$. In this manner, the wide band-like pore formation regions was formed in the convey direction. The tear strength of the porous region of this PET film was found to be approximately 0.33 times the tear strength of the non-porous region.

Subsequently, the resultant elongated PET film was supplied to a portion between the abutment roll and the coating roll of the dry-laminating apparatus shown in FIG. 18, and a urethane-based adhesive solution was coated on one surface of the PET film. Consequently, a thick band-like coating film matching the band-like porous region of the film was formed along the convey direction of the film, a thin band-like coating film was formed adjacent to the thick coating film, and another thick coating film was formed on the side of the thin coating film away from the side of the first thick coating film. Thereafter, the solvent in each coating film was evaporated in the drying oven. The resultant elongated PET film and a 25 μm thick elongated CPP film, as an elongated heat-fusible film, were supplied to a portion between the nipple rolls such that the adhesive coated surface of the PET film was in contact with the CPP film. These films were then laminated by applying heat and pressure. As a result, an easily tearable laminated film 51 with the structure illustrated in FIG. 27 was manufactured. In this easily tearable laminated film 51, the adhesive force of an adhesive layer 54 between the PET film 52 and the CPP film 53 was 1.5 times the tear strength of a band-like porous region 56 in a band-like tear region 57 matching the porous region 56, and 0.5 times the tear strength of the porous region 56 in 5 mm wide band-like adjoining regions 58a and 58b.

A sealed pouch 71 shown in FIG. 24 was manufactured from the resultant easily tearable laminated film of Example 10. When a tearing force was applied with both hands to the end of the tear region of this sealed pouch 71 in the arrow direction in FIG. 24, the sealed pouch 71 was easily torn in the tear region 57 matching the porous region 56 in the early stages of tear. Even if the tearing direction changed in the tear region 57 in the subsequent tearing process, the pouch 71 was torn very easily and reliably along the boundary between the band-like tear region 57 and the adjoining region 58a (or 58b). That is, the sealed pouch 71 was found to have extremely good linear cut properties. Therefore, the sealed pouch was not torn in an unexpected direction, and this made it possible to prevent spill or scattering of the contents of the pouch.

EXAMPLE 11

In Example 11, an easily tearable laminated film with the structure illustrated in FIGS. 33A and 33B was manufactured by using a PET film as a rigid organic resin film having one surface on which an aluminum film was vapor-deposited, and a CPP film as a heat-fusible resin film.

A 12 μm thick elongated PET film having one surface on which an aluminum film was vapor-deposited, was passed between the first roll 106 and the pattern roll 201 of the pore forming apparatus similar to that used in Example 7. A pressure was applied to the PET film 160 with the aluminum film by moving the pattern roll 201 upward, such that the gap between the points of the synthetic diamond particles 107 electro-deposited on the first roll 106 and the surface of the urethane rubber sheet 204 of the pattern roll 201 was slightly larger than the thickness of the aluminum film. Note that the synthetic diamond particles 107 had a particle size of 50 to 70 μm. Subsequently, the first roll 106 and the pattern roll 201 were rotated in the opposite directions. As a result, the PET film 160 was sandwiched between the portions of the urethane rubber sheet 204 corresponding to the annular protruding patterns 202 and the acute corners of the synthetic diamond particles 107. Consequently, the acute corners of the synthetic diamond particles 107 opposing the protruding patterns 202 selectively and regularly press into the PET film 160 by the cushioning effect of the urethane rubber sheet 204, thereby accomplishing mechanical perforation. The result was that a large number of non-through pores with a mean pore opening of 20 μm were selectively formed into the shape of a band in the PET film at a density of 2,000 pores/cm$^2$. In this manner, an elongated PET film with the aluminum film, which has a 5 mm wide band-like non-porous regions and a 5 mm wide band-like porous regions formed in the convey direction, was manufactured.

The tear strength of the porous region of this PET film was found to be approximately 0.33 times the tear strength of the non-porous region.

Subsequently, the resultant elongated PET film with the aluminum film was supplied to a portion between the abutment roll and the coating roll of the dry-laminating apparatus shown in FIG. 18, and a urethane-based adhesive solution was coated on the surface of the aluminum film of the PET film. Consequently, a thick band-like coating film was formed along the convey direction of the film, a thin band-like coating film was formed adjacent to the thick coating film, and another thick coating film was formed on the side of the thin coating film away from the side of the first thick coating film. Thereafter, the solvent in each coating film was evaporated in the drying oven. The resultant elongated PET film with the aluminum film and a 25 μm thick elongated CPP film, as an elongated heat-fusible film, were supplied to a portion between the nipple rolls such that the adhesive coated surface of the aluminum film was in contact with the CPP film. These films were then laminated by applying heat and pressure. As a result, an easily tearable laminated film 51 with the structure illustrated in FIGS. 33A and 33B was manufactured. In this easily tearable laminated film 51, the adhesive force of an adhesive layer 54 between the aluminum film 61 and the CPP film 53 was 1.5 times the tear strength of a band-like porous region 56 in a 5 mm wide band-like tear region 57 matching the porous region 56, and 0.5 times the tear strength of the porous region 56 in 5 mm wide band-like adjoining regions 58a and 58b.

A sealed pouch 71 shown in FIG. 24 was manufactured from the resultant easily tearable laminated film of Example 11. This sealed pouch 71 was given good gas barrier properties by the aluminum film and capable of air-tightly sealing the content. As with the sealed pouch formed from the easily tearable laminated film of Example 7, this sealed pouch 71 exhibited excellent linear cut properties. That is, since the sealed pouch 71 was not torn in an unexpected direction, it was possible to prevent spill or scattering of the contents.

EXAMPLE 12

In Example 12, an easily tearable laminated film with the structure illustrated in FIG. 34 was manufactured by using a uniaxially stretched polypropylene film as an oriented organic resin film and a PE film as a heat-fusible resin film.

A 20 μm thick elongated, uniaxially stretched polypropylene (uniaxially stretched PP) film that was oriented in the lengthwise direction was supplied to a portion between the abutment roll and the coating roll of the dry-laminating apparatus shown in FIG. 18, and a urethane-based adhesive solution was coated on one surface of the uniaxially stretched PP film. Consequently, a thick band-like coating film was formed along the convey direction of the film, a thin band-like coating film was formed adjacent to the thick coating film, and another thick coating film was formed on the side of the thin coating film away from the side of the first thick coating film. Thereafter, the solvent in each coating film was evaporated in the drying oven. The resultant elongated, uniaxially stretched PP film and a 50 μm thick elongated PE film, as an elongated heat-fusible film, were supplied to a portion between the nipple rolls such that the adhesive coated surface of the uniaxially stretched PP film was in contact with the PE film. These films were then laminated by applying heat and pressure. As a result, an easily tearable laminated film 81 with the structure illustrated in FIG. 34 was manufactured. In this easily tearable laminated film 81, the adhesive force of an adhesive layer 84 between the uniaxially stretched PP film 82 and the PE film 83 was 1.5 times the tear strength in the orientation direction of the uniaxially stretched PP film 82 in a 5 mm wide band-like tear region 85 formed along the orientation direction, and 0.5 times the tear strength in the orientation direction of the uniaxially stretched PP film 82 in 5 mm wide band-like adjoining regions 86a and 86b.

A sealed pouch 91 shown in FIG. 35 was manufactured from the resultant easily tearable laminated film of Example 12. When a tearing force was applied with both hands to the end of the tear region of this sealed pouch 91 in the arrow direction in FIG. 35, the sealed pouch 91 was relatively easily torn in the tear region 85 in the early stages of tear. In the subsequent tearing process, the pouch 91 was readily torn along the boundary between the band-like tear region 85 and one of the adjoining regions 86a and 86b. That is, the sealed pouch 91 was found to have linear cut properties. Therefore, the sealed pouch was not torn in an unexpected direction, and this made it possible to prevent spill or scattering of the contents of the pouch.

EXAMPLE 13

In Example 13, an easily tearable laminated film was manufactured by using an OPP film as a rigid organic resin film, a PE film as a heat-fusible resin film, and another PE film as a second heat-fusible resin film having one surface on which an aluminum film was vapor-deposited.

A coating film consisting a urethane-based adhesive was formed on the entire surface of an aluminum film vapor-deposited on one surface of a 30 μm thick PE film. After the coating film was dried, this PE film was overlapped on the same laminated film having uniaxially stretched PP film and PE film as described Example 12 such that the aluminum film was in contact with the PE film of the laminated film. These films were supplied to a portion between the nipple rolls and laminated by applying heat and pressure. The result was an easily tearable laminated film analogous to that of Example 12, in which the uniaxially stretched PP film and the PE film were laminated and this PE film and the aluminum film of the other PE film were laminated via the adhesive layer. In this easily tearable laminated film, the adhesive force of the adhesive layer between the PE film and the aluminum film was 1.5 times the tear strength in the orientation direction of the uniaxially stretched PP film.

A sealed pouch 91 shown in FIG. 35 was manufactured from the resultant easily tearable laminated film of Example 13. This sealed pouch 91 was given good gas barrier properties by the aluminum film and capable of air-tightly sealing the contents. As with the sealed pouch formed from the easily tearable laminated film of Example 12, this sealed pouch 91 exhibited excellent linear cut properties. That is, since the sealed pouch 91 was not torn in an unexpected direction, it was possible to prevent spill or scattering of the contents.

As has been discussed above, the present invention can provide an easily tearable laminated film suitable as a sealed pouch or a lid of a sealed container, which, when opened, can be easily and reliably torn along a direction of any specific intended shape such as a linear shape, an annular shape, and a V shape, thereby preventing spill or scattering of the contents. This easily tearable laminated film can be effectively used as sealed bags of a variety of liquid or powder products, e.g., liquid soup, powder soup, granulated sugar, instant coffee containing sugar and powder cream, and powder medicines, as sealed bags of flat, parallelepiped cases for cassette tapes, compact disks, and floppy disks, and as lids of containers for containing a fluid food such as yogurt and pudding.

The present invention can also provide a method capable of readily mass-producing this easily tearable laminated film.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An easily tearable laminated film, comprising:

a porous organic film comprising a rigid organic film having a large number of fine through pores and/or fine non-through pores formed over the entire region, and having a tearability higher than that of an organic film having no pores;

a heat-fusible film; and an adhesive layer interposed between said porous organic film and said heat-fusible film such that said porous organic film and said heat-fusible film are bonded to each other with a bonding strength higher than a tear strength of said porous organic film in a tear region but not higher than the tear strength of said porous organic film in an adjoining region adjacent to said tear region.

2. A film according to claim 1, wherein said rigid organic resin is one of polyethyleneterephthalate, nylon, and oriented polypropylene.

3. A film according to claim 1, wherein said heat-fusible resin is one of polyethylene, an ethylvinylacetate copolymer, and unstretched polypropylene.

4. A film according to claim 1, wherein the tear strength of said porous organic resin film is not more than 0.5 times the tear strength of said organic resin film having no pores.

5. A film according to claim 1, wherein the tear strength of said porous organic resin film is not more than 0.35 times the tear strength of said organic resin film having no pores.

6. A film according to claim 1, wherein said through or non-through pores of said porous organic resin film have a mean pore opening of 0.5 to 100 μm and said through an/or non-through pores are formed at a density of not less than 500 pores/cm$^2$ in said organic resin film.

7. A film according to claim 1, wherein an adhesive force between said porous organic resin film and said heat-fusible resin film in said tear region is not less than 1.2 times the tear strength of said porous organic resin film.

8. A film according to claim 1, wherein an adhesive force between said porous organic resin film and said heat-fusible resin film in said tear region is not less than 1.5 times the tear strength of said porous organic resin film.

9. A film according to claim 1, wherein an adhesive force between said porous organic resin film and said heat-fusible resin film in said adjoining region is not more than 0.8 times the tear strength of said porous organic resin film.

10. A film according to claim 1, wherein an adhesive force between said porous organic resin film and said heat-fusible resin film in said adjoining region is not more than 0.5 times the tear strength of said porous organic resin film.

11. A film according to claim 1, wherein said adhesive layer between said porous organic resin film and said heat-fusible resin film in said tear region is made thicker than said adhesive layer between said porous organic resin film and said heat-fusible resin film in said adjoining region.

12. A film according to claim 1, wherein a film made of a material selected from the group consisting of aluminum, paper, and unwoven fabric and a second heat-fusible resin film are stacked in an order named on a surface of said heat-fusible resin film away from the surface in contact with said adhesive layer, and said heat-fusible resin film, said film made of said material, and said second heat-fusible resin film are laminated by adhesive layers interposed therebetween, said heat-fusible resin film, said film made of said material, and said second heat-fusible resin film being bonded with a higher strength than the tear strength of said porous organic resin film.

13. An easily tearable laminated film, comprising:
  a rigid organic film comprising a non-porous region and a porous region having a large number of fine through pores and/or fine non-through pores said porous region having a tearability higher than that of said non-porous region:
  a heat-fusible film; and
  an adhesive layer interposed between said rigid organic film and said heat-fusible film such that said rigid organic film and said heat-fusible film are bonded to each other, the bonding strength in a tear region which matches said porous region of said rigid organic film being higher than a tear strength of said porous region, and the bonding strength in an adjoining region adjacent to said tear region being not higher than the tear strength of said porous region.

14. A film according to claim 13, wherein said rigid organic resin is one of polyethyleneterephthalate, nylon, and oriented polypropylene.

15. A film according to claim 13, wherein said heat-fusible resin is one of polyethylene, an ethylvinylacetate copolymer, and unstretched polypropylene.

16. A film according to claim 13, wherein the tear strength of said porous region of said organic resin film is not more than 0.5 times the tear strength of said non-porous region.

17. A film according to claim 13, wherein the tear strength of said porous region of said organic resin film is not more than 0.35 times the tear strength of said non-porous region.

18. A film according to claim 13, wherein said through or non-through pores of said porous region have a mean pore opening of 0.5 to 100 μm and said through and/or non-through pores are formed at a density of not less than 500 pores/cm$^2$ in said organic resin film.

19. A film according to claim 13, wherein an adhesive force between said organic resin film and said heat-fusible resin film in said tear region is not less than 1.2 times the tear strength of said porous region.

20. A film according to claim 13, wherein an adhesive force between said organic resin film and said heat-fusible resin film in said tear region is not less than 1.5 times the tear strength of said porous region.

21. A film according to claim 13, wherein an adhesive force between said organic resin film and said heat-fusible resin film in said adjoining region is not more than 0.8 times the tear strength of said porous region.

22. A film according to claim 13, wherein an adhesive force between said organic resin film and said heat-fusible resin film in said adjoining region is not more than 0.5 times the tear strength of said porous region.

23. A film according to claim 13, wherein said adhesive layer between said organic resin film and said heat-fusible resin film in said tear region is made thicker than said adhesive layer between said organic resin film and said heat-fusible resin film in said adjoining region.

24. A film according to claim 13, wherein a film made of a material selected from the group consisting of aluminum, paper, and unwoven fabric and a second heat-fusible resin film are stacked in an order named on a surface of said heat-fusible resin film away from the surface in contact with said adhesive layer, and said heat-fusible resin film, said film made of said material, and said second heat-fusible resin film are laminated by adhesive layers interposed therebetween, said heat-fusible resin film, said film made of said material, and said second heat-fusible resin film being bonded with a higher strength than the tear strength of said porous region.

* * * * *